United States Patent
Iwanaga et al.

(10) Patent No.: US 11,401,351 B2
(45) Date of Patent: Aug. 2, 2022

(54) METHOD OF PRODUCING A RUBBERY POLYMER

(71) Applicant: TECHNO-UMG CO., LTD., Tokyo (JP)

(72) Inventors: Takashi Iwanaga, Ube (JP); Yoshitaka Naito, Ube (JP); Hiroyuki Atsuta, Ube (JP); Ichiro Kamata, Ube (JP); Hironori Matsuyama, Ube (JP); Yuusuke Fukamachi, Ube (JP)

(73) Assignee: TECHNO-UMG CO., LTD., Tokyo (JP)

(*) Notice: Subject to any disclaimer, the term of this patent is extended or adjusted under 35 U.S.C. 154(b) by 24 days.

(21) Appl. No.: 16/910,391

(22) Filed: Jun. 24, 2020

(65) Prior Publication Data

US 2020/0317920 A1    Oct. 8, 2020

Related U.S. Application Data

(63) Continuation of application No. 15/771,823, filed as application No. PCT/JP2016/079919 on Oct. 7, 2016, now abandoned.

(30) Foreign Application Priority Data

| Oct. 28, 2015 | (JP) | ............................. JP2015-212024 |
| Oct. 28, 2015 | (JP) | ............................. JP2015-212025 |
| Oct. 28, 2015 | (JP) | ............................. JP2015-212026 |
| Oct. 28, 2015 | (JP) | ............................. JP2015-212027 |

(51) Int. Cl.

| *C08F 2/24* | (2006.01) |
| *C08F 279/02* | (2006.01) |
| *C08F 283/12* | (2006.01) |
| *C08F 2/22* | (2006.01) |
| *C08F 220/14* | (2006.01) |
| *C08F 2/44* | (2006.01) |
| *C08F 20/20* | (2006.01) |
| *C08L 33/12* | (2006.01) |
| *C08L 101/00* | (2006.01) |
| *C08F 285/00* | (2006.01) |
| *C08L 51/08* | (2006.01) |
| *C08L 25/12* | (2006.01) |
| *C08F 212/10* | (2006.01) |
| *C08L 69/00* | (2006.01) |
| *C08L 51/00* | (2006.01) |
| *C08G 81/02* | (2006.01) |
| *C08J 3/07* | (2006.01) |
| *C08J 3/24* | (2006.01) |
| *C08K 5/00* | (2006.01) |
| *C08L 83/10* | (2006.01) |
| *C08F 265/06* | (2006.01) |
| *C08F 257/02* | (2006.01) |
| *C08F 2/56* | (2006.01) |
| *C08F 220/18* | (2006.01) |
| *C08L 55/02* | (2006.01) |

(52) U.S. Cl.
CPC .................. *C08F 2/22* (2013.01); *C08F 2/24* (2013.01); *C08F 2/44* (2013.01); *C08F 20/20* (2013.01); *C08F 212/10* (2013.01); *C08F 220/14* (2013.01); *C08F 279/02* (2013.01); *C08F 283/12* (2013.01); *C08F 285/00* (2013.01); *C08G 81/024* (2013.01); *C08J 3/07* (2013.01); *C08J 3/24* (2013.01); *C08K 5/0025* (2013.01); *C08L 25/12* (2013.01); *C08L 33/12* (2013.01); *C08L 51/003* (2013.01); *C08L 51/08* (2013.01); *C08L 51/085* (2013.01); *C08L 69/00* (2013.01); *C08L 83/10* (2013.01); *C08L 101/00* (2013.01); *C08F 2/56* (2013.01); *C08F 220/1804* (2020.02); *C08F 257/02* (2013.01); *C08F 265/06* (2013.01); *C08L 55/02* (2013.01); *C08L 2312/00* (2013.01)

(58) Field of Classification Search
None
See application file for complete search history.

(56) References Cited

U.S. PATENT DOCUMENTS

| 4,530,956 | A  * | 7/1985  | Ugelstad ............... C08F 291/00 524/458 |
| 6,541,032 | B1 * | 4/2003  | Medelnick ............. A61K 8/046 424/401 |
| 7,279,542 | B2   | 10/2007 | Ouali et al. |
| 8,362,147 | B2   | 1/2013  | Yamada et al. |
| 10,759,934 | B2  | 9/2020  | Zilles et al. |

(Continued)

FOREIGN PATENT DOCUMENTS

| AU | 2013366678    | * | 6/2014 |
| CN |  101910321  A |   | 12/2010 |

(Continued)

OTHER PUBLICATIONS

Hordy, A Continuous Tubular Reactor for Core-Shell Latex Particles; The Canadian Journal of Chemical Engineering vol. 90 Apr. 2012 pp. 437-441. (Year: 2012).*

Landfester, Particle Size Distribution in Mini-Emulsion Polymerization; C.R. Chimie 6 (2003) pp. 1337-1342. (Year: 2003).*

(Continued)

*Primary Examiner* — David J Buttner
(74) *Attorney, Agent, or Firm* — Manabu Kanesaka

(57) ABSTRACT

A method for producing a rubbery polymer includes a step of preparing a mixture containing an alkyl (meth)acrylate, a hydrophobe, and an emulsifier, wherein an amount of the hydrophobe is 0.1-10 parts by mass relative to 100 parts by mass of the alkyl (meth)acrylate, and an amount of emulsifier is 0.01-1.0 part by mass relative to 100 parts by mass of the alkyl (meth)acrylate; a step of applying a shear force to the mixture to prepare a pre-emulsion, and a step of heating the pre-emulsion to polymerize the resulting mixture by miniemulsion polymerization.

12 Claims, 1 Drawing Sheet

(56) References Cited

U.S. PATENT DOCUMENTS

2004/0192838 A1* 9/2004 Destarac ............. C08F 293/005
524/800
2011/0184121 A1* 7/2011 Bao .......................... C08F 2/22
524/575.5

FOREIGN PATENT DOCUMENTS

| EP | 1092416 | * | 4/2001 |
| --- | --- | --- | --- |
| JP | S63-92627 A | | 4/1988 |
| JP | 2002-363482 A | | 12/2002 |
| JP | 2006-518790 A | | 8/2006 |
| JP | 2009-084355 A | | 4/2009 |
| JP | 2010-215764 A | | 9/2010 |
| JP | 2011-122129 A | | 6/2011 |
| JP | 2016-500405 A | | 1/2016 |

OTHER PUBLICATIONS

China Patent Office, "Office Action for Chinese Patent Application No. 202010141990.6," dated Jul. 9, 2021.

* cited by examiner

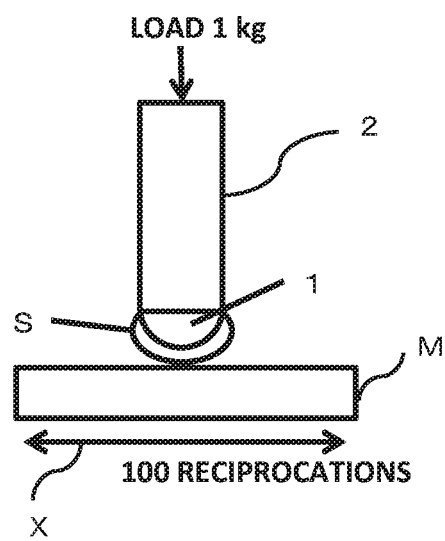

METHOD OF PRODUCING A RUBBERY POLYMER

CROSS-REFERENCE TO RELATED APPLICATION

This is a divisional application Ser. No. 15/771,823 filed on Apr. 27, 2018, and abandoned on Oct. 21, 2020, which claims priorities of Japanese Patent Applications No. 2015-212024 filed on Oct. 28, 2015, No. 2015-212025 filed on Oct. 28, 2015, No. 2015-212026 filed on Oct. 28, 2015, and No. 2015-212027 filed on Oct. 28, 2015, disclosure of which is incorporated herein.

TECHNICAL FIELD

The present invention relates to first to fourth inventions below.

The first invention relates to a graft polymer that has an excellent impact-resistance-imparting effect and that can provide a thermoplastic resin composition excellent in weather resistance and color developability, a production method thereof, a thermoplastic resin composition including the graft copolymer, and a molded article thereof.

The second invention relates to crosslinked particles and graft crosslinked particles that, as modifiers of a thermoplastic resin, can improve the flowability, impact resistance, and abrasion resistance of the resin without impairing its color developability and mold shrinkage rate, a thermoplastic resin composition including the crosslinked particles and/or the graft crosslinked particles, and a molded article thereof.

The third invention relates to crosslinked particles and graft crosslinked particles that, as modifiers of a thermoplastic resin, can improve the flowability, impact resistance, and abrasion resistance of the resin without impairing its color developability and weather resistance, a thermoplastic resin composition including the crosslinked particles and/or the graft crosslinked particles, and a molded article thereof.

The fourth invention relates to a rubbery polymer and a graft copolymer that can provide a molded article excellent in impact resistance, color developability, and molded appearance and production methods thereof. The fourth invention also relates to a thermoplastic resin composition including the graft copolymer and a molded article thereof.

Background Art

Background Art of First Invention

Improving the impact resistance of a resin material offers very big industrial advantages such as widening the application of the material and enabling slimming or upsizing of molded articles. Various techniques for improving the impact resistance of a resin material have been studied.

Conventionally, as a technique for improving the impact resistance of a resin material, incorporation of a graft polymer including a rubber-like polymer as represented by an ABS resin into the resin material has been known.

ABS resins include diene rubber as a rubber component and thus have poor weather resistance, and outdoor use of resin materials reinforced with ABS resins is limited. Various methods of incorporating a graft polymer having a rubber component other than diene rubber have been proposed. For example, the use of polyacrylic acid ester rubber, polyorganosiloxane, or polydimethylsiloxane-polyacrylic acid ester composite rubber as a rubber component has been proposed. Of these, polydimethylsiloxane-acrylic acid ester composite rubber is very excellent in terms of the balance of impact resistance, weather resistance, and economical efficiency.

Polydimethylsiloxane-polyacrylic acid ester composite rubber is typically produced by adding an acrylic acid ester to an emulsion of polydimethylsiloxane in one portion or multiple portions to cause polymerization (PTL 1).

This method generates not only polydimethylsiloxane-polyacrylic acid ester composite rubber but also polydimethylsiloxane and polyacrylic acid ester that have not been combined together and does not readily provide polydimethylsiloxane-polyacrylic acid ester composite rubber having a uniform composition. A resin material including a graft polymer obtained using the resulting polydimethylsiloxane-polyacrylic acid ester composite rubber has poor color developability due to the great difference in refractive index between polydimethylsiloxane and polyacrylic acid ester.

In PTL 2, a thermoplastic resin composition whose color developability is improved by using polydimethylsiloxane-conjugated diene-acrylic acid ester composite rubber is proposed. This thermoplastic resin composition has insufficient weather resistance because conjugated diene is included.

There has been a need for a graft copolymer that has an excellent impact-resistance-imparting effect and that can provide a thermoplastic resin composition that is very excellent in weather resistance and color developability.

Background Art of Second Invention

Thermoplastic resins such as styrene-acrylonitrile copolymer resins, α-methylstyrene-acrylonitrile copolymer resins, and styrene-acrylonitrile-phenylmaleimide copolymer resins are widely used as materials provided with impact resistance, which materials include graft polymers obtained by graft-polymerizing monomers that impart compatibility with these resins onto rubbery polymers and are represented by acrylonitrile-butadiene-styrene (ABS) resins, acrylonitrile-acrylic rubber-styrene (AAS) resins, etc.

ABS resins and AAS resins have poor abrasion resistance to soft cloths such as gauze and cotton work gloves and are prone to wear.

As a resin that provides impact resistance and also has improved abrasion resistance, an acrylonitrile-ethylene.α-olefin-styrene (AES) resin which includes ethylene.α-olefin rubber as a rubbery polymer is known.

In PTL 3, a resin material for sliding that includes a rubber-toughened styrene resin such as an AES resin and an inorganic filler is proposed. However, AES resins include crystalline ethylene components and thus have mold shrinkage rates higher than those of ABS resins and other resins, and when an AES resin is transferred to an existing mold used for ABS resins and other resins, a small molded article is provided. In PTL 3, the inorganic filler is included in a large amount, and thus impact resistance is significantly reduced.

Background Art of Third Invention

Methacrylic resins, polycarbonate resins, polystyrene resins, alicyclic olefin polymers, etc. are known as transparent resins. These transparent resins are industrially mass-produced and are widely used in various fields for their good transparency and color developability in the case of being colored.

In interior and exterior parts applications, etc. in the automotive field, etc., there has recently been a demand for being usable without paint for a reduction in production cost. Accordingly, transparent resins that exhibit good color developability have increasingly been applied.

In particular, methacrylic resins among transparent resins have characteristics outstanding in optical properties such as transparency and surface gloss, mechanical properties, scratch resistance, weather resistance, etc. However, methacrylic resins are poor in impact resistance and abrasion resistance to soft materials such as gauze, and thus, when used without paint, the thickness of a molded article needs to be large. In addition, abrasions occur during assembling or car washing.

As a method for improving the impact resistance and abrasion resistance of a methacrylic resin, dispersion of a graft copolymer such as an acrylonitrile-ethylene.α-olefin-styrene (AES) resin in the methacrylic resin is known (PTL 4). This method improves impact resistance and abrasion resistance but reduces transparency and color developability in the case of being colored.

A transparent acrylic film including a rubber-containing polymer made of a specific monomer component is proposed (PTL 5). The impact resistance and abrasion resistance provided by the rubber-containing polymer proposed here are insufficient.

Background Art of Fourth Invention

Thermoplastic resins such as styrene-acrylonitrile copolymer resins, α-methylstyrene-acrylonitrile copolymer resins, and styrene-acrylonitrile-phenylmaleimide copolymer resins are widely used as materials provided with impact resistance, which materials include graft copolymers obtained by graft-polymerizing monomers that impart compatibility with these resins onto rubbery polymers and are represented by ABS resins, ASA resins, etc. Of these, ASA resins, which include, as a rubbery polymer, a component such as alkyl (meth)acrylate rubber which is saturated rubber, can provide good weather resistance.

However, ASA resins may disadvantageously result in poor appearance due to, for example, a reduction in color developability of a colored molded article or may provide low impact resistance. For the purpose of improving the balance between poor appearance and impact resistance, ASA resins composed of acrylic acid ester rubbery polymers in which rubber particles having different particle size distributions are combined are proposed (PTLs 6 to 8).

To offset the disadvantages of ASA resins, a thermoplastic resin composition in which an AES resin including an ethylene-propylene rubber component and an ASA resin are used in combination is proposed (PTL 9).

The thermoplastic resin composition described above is insufficient in any of impact resistance, weather resistance, color developability, and molded appearance and cannot sufficiently meet the recent strong need.

To improve impact resistance, a graft copolymer obtained by seeded polymerization using a rubber having a uniform particle size is proposed, but it is difficult to prepare rubber particles of 200 nm or more, and the impact-resistance-improving effect is not sufficient (PTL 10).

PTL 1: Japanese Patent Publication H1-190746 A
PTL 2: Japanese Patent Publication 2002-80684 A
PTL 3: Japanese Patent Publication 2011-178831 A
PTL 4: Japanese Patent Publication 2005-132970 A
PTL 5: Japanese Patent Publication 2012-144714 A
PTL 6: Japanese Patent Publication S59-232138 A
PTL 7: Japanese Patent Publication H04-225051 A
PTL 8: Japanese Patent Publication H08-134312 A
PTL 9: Japanese Patent Publication 2004-346187 A
PTL 10: Japanese Patent Publication 2000-344841 A

SUMMARY OF INVENTION

An object of the first invention is to provide a graft copolymer that has an excellent impact-resistance-imparting effect and that can provide a thermoplastic resin composition excellent in weather resistance and color developability, a production method thereof, a thermoplastic resin composition including the graft copolymer, and a molded article thereof.

Inventors of the first invention have found that the problems described above can be solved by producing polyorganosiloxane-polyacrylic acid ester composite rubber used for a graft copolymer by a specific technique.

The first invention is summarized as described below.

[1] A graft copolymer (C) obtained by graft-polymerizing one or two or more monomers (B), which are selected from (meth)acrylic acid esters, aromatic vinyls, vinyl cyanides, N-substituted maleimides, and maleic acid, onto a composite rubber-like polymer (A), which is obtained by polymerizing a mixture (Ac) containing a polyorganosiloxane (Aa) and an acrylic acid ester (Ab) after forming a miniemulsion in water solvent.

[2] The graft copolymer (C) according to [1], wherein the polyorganosiloxane (Aa) has a refractive index of 1.470 to 1.600.

[3] The graft copolymer (C) according to [1] or [2], wherein the composite rubber-like polymer (A) has an average particle size of 10 to 2000 nm.

[4] A method for producing the graft copolymer (C) according to any one of [1] to [3], the method comprising: a step of miniemulsifying the mixture (Ac) containing the polyorganosiloxane (Aa) and the acrylic acid ester (Ab) in water solvent in the presence of a hydrophobic stabilizer and an emulsifier; and a step of polymerizing the resulting miniemulsion.

[5] A thermoplastic resin composition comprising: the graft copolymer (C) according to any one of [1] to [3]; and a thermoplastic resin (D).

[6] The thermoplastic resin composition according to [5], wherein a refractive index difference between the composite rubber-like polymer (A) in the graft copolymer (C) and the thermoplastic resin (D) is 0.02 or less.

[7] A molded article obtained by molding the thermoplastic resin composition according to [5] or [6].

An object of the second invention is to provide crosslinked particles and graft crosslinked particles that, as modifiers of a thermoplastic resin, can improve the flowability, impact resistance, and abrasion resistance of the resin without impairing its color developability and mold shrinkage rate, a thermoplastic resin composition including the crosslinked particles and/or the graft crosslinked particles, and a molded article thereof.

Inventors of the second invention have found that the above-described problems can be solved by crosslinked particles obtained by polymerization using a di(meth)acrylic acid ester having a specific molecular weight as a crosslinking agent and, furthermore, by graft crosslinked particles obtained by graft-polymerizing a monomer onto the crosslinked particles.

The second invention is summarized as described below.

[8] Crosslinked particles (A-I) obtained by polymerizing a monomer mixture (i-I) containing a di(meth)acrylic acid ester (a) having a number average molecular weight (Mn) of 800 to 9,000 and represented by formula (1):

[Chem. 1]

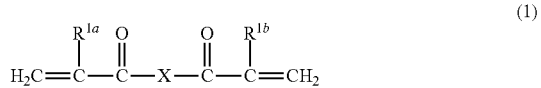
(1)

wherein X represents a divalent residue constituted by at least one diol selected from polyalkylene glycols, polyester diols, and polycarbonate diols, and $R^{1a}$ and $R^{1b}$ each independently represent H or $CH_3$.

[9] The crosslinked particles (A-I) according to [8], wherein the X is a polytetramethylene glycol residue.

[10] The crosslinked particles (A-I) according to [8] or [9], wherein a content of the di(meth)acrylic acid ester (a) in the monomer mixture (i-I) is 0.1% to 90% by mass.

[11] The crosslinked particles (A-I) according to any one of [8] to [10], wherein the monomer mixture (i-I) contains the di(meth)acrylic acid ester (a), an aromatic vinyl (b), and a vinyl cyanide (c), and a proportion of the aromatic vinyl (b) in 100% by mass of a total of the aromatic vinyl (b) and the vinyl cyanide (c) is 60% to 90% by mass.

[12] The crosslinked particles (A-I) according to any one of [8] to [11], wherein the crosslinked particles (A-I) have an average particle size of 0.07 to 5.0 μm.

[13] A method for producing the crosslinked particles (A-I) according to any one of [8] to [12], the method comprising: a step of miniemulsifying the monomer mixture (i-I) containing the di(meth)acrylic acid ester (a) in water solvent in the presence of a hydrophobic stabilizer and an emulsifier; and a step of polymerizing the resulting miniemulsion.

[14] Graft crosslinked particles (B-I) obtained by graft-polymerizing a monomer onto the crosslinked particles (A-I) according to any one of [8] to [12].

[15] The graft crosslinked particles (B-I) according to [14], wherein the graft crosslinked particles (B-I) are obtained by graft-polymerizing 10% to 60% by mass of the monomer onto 40% to 90% by mass of the crosslinked particles (A-I) (provided that a total amount of the crosslinked particles (A-I) and the monomer is 100% by mass), the monomer includes at least an aromatic vinyl and a vinyl cyanide, and a proportion of the aromatic vinyl in 100% by mass of a total of the aromatic vinyl and the vinyl cyanide is 60% to 99% by mass.

[16] The graft crosslinked particles (B-I) according to [14] or [15], wherein the graft crosslinked particles (B-I) have a graft rate of 23% to 100%.

[17] A thermoplastic resin composition comprising: the crosslinked particles (A-I) according to any one of [8] to [12] and/or the graft crosslinked particles (B-I) according to any one of claims 14 to 16; and a thermoplastic resin (D-I).

[18] A molded article obtained by molding the thermoplastic resin composition according to [17].

An object of the third invention is to provide crosslinked particles and graft crosslinked particles that, as modifiers of a thermoplastic resin, can improve the flowability, impact resistance, and abrasion resistance of the resin without impairing its color developability and weather resistance, a thermoplastic resin composition including the crosslinked particles and/or the graft crosslinked particles, and a molded article thereof.

Inventors of the third invention have found that the above-described problems can be solved by crosslinked particles obtained by polymerization using a di(meth)acrylic acid ester having a specific molecular weight as a crosslinking agent and, furthermore, by graft crosslinked particles obtained by graft-polymerizing a monomer onto the crosslinked particles.

The third invention is summarized as described below.

[19] Crosslinked particles (A-II) having a volume average particle size of 0.07 to 2.0 μm and obtained by polymerizing a monomer mixture (i-II) containing a di(meth)acrylic acid ester (a) and a mono(meth)acrylic acid component (d), wherein a content of the di(meth)acrylic acid ester (a) in 100% by mass of the monomer mixture (i-II) is 20% to 80% by mass, the di(meth)acrylic acid ester (a) having a number average molecular weight of 800 to 9,000 and being represented by formula (1):

[Chem. 2]

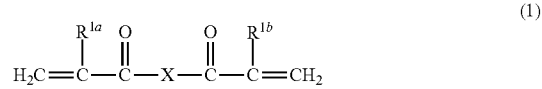
(1)

wherein X represents a divalent residue constituted by at least one diol selected from polyalkylene glycols, polyester diols, and polycarbonate diols, and $R^{1a}$ and $R^{1b}$ each independently represent H or $CH_3$.

[20] The crosslinked particles (A-II) according to [19], wherein the monomer mixture (i-II) contains at least styrene as an additional vinyl compound (e).

[21] The crosslinked particles (A-II) according to [19] or [20], wherein the X is a polytetramethylene glycol residue.

[22] The crosslinked particles (A-II) according to any one of [19] to [21], wherein a content of the mono(meth)acrylic acid ester (d) in the monomer mixture (i-II) is 1% to 80% by mass.

[23] A method for producing the crosslinked particles (A-II) according to any one of [19] to [22], the method comprising: a step of miniemulsifying the monomer mixture (i-II) containing the di(meth)acrylic acid ester (a) and the mono(meth)acrylic acid component (d) in water solvent in the presence of a hydrophobic stabilizer and an emulsifier; and a step of polymerizing the resulting miniemulsion.

[24] Graft crosslinked particles (B-II) obtained by graft-polymerizing one or more monomers selected from (meth) acrylic acid esters, aromatic vinyls, vinyl cyanides, maleimides, and maleic anhydride onto the crosslinked particles (A-II) according to any one of [19] to [22].

[25] The graft crosslinked particles (B-II) according to [24], wherein the graft crosslinked particles (B-II) are obtained by graft-polymerizing 10% to 60% by mass of the monomer onto 40% to 90% by mass of the crosslinked particles (A-II) (provided that a total amount of the crosslinked particles (A-II) and the monomer is 100% by mass), the monomer includes at least methyl methacrylate and methyl acrylate, and a proportion of the methyl methacrylate in 100% by mass of a total of the methyl methacrylate and the methyl acrylate is 90% to 99.9% by mass.

[26] The graft crosslinked particles (B-II) according to [24] or [25], wherein the graft crosslinked particles (B-II) have a graft rate of 23% to 100%.

[27] A thermoplastic resin composition comprising: the crosslinked particles (A-II) according to any one of [19] to 22 and/or the graft crosslinked particles (B-II) according to any one of [23] to [26]; and a thermoplastic resin (D-II).

[28] A molded article obtained by molding the thermoplastic resin composition according to [27].

An object of the fourth invention is to provide a rubbery polymer and a graft copolymer that can provide a thermoplastic resin molded article excellent in impact resistance, color developability, and molded appearance, production methods thereof, a thermoplastic resin composition including the graft copolymer, and a molded article thereof.

Inventors of the fourth invention have found that the above object can be achieved by a graft copolymer obtained using a rubbery polymer obtained by miniemulsion polymerization of a mixture containing an alkyl (meth)acrylate, a hydrophobe, and an emulsifier.

The fourth invention is summarized as described below.

[29] A rubbery polymer (A-III) that is a miniemulsion polymerization reaction product of an alkyl (meth)acrylate.

[30] The rubbery polymer (A-III) according to [29], wherein the rubbery polymer (A-III) is a miniemulsion polymerization reaction product of a mixture (i-III) containing an alkyl (meth)acrylate, a hydrophobe, and an emulsifier.

[31] The rubbery polymer (A-III) according to [30], wherein the mixture (i-III) further contains a crosslinking agent.

[32] The rubbery polymer (A-III) according to any one of [29] to [31], wherein when an average particle size (X) is represented by X; a largest 10% frequency particle size (Y), which is a particle size at which a cumulative frequency from a largest value in a particle size distribution curve reaches 10%, is represented by Y; and a smallest 10% frequency particle size (Z), which is a particle size at which a cumulative frequency from a smallest value in the particle size distribution curve reaches 10%, is represented by Z, the average particle size (X), the largest 10% frequency particle size (Y), and the smallest 10% frequency particle size (Z) satisfy (2) or (3) below:

(2) The average particle size (X) satisfies X≤300 nm, the largest 10% frequency particle size (Y) satisfies Y≤1.6X, and the smallest 10% frequency particle size (Z) satisfies Z≥0.7X; or (3) The average particle size (X) satisfies X=300 to 800 nm, the largest 10% frequency particle size (Y) satisfies Y≤1.7X, and the smallest 10% frequency particle size (Z) satisfies Z≥0.6X.

[33] A graft copolymer (B-III) comprising: the rubbery polymer (A-III) according to any one of [29] to [32]; and at least one monomer selected from aromatic vinyl compounds, (meth)acrylic acid esters, and vinyl cyanide compounds graft-polymerized onto the rubbery polymer (A-III).

[34] A method for producing the rubbery polymer (A-III) according to any one of [29] to [32], the method comprising: a step of miniemulsifying the mixture (i-III) containing an alkyl (meth)acrylate, a hydrophobe, and an emulsifier; and a step of polymerizing the resulting miniemulsion.

[35] A method for producing the graft copolymer (B-III) according to [33], the method comprising: a step of miniemulsifying the mixture (i-III) containing an alkyl (meth) acrylate, a hydrophobe, and an emulsifier; a step of polymerizing the resulting miniemulsion; and a step of graft-polymerizing at least one monomer selected from aromatic vinyl compounds, (meth)acrylic acid esters, and vinyl cyanide compounds onto the resulting rubbery polymer (A-III).

[36] A thermoplastic resin composition comprising the graft copolymer (B-III) according to [33].

[37] A molded article obtained by molding the thermoplastic resin composition according to [36].

Advantageous Effects of Invention

By incorporating the graft copolymer of the first invention into a thermoplastic resin, a thermoplastic resin composition excellent in weather resistance and color developability as well as in impact resistance and a molded article thereof can be achieved.

According to the crosslinked particles and the graft crosslinked particles of the second invention, the flowability, impact resistance, and abrasion resistance of a thermoplastic resin can be improved without impairing its color developability and mold shrinkage rate, and a thermoplastic resin composition excellent in flowability, color developability, dimensional stability, shape accuracy, impact resistance, and abrasion resistance and a molded article thereof can be provided.

According to the crosslinked particles and the graft crosslinked particles of the third invention, the flowability, impact resistance, and abrasion resistance of a thermoplastic resin can be improved without impairing its color developability and weather resistance, and a thermoplastic resin composition excellent in all characteristics: flowability, color developability, weather resistance, impact resistance, and abrasion resistance, and a molded article thereof can be provided.

According to the rubbery polymer and the graft copolymer of the fourth invention, a thermoplastic resin composition and a molded article that are excellent in impact resistance, molded appearance, and color developability can be provided.

BRIEF DESCRIPTION OF DRAWING

FIG. 1 illustrates a method for evaluating abrasion resistance in EXAMPLES.

DESCRIPTION OF EMBODIMENTS

An embodiment of the first invention will now be described in detail.

In this description, "(meth)acrylic" means one or both of "acrylic" and "methacrylic". The same applies to "(meth) acrylate".

"Molded article" means a substance obtained by molding a thermoplastic resin composition.

Embodiment of First Invention

[Graft Copolymer (C)]

A graft copolymer (C) of the first invention is obtained by graft-polymerizing one or two or more monomers (B) selected from (meth)acrylic acid esters, aromatic vinyls, vinyl cyanides, N-substituted maleimides, and maleic acid onto a composite rubber-like polymer (A) (hereinafter also referred to as "the composite rubber-like polymer (A) of the first invention") obtained by miniemulsifying a mixture (Ac) containing a polyorganosiloxane (Aa) and an acrylic acid ester (Ab) in water solvent and then polymerizing the polyorganosiloxane (Aa) and the acrylic acid ester (Ab) in the miniemulsion.

By polymerizing the mixture (Ac) of the polyorganosiloxane (Aa) and the acrylic acid ester (Ab) after being miniemulsified, the composition of each of the resulting composite rubber-like polymer (A) particles tends to be uniform. A thermoplastic resin composition obtained by incorporating the graft copolymer (C) produced using the composite rubber-like polymer (A) has improved color developability.

In commonly used emulsion polymerization in which the mixture (Ac) and a radical initiator are added in the presence of water solvent and an emulsifier to cause polymerization and in seeded polymerization as described in PTL 1 in which an acrylic acid ester is added in the presence of an emulsion of a polyorganosiloxane to cause polymerization, the composition of composite rubber-like polymer particles is unlikely to be uniform, and, in some cases, particles of the polyorganosiloxane alone or of the polyacrylic acid ester alone are formed. A graft copolymer obtained using such a composite rubber-like polymer provides a thermoplastic resin composition having poor color developability.

The first invention is characterized by producing the composite rubber-like polymer (A) by a miniemulsion polymerization method including two steps: a step of miniemulsifying the mixture (Ac) of the polyorganosiloxane (Aa) and the acrylic acid ester (Ab) and a subsequent polymerization step.

<Composite Rubber-Like Polymer (A)>

The composite rubber-like polymer (A) of the first invention is obtained by polymerizing the mixture (Ac) containing the polyorganosiloxane (Aa) and the acrylic acid ester (Ab) after forming a miniemulsion in water solvent.

«Polyorganosiloxane (Aa)»

The polyorganosiloxane (Aa) in the first invention is a polymer whose main chain is a siloxane unit which is a silicon-oxygen bond, and the polyorganosiloxane (Aa) has two organic groups (including hydrogen atoms) on a silicon atom.

Examples of the organic groups on the silicon atom of the polyorganosiloxane (Aa) include, but are not limited to, a hydrogen atom, an alkyl group, an aryl group, a vinyl group, an amino group, an epoxy group, an alicyclic epoxy group, a mercapto group, and a carboxyl group. As the organic groups, alkyl groups having 1 to 6 carbon atoms, a vinyl group, and an aryl group are particularly preferred. The polyorganosiloxane (Aa) may have only one of these organic groups or may have two or more of them.

The viscosity of the polyorganosiloxane (Aa) is not particularly limited as long as the mixture (Ac) can be obtained by mixing the polyorganosiloxane (Aa) with the acrylic acid ester (Ab). When the viscosity of the polyorganosiloxane (Aa) is oily, such as 10 to 10000 $mm^2/s$, preferably 100 to 5000 $mm^2/s$, the production stability of the composite rubber-like polymer (A) tends to be excellent. The viscosity of the polyorganosiloxane (Aa) is a value measured at 25° C. using a kinematic viscometer.

The refractive index of the polyorganosiloxane (Aa) is not particularly limited but preferably in the range of 1.470 to 1.600 for the following reasons. When the graft copolymer (C) of the first invention is incorporated into a thermoplastic resin (D) to obtain a thermoplastic resin composition, the thermoplastic resin composition obtained has good color developability if the refractive index of the thermoplastic resin (D) and the refractive index of the composite rubber-like polymer (A) in the graft copolymer (C) close to each other. The refractive index of the below-described thermoplastic resin (D) used for a thermoplastic resin composition of the first invention is in the range of 1.470 to 1.600 in many cases. Therefore, the refractive index of the polyorganosiloxane (Aa) is preferably in the range of 1.470 to 1.600. Although it depends, for example, on the conditions for producing the composite rubber-like polymer (A), when the refractive index of the polyorganosiloxane (Aa) is in the range of 1.470 to 1.600, the composite rubber-like polymer (A) having a refractive index of about 1.460 to 1.590, which is close to the refractive index of the thermoplastic resin (D), can be produced.

When the difference in refractive index between the composite rubber-like polymer (A) of the first invention and the thermoplastic resin (D) is 0.02 or less and the thermoplastic resin (D) has transparency, a thermoplastic resin composition having particularly good color developability is provided, and, in addition, the transparency of the thermoplastic resin composition also tends to be high unless a color is imparted, for example, by the blending of a colorant. Also for the reason that the difference in refractive index between the composite rubber-like polymer (A) and the thermoplastic resin (D) is likely to be 0.02 or less, the refractive index of the polyorganosiloxane (Aa) is preferably 1.470 to 1.600.

When the polyorganosiloxane (Aa) has one or more aryl groups as organic groups, the refractive index of the polyorganosiloxane (Aa) tends to be in the range of 1.470 to 1.600.

Examples of aryl groups include a phenyl group, a naphthyl group, an alkyl nuclear-substituted phenyl group, an alkyl nuclear-substituted naphthyl group, a halogen nuclear-substituted phenyl group, and a halogen nuclear-substituted naphthyl group, and preferred are a phenyl group and a nuclear-substituted phenyl group. Examples of alkyl groups of the alkyl nuclear-substituted phenyl group and the alkyl nuclear-substituted naphthyl group include alkyl groups having 1 to 12 carbon atoms.

Examples of the polyorganosiloxane (Aa) having an aryl group include industrially available products such as "KF-53", "KF-54", "X-21-3265", "KF-54SS", "KF-56", "HIVAC-F-4", and "HIVAC-F-5" available from Shin-Etsu Chemical Co., Ltd.

The refractive index of the polyorganosiloxane (Aa) can be measured similarly to the refractive index of the composite rubber-like polymer (A), which will be described in the section of EXAMPLES below. For commercially available products, catalogue values can be employed.

The polyorganosiloxane (Aa) may be used alone or as a mixture of two or more.

«Acrylic Acid Ester (Ab)»

Examples of the acrylic acid ester (Ab) in the first invention include acrylic acid alkyl esters having alkyl groups of 1 to 12 carbon atoms; and acrylic acid aryl esters having aromatic hydrocarbon groups such as a phenyl group and a benzyl group. The alkyl groups of the acrylic acid alkyl esters and the aryl groups of the acrylic acid aryl ester may be substituted with substituents such as a hydroxyl group.

Specific examples of the acrylic acid ester (Ab) include methyl acrylate, ethyl acrylate, n-propyl acrylate, i-propyl acrylate, n-butyl acrylate, i-butyl acrylate, t-butyl acrylate, amyl acrylate, isoamyl acrylate, octyl acrylate, 2-ethylhexyl acrylate, decyl acrylate, lauryl acrylate, stearyl acrylate, lauryl acrylate, stearyl acrylate, cyclohexyl acrylate, pentyl acrylate, phenyl acrylate, benzyl acrylate, 2-hydroxyethyl acrylate, and 2-hydroxypropyl acrylate. Of these, n-butyl acrylate, 2-ethylhexyl acrylate, and ethyl acrylate are preferred.

The acrylic acid ester (Aa) may be used alone or as a mixture of two or more.

The amount of the acrylic acid ester (Ab) used in the production of the composite rubber-like polymer (A) of the first invention is preferably 10% to 99% by mass, particularly preferably 20% to 95% by mass, relative to 100% by mass of the total of the polyorganosiloxane (Aa) and the acrylic acid ester (Ab). When the amount of the acrylic acid ester (Ab) used is in the above range, the thermoplastic resin composition obtained by incorporating the graft copolymer (C) of the first invention is provided with good color developability and good impact resistance.

<Polyfunctional Compound>

A polyfunctional compound may optionally be added to the mixture (Ac) containing the polyorganosiloxane (Aa) and the acrylic acid ester (Ab) used to produce the composite rubber-like polymer (A) of the first invention. Due to the addition of a polyfunctional compound, the thermoplastic resin composition obtained by incorporating the graft copolymer (C) of the first invention is provided with good color developability and good impact resistance.

The polyfunctional compound has two or more carbon-carbon double bonds in its molecule and is not particularly limited. Examples of polyfunctional compounds include divinylbenzene, allyl (meth)acrylate, ethylene glycol di(meth)acrylate, propylene glycol di(meth)acrylate, 1,3-butylene di(meth)acrylate, 1,4-butylene glycol di(meth)acrylate, tetraethylene glycol di(meth)acrylate, tetradecaethylene glycol di(meth)acrylate, triallyl cyanurate, triallyl isocyanurate, and pentaerythritol tetra(meth)acrylate.

The polyfunctional compounds may be used alone or in a combination of two or more.

The polyfunctional compound can be used so as to replace part of the acrylic acid ester (Ab) in the mixture (Ac) containing the polyorganosiloxane (Aa) and the acrylic acid ester (Ab). The polyfunctional compound is preferably added so as to replace 0.1% to 5% by mass, particularly 0.2% to 3% by mass, and especially 0.5% to 2% by mass of the acrylic acid ester (Ab) (100% by mass) since the thermoplastic resin composition obtained by incorporating the graft copolymer (C) of the first invention is provided with good impact resistance.

«Method for Producing Composite Rubber-Like Polymer (A)»

The composite rubber-like polymer (A) of the first invention is obtained by what is called miniemulsion polymerization in which the mixture (Ac) containing the polyorganosiloxane (Aa), the acrylic acid ester (Ab), and optionally a polyfunctional compound is sheared in water solvent in the presence of an emulsifier, preferably in the presence of an emulsifier and a hydrophobic stabilizer, to form a miniemulsion and then the miniemulsion is copolymerized in the presence of a radical initiator. The radical initiator may be added before or after the miniemulsion is formed and may be added in one portion, in multiple portions, or in a continuous manner.

From the viewpoint of workability, stability, production efficiency, etc., the amount of water solvent used in the miniemulsification is preferably about 100 to 500 parts by mass relative to 100 parts by mass of the mixture (Ac).

As a method for applying shear in forming the miniemulsion, any known method can be used. The shear may be applied in one portion, in multiple portions, in a continuous manner, or in a circular manner. In general, the miniemulsion can be formed by using a high shear device that forms droplets having diameters of about 10 to 2000 nm.

Examples of usable high shear devices that form miniemulsions include, but are not limited to, emulsification devices including high-pressure pumps and interaction chambers and devices that form miniemulsions with ultrasonic energy or a high frequency. Examples of emulsification devices including high-pressure pumps and interaction chambers include "Microfluidizer" available from Powrex corp. Examples of devices that form miniemulsions with ultrasonic energy or a high frequency include "Sonic Dismembrator" available from Fisher Scient and "ULTRASONIC HOMOGENIZER" available from Nihonseiki Kaisha Ltd.

Examples of emulsifiers include anionic surfactants, nonionic surfactants, and amphoteric surfactants. Examples of emulsifiers include anionic surfactants such as sulfates of higher alcohols, alkylbenzene sulfonates, fatty acid sulfonates, phosphates (e.g., ammonium monoglyceride phosphate), fatty acid salts (e.g., dipotassium alkenyl succinate), and salts of amino acid derivatives; commonly used nonionic surfactants such as alkyl-ester-type polyethylene glycol surfactants, alkyl-ether-type polyethylene glycol surfactants, and alkylphenyl-ether-type polyethylene glycol surfactants; and amphoteric surfactants having carboxylates, sulfates, sulfonates, phosphates, and the like as anionic moieties and amine salts, quarternary ammonium salts, and the like as cationic moieties. The emulsifiers may be used alone or in a combination of two or more.

The addition amount of emulsifier is typically 10 parts by mass or less, preferably, for example, 0.01 to 10 parts by mass, relative to 100 parts by mass of the mixture (Ac).

When the miniemulsion is formed, adding a hydrophobic stabilizer tends to further improve the production stability of the miniemulsion. Examples of hydrophobic stabilizers include unpolymerizable hydrophobic compounds, for example, hydrocarbons having 10 to 30 carbon atoms, alcohols having 10 to 30 carbon atoms, hydrophobic polymers having mass average molecular weights (Mw) of less than 10000, tetraalkylsilanes, hydrophobic monomers, for example, vinyl esters of alcohols having 10 to 30 carbon atoms, carboxylic acid vinyl esters having 10 to 30 carbon atoms, (meth)acrylic acid esters having 8 to 30 carbon atoms, p-alkylstyrenes, hydrophobic chain transfer agents, and hydrophobic peroxides. The hydrophobic stabilizers may be used alone or as a mixture of two or more.

Specific examples of the hydrophobic stabilizer include decane, undecane, dodecane, tridecane, tetradecane, pentadecane, hexadecane, olive oil, polystyrenes having mass average molecular weights (Mw) of 500 to 5000, siloxanes having mass average molecular weights (Mw) of 500 to 5000, cetyl alcohol, stearyl alcohol, palmityl alcohol, behenyl alcohol, p-methylstyrene, 2-ethylhexyl acrylate, decyl acrylate, stearyl acrylate, lauryl methacrylate, stearyl methacrylate, lauryl mercaptan (normal dodecyl mercaptan), and hydrophobic peroxides such as lauroyl peroxide.

When a hydrophobic stabilizer is used, the amount thereof is preferably 0.05 to 5 parts by mass relative to 100 parts by mass of the mixture (Ac). When the addition amount of hydrophobic stabilizer is not less than the above lower limit, the production stability of the composite rubber-like polymer (A) can be further improved. When the addition amount of hydrophobic stabilizer is not more than the above upper limit, there is a tendency that the color developability and impact resistance of a thermoplastic resin composition obtained by incorporating the graft copolymer (C) of the first invention can be good.

As a radical initiator used in the polymerization step subsequent to the miniemulsification step, a known one can be used. Examples of radical initiators include azo polymerization initiators, photopolymerization initiators, inorganic peroxides, organic peroxides, and redox initiators containing organic peroxides, transition metals, and reducing agents in combination. Of these, azo polymerization initiators, inorganic peroxides, organic peroxides, and redox initiators, which are capable of initiating polymerization upon heating, are preferred. The radical initiators may be used alone or in a combination of two or more.

Examples of azo polymerization initiators include 2,2'-azobis(4-methoxy-2,4-dimethylvaleronitrile), 2,2'-azobis(2,4-dimethylvaleronitrile), 2,2'-azobisisobutyronitrile, 2,2'-azobis(2-methylbutyronitrile), 1,1'-azobis(cyclohexane-1-carbonitrile), 1-[(1-cyano-1-methylethyl)azo]formamide, 4,4'-azobis(4-cyanovaleric acid), dimethyl 2,2'-azobis(2-methyl propionate), dimethyl 1,1'-azobis(1-cychloexanecarboxylate), 2,2'-azobis[2-methyl-N-(2-hydroxyethyl)propionamide], 2,2'-azobis(N-butyl-2-methylpropionamide), 2,2'-azobis(N-cyclohexyl-2-methylpropionamide), 2,2'-azobis[2-(2-imidazolin-2-yl)propane], and 2,2'-azobis(2,4,4-trimethylpentane).

Examples of inorganic peroxides include potassium persulfate, sodium persulfate, ammonium persulfate, and hydrogen peroxide.

Examples of organic peroxides include peroxyester compounds. Specific examples thereof include α, α'-bis(neodecanoylperoxy)diisopropylbenzene, cumyl peroxyneodecanoate, 1,1,3,3-tetramethylbutyl peroxyneodecanoate, 1-cyclohexyl-1-methylethyl peroxyneodecanoate, t-hexyl peroxyneodecanoate, t-butyl peroxyneodecanoate, t-hexyl peroxypivalate, t-butyl peroxypivalate, 1,1,3,3-tetramethylbutyl peroxy-2-ethylhexanoate, 2,5-dimethyl-2,5-bis(2-ethylhexanoylperoxy)hexane, 1-cyclohexyl-1-methylethyl peroxy-2-ethylhexanoate, t-hexyl peroxy-2-hexylhexanoate, t-butyl peroxy-2-hexylhexanoate, t-butyl peroxyisobutyrate, t-hexyl peroxyisopropylmonocarbonate, t-butyl peroxymaleic acid, t-butyl peroxy-3,5,5-trimethylhexanoate, t-butyl peroxylaurate, 2,5-dimethyl-2,5-bis(m-toluoylperoxy)hexane, t-butyl peroxyisopropylmonocarbonate, t-butyl peroxy-2-ethylhexylmonocarbonate, t-hexyl peroxybenzoate, 2,5-dimethyl-2,5-bis(benzoylperoxy)hexane, t-butyl peroxyacetate, t-butyl peroxy-m-toluoylbenzoate, t-butyl peroxybenzoate, bis(t-butylperoxy) isophthalate, 1,1-bis(t-hexylperoxy)3,3,5-trimethylcyclohexane, 1,1-bis(t-hexylperoxy)cyclohexane, 1,1-bis(t-butylperoxy)3,3,5-trimethylcyclohexane, 1,1-bis(t-butylperoxy)cyclohexane, 1,1-bis(t-butylperoxy)cyclododecane, 2,2-bis(t-butylperoxy)butane, n-butyl 4,4-bis(t-butylperoxy)valerate, 2,2-bis(4,4-di-t-butylperoxycyclohexyl)propane, α, α'-bis(t-butylperoxide)diisopropylbenzene, dicumyl peroxide, 2,5-dimethyl-2,5-bis(t-butylperoxy)hexane, t-butyl cumyl peroxide, di-t-butylperoxide, cumene hydroperoxide, diisopropylbenzene hydroperoxide, t-butyl hydroperoxide, benzoyl peroxide, lauroyl peroxide, dimethylbis(t-butylperoxy)hexyne-3, bis(t-butylperoxyisopropyl)benzene, bis(t-butylperoxy)trimethylcyclohexane, butyl-bis(t-butylperoxy)valerate, t-butyl peroxy-2-ethylhexanoate, dibenzoyl peroxide, paramenthane hydroperoxide, and t-butyl peroxybenzoate.

As a redox initiator, a combination of an organic peroxide, ferrous sulfate, a chelating agent, and a reducing agent is preferred. Examples include a combination of cumene hydroperoxide, ferrous sulfate, sodium pyrophosphate, and dextrose and a combination of t-butyl hydroperoxide, sodium formaldehyde sulfoxylate (Rongalite), ferrous sulfate, and disodium ethylenediaminetetraacetate.

The addition amount of radical initiator is typically 5 parts by mass or less, preferably 3 parts by mass or less, for example 0.001 to 3 parts by mass, relative to 100 parts by mass of the acrylic acid ester (Ab) (in the case where a polyfunctional compound is used, the total of the acrylic acid ester (Ab) and the polyfunctional compound). As described above, the radical initiator may be added before or after the miniemulsion is formed and may be added in one portion, in multiple portions, or in a continuous manner.

In the production of the composite rubber-like polymer (A), a chain transfer agent may optionally be added. Examples of chain transfer agents include mercaptans (e.g., octyl mercaptan, n- or t-dodecyl mercaptan, n-hexadecyl mercaptan, n- or t-tetradecyl mercaptan), allyl compounds (allyl sulfonic acid, methallyl sulfonic acid, and sodium salts thereof), and α-methylstyrene dimers. The chain transfer agents may be used alone or in a combination of two or more. Preferred chain transfer agents are mercaptans in terms of ease of control of molecular weight.

When a chain transfer agent is used, it may be added in one portion, in multiple portions, or in a continuous manner. The addition amount of chain transfer agent is typically 2.0 parts by mass or less, preferably, for example, 0.01 to 2.0 parts by mass, relative to 100 parts by mass of the acrylic acid ester (Ab) (in the case where a polyfunctional compound is used, the total of the acrylic acid ester (Ab) and the polyfunctional compound).

The polymerization step subsequent to the miniemulsification step is typically performed at 40° C. to 95° C. for about 0.5 to 8 hours following the miniemulsification step.

The particle size (average particle size) of the composite rubber-like polymer (A) of the first invention produced through the above-described miniemulsification step and the subsequent polymerization step is preferably 10 to 2000 nm, more preferably 60 to 1000 nm, particularly preferably 80 to 600 nm. When the particle size of the composite rubber-like polymer (A) is in the above range, the thermoplastic resin composition obtained by incorporating the graft copolymer (C) of the first invention tends to have good impact resistance.

The particle size of the composite rubber-like polymer (A) may be controlled by any method, for example, by adjusting the type or amount of emulsifier used and the shear force during the production of the miniemulsion.

Specifically, the average particle size of the composite rubber-like polymer (A) is measured by the method described in the section of EXAMPLES below.

<Monomer (B)>

The graft copolymer (C) of the first invention is obtained by graft-polymerizing a monomer (B) onto the composite rubber-like polymer (A) produced as described above.

The monomer (B) is one or two or more selected from (meth)acrylic acid esters, aromatic vinyls, vinyl cyanides, N-substituted maleimides, and maleic acid. The monomer (B) can be selected according to the compatibility with the thermoplastic resin (D) described below or to the intended use. For example, the use of an aromatic vinyl tends to provide good moldability. The use of a vinyl cyanide can improve chemical resistance, impact resistance, and compatibility with the thermoplastic resin (D) having polarity. The use of a methacrylic acid ester can provide a molded article with improved surface hardness and surface appearance. The use of an N-substituted maleimide can improve heat resistance.

Examples of (meth)acrylic acid esters include methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, amyl (meth)acrylate, isoamyl (meth)acrylate, octyl (meth)acrylate, 2-ethylhexyl (meth)acrylate, decyl (meth)acrylate, lauryl (meth)acrylate, cyclohexyl (meth)acrylate, benzyl (meth)acrylate, and phenyl (meth)acrylate.

Examples of aromatic vinyls include styrene, α-methylstyrene, o-, m-, or p-methylstyrene, vinyl xylene, p-t-butylstyrene, and ethylstyrene.

Examples of vinyl cyanides include acrylonitrile and methacrylonitrile.

Examples of N-substituted maleimides include N-cyclohexylmaleimide and N-phenylmaleimide.

Examples of maleic acid include maleic acid and maleic anhydride.

When a combination of a methacrylic acid ester and an acrylic acid ester is used as the monomer (B), better results in terms of thermal stability are obtained as compared to when a methacrylic acid ester is used alone. In this case, it is preferable to use the methacrylic acid ester in an amount of 70% to 99.5% by mass and the acrylic acid ester in an amount of 0.5% to 30% by mass (provided that the total amount of the methacrylic acid ester and the acrylic acid ester is 100% by mass).

When a combination of an aromatic vinyl and a vinyl cyanide is used as the monomer (B), better results in terms of compatibility with the thermoplastic resin (D) are obtained. In this case, it is preferable to use the aromatic vinyl in an amount of 60% to 99% by mass and the vinyl cyanide in an amount of 1% to 40% by mass (provided that the total amount of the aromatic vinyl and the vinyl cyanide is 100% by mass).

The proportions of the composite rubber-like polymer (A) and the monomer (B) used in graft polymerization are not particularly limited, but, in general, the proportion of the composite rubber-like polymer (A) is 10% to 80% by mass, preferably 40% to 75% by mass, and the proportion of the monomer (B) is 20% to 90% by mass, preferably 25% to 60% by mass (provided that the total amount of the composite rubber-like polymer (A) and the monomer (B) is 100% by mass). When the proportions of the composite rubber-like polymer (A) and the monomer (B) are in the above ranges, productivity and impact resistance of the graft copolymer (C) are good, and, in addition, the color developability and impact resistance of a thermoplastic resin composition obtained by incorporating the graft copolymer (C) and a molded article thereof tend to improve.

<Method for Producing Graft Copolymer (C)>

The method for graft-polymerizing the monomer (B) onto the composite rubber-like polymer (A) is not particularly limited. Since the composite rubber-like polymer (A) is prepared by miniemulsion polymerization and provided in the form of emulsified latex, the graft polymerization is preferably carried out also by emulsion polymerization. Examples of emulsion graft polymerization include a method in which the monomer (B) is added in one portion, in a continuous manner, or in an intermittent manner in the presence of an emulsion of the composite rubber-like polymer (A) to cause radical polymerization. In the graft polymerization, a chain transfer agent for molecular weight adjustment and graft rate control, a known inorganic electrolyte for adjusting the viscosity and pH of latex, etc. can be used. The type and addition amount of these are not particularly limited. In the emulsion graft polymerization, various emulsifiers can be used as required. As a chain transfer agent, emulsifier, and radical initiator, for example, those exemplified as those used in the production of the composite rubber-like polymer (A) can be used.

The method for obtaining the graft copolymer (C) in the form of granules from the emulsion of the graft copolymer (C) produced as described above is not particularly limited. Examples include a method in which the emulsion is put in hot water containing a dissolved coagulant and allowed to coagulate and solidify and a spray drying method. Examples of usable coagulants include inorganic acids such as sulfuric acid, hydrochloric acid, phosphoric acid, and nitric acid and metal salts such as calcium chloride, calcium acetate, and aluminum sulfate.

[Thermoplastic Resin Composition]

The thermoplastic resin composition of the first invention includes the graft copolymer (C) of the first invention and the thermoplastic resin (D).

<Thermoplastic Resin (D)>

Examples of the thermoplastic resin (D) in the first invention include, but are not limited to, acrylic resins (PMMA), acrylonitrile-styrene copolymers (AS resins), polycarbonate resins, polybutylene terephthalate (PBT resins), methyl methacrylate-styrene copolymer resins (MS resins), polyethylene terephthalate (PET resins), polyvinyl chloride, polystyrene, polyacetal resins, modified polyphenylene ethers (modified PPE resins), ethylene-vinyl acetate copolymers, polyarylate, liquid crystal polyester resins, polyethylene resins, polypropylene resins, fluorocarbon resins, and polyamide resins (nylon).

The thermoplastic resin (D) may be used alone or as a mixture of two or more.

When a transparent resin among them is used, using a transparent resin having a refractive index different from that of the composite rubber-like polymer (A) in the thermoplastic resin (D) by 0.02 or less not only provides particularly good color developability but also provides a thermoplastic resin composition also having high transparency unless colored. The refractive index difference is preferably as small as possible, more preferably 0.01 or less.

Examples of transparent resins include, but are not limited to, acrylic resins (refractive index: 1.48 to 1.53), polystyrenes (refractive index: 1.59 to 1.60), aliphatic polycarbonates (refractive index: 1.48 to 1.55), aromatic polycarbonates (refractive index: 1.58 to 1.59), AS resins (refractive index: 1.52 to 1.58), MS resins (refractive index: 1.56 to 1.59), and rigid polyvinyl chlorides (refractive index: 1.52 to 1.54).

The refractive index of the thermoplastic resin (D) can be measured by the method described in the section of EXAMPLES below.

<Amounts of Graft Copolymer (C) and Thermoplastic Resin (D)>

In the thermoplastic resin composition of the first invention, the amounts of the graft copolymer (C) and the thermoplastic resin (D) are not particularly limited. In general, the amount of the graft copolymer (C) is 5 to 70 parts by mass, preferably 10 to 50 parts by mass, and the amount of the thermoplastic resin (D) is 30 to 95 parts by mass, preferably 50 to 90 parts by mass, the amounts being relative to 100 parts by mass of the total of the graft copolymer (C) and the thermoplastic resin (D). When the amount of the graft copolymer (C) is less than the above range and the amount of the thermoplastic resin (D) is over the above range, the impact resistance of the resulting thermoplastic resin composition is not sufficient. When the amount of the graft copolymer (C) is over the above range and the amount of the thermoplastic resin (D) is less than the above range, the resulting thermoplastic resin composition tends not to be provided with, for example, intrinsic functions of the thermoplastic resin (D), such as hardness of acrylic resins and heat resistance of aromatic polycarbonates.

<Additives>

In addition to the graft copolymer (C) and the thermoplastic resin (D), other commonly used additives such as lubricants, pigments, dyes, fillers (e.g., carbon black, silica, and titanium oxide), heat stabilizers, oxidation degradation inhibitors, weathering agents, release agents, plasticizers, and antistatic agents can be blended with the thermoplastic resin composition of the first invention during the production (mixing) or molding of the thermoplastic resin composition to the extent that the physical properties of the thermoplastic resin composition are not impaired.

<Method for Producing Thermoplastic Resin Composition>

The thermoplastic resin composition of the first invention can be produced using the graft copolymer (C), the thermoplastic resin (D), and optionally added various additives by a known method using a known apparatus. For example, commonly used methods include a melt mixing method. Examples of apparatuses used in the melt mixing method include extruders, Banbury mixers, rollers, and kneaders. Either batch mixing or continuous mixing may be employed. The order of mixing of components is also not particularly limited as long as all the components are uniformly mixed.

[Molded Article]

A molded article of the first invention is obtained by molding the thermoplastic resin composition of the first invention and is excellent in weather resistance and color developability as well as in impact resistance.

Examples of the method for molding the thermoplastic resin composition of the first invention include injection molding, injection compression molding, extrusion, blow molding, vacuum molding, air-pressure forming, calender molding, and inflation molding. Of these, injection molding and injection compression molding are preferred because these methods can achieve high mass productivity and provide molded articles with high dimensional accuracy.

Embodiment of Second Invention

Hereinafter, "abrasion resistance" means resistance to damage (abrasion, wear) that can occur when a surface of a molded article is rubbed with a soft material such as cotton work gloves, gauze, or a cloth.

"Residue" refers to a structural portion that is derived from a compound used to produce a polymer (crosslinked particles (A-I) in the second invention) and incorporated into the polymer. For example, a residue X described below corresponds to the rest of a polyalkylene glycol, a polyester diol, a polycarbonate diol, or a polymer of one or more thereof from each of the two hydroxyl groups of which one hydrogen atom is removed.

In the second invention, number average molecular weights (Mn) of the crosslinked particles (A-I) and diols incorporated as divalent residues X are values measured using gel permeation chromatography (GPC) relative to polystyrene standards.

The same applies to the third invention described below.

[Crosslinked Particles (A-I)]

The crosslinked particles (A-I) of the second invention are obtained by polymerizing a monomer mixture (i-I) containing a di(meth)acrylic acid ester (a) represented by the following formula (1) and having a number average molecular weight (Mn) of 800 to 9,000. Therefore, the crosslinked particles (A-I) are constituted by a structural unit derived from the di(meth)acrylic acid ester (a) and a structural unit derived from a monomer that is contained in the monomer mixture (i-I) described below and is other than the di(meth)acrylic acid ester (a). The structural unit derived from the di(meth)acrylic acid ester (a) included in the crosslinked particles (A-I) effectively serves to improve the impact resistance and abrasion resistance of a thermoplastic resin composition of the second invention described below.

[Chem. 3]

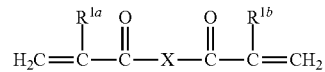

(1)

In the above formula (1), X represents a divalent residue constituted by at least one diol selected from polyalkylene glycols, polyester diols, and polycarbonate diols. $R^{1a}$ and $R^{1b}$ each independently represent H or $CH_3$.

X in the formula (1) is also referred to as a "diol residue X". A diol compound that is used as a material for producing the di(meth)acrylic acid ester (a) and constitutes the diol residue X in the di(meth)acrylic acid ester (a) is also referred to as an "X source". The same applies to the third invention described below.

<Di(meth)acrylic Acid Ester (a)>

The number average molecular weight (Mn) of the di(meth)acrylic acid ester (a) used to produce the crosslinked particles (A-I) of the second invention is 800 to 9,000, preferably 1,300 to 7,000, more preferably 1,800 to 5,000. When the number average molecular weight (Mn) of the di(meth)acrylic acid ester (a) is less than 800, the impact resistance and abrasion resistance of a thermoplastic resin composition including the crosslinked particles (A-I) of the second invention obtained using the di(meth)acrylic acid ester (a) are poor, and when the number average molecular weight (Mn) is more than 9,000, the flowability and color developability are poor.

The structure of the diol residue X included in the di(meth)acrylic acid ester (a) may be a repetition of a single structural unit or a repetition of two or more structural units. When the structure of X is a repetition of two or more structural units, the way the structural units align may be such that the structural units are present randomly, that the structural units are present as blocks, or that the structural units are present alternately.

From the viewpoint of abrasion resistance, the diol residue X is preferably a residue made of a repetition of polytetramethylene glycol (polybutylene glycol).

To constitute the di(meth)acrylic acid ester (a) satisfying the above number average molecular weight (Mn), the number average molecular weight (Mn) of the X source is preferably in the range of values obtained by subtracting the number average molecular weight of two (meth)acrylic acid residues from the number average molecular weight (Mn) of the di(meth)acrylic acid ester (a). The number average molecular weight (Mn) of the X source is specifically 660 to 8890, preferably 1160 to 6890, particularly preferably 1660 to 4890.

The method for synthesizing the X source is not particularly limited, and, typically, the X source is produced by condensation polymerization of the above-described diol or ring-opening polymerization of cyclic ethers using an acid catalyst.

Examples of the di(meth)acrylic acid ester (a) include polyethylene glycol di(meth)acrylates including 12 or more repeating units, such as dodecaethylene glycol di(meth)acrylate, tridecaethylene glycol di(meth)acrylate, tetradecaethylene glycol di(meth)acrylate, pentadecaethylene glycol di(meth)acrylate, and hexadecaethylene glycol di(meth)acrylate; polypropylene glycol di(meth)acrylates including 9 or more repeating units, such as nonapropylene glycol di(meth)acrylate, decapropylene glycol di(meth)acrylate, undecapropylene glycol di(meth)acrylate, dodecapropylene glycol di(meth)acrylate, and tridecapropylene glycol di(meth)acrylate; and polybutylene glycol di(meth)acrylates, i.e., polytetramethylene glycol di(meth)acrylates including 7 or more repeating units, such as heptabutylene glycol di(meth) acrylate, octabutylene glycol di(meth)acrylate, nonabutylene glycol di(meth)acrylate, decabutylene glycol di(meth) acrylate, and undecabutylene glycol di(meth)acrylate. These can be used alone or in a combination of two or more.

The method for producing the di(meth)acrylic acid ester (a) is not particularly limited. For example, a method (dehydration reaction) in which an X source is reacted with (meth)acrylic acid in the presence of an acid catalyst to form a (meth)acrylic acid ester precursor, and then water formed as a by-product is removed from the system or a method (transesterification reaction) in which an X source is reacted with a lower (meth)acrylic acid ester to form a (meth)acrylic acid ester precursor, and then a lower alcohol formed as a by-product is removed can be used.

<Monomer Mixture (i-I)>

The crosslinked particles (A-I) of the second invention are obtained by polymerizing the monomer mixture (i-I) containing the di(meth)acrylic acid ester (a). The crosslinked particles (A-I) of the second invention are typically obtained by copolymerizing the monomer mixture (i-I) containing the di(meth)acrylic acid ester (a) and another monomer.

The content of the di(meth)acrylic acid ester (a) in the monomer mixture (i-I) is preferably 0.1% to 90% by mass, more preferably 2% to 70% by mass, still more preferably 10% to 50% by mass. When the content of the di(meth) acrylic acid ester (a) in the monomer mixture (i-I) is in the above range, the color developability, impact resistance, and abrasion resistance of a thermoplastic resin composition including the resulting crosslinked particles (A-I) can be excellent.

Examples of the monomer that is contained in the monomer mixture (i-I) and copolymerizes with the di(meth) acrylic acid ester (a) include an aromatic vinyl (b), a vinyl cyanide (c), and other monomers copolymerizable therewith.

Examples of the aromatic vinyl (b) include styrene, α-methylstyrene, o-, m-, or p-methylstyrene, vinyl xylene, p-t-butylstyrene, and ethylstyrene. These can be used alone or in a combination of two or more. In particular, it is preferable to use at least one of styrene and α-methylstyrene.

For the content of the aromatic vinyl (b) in the monomer mixture (i-I), the proportion of the aromatic vinyl (b) is preferably 60% to 90% by mass, more preferably 65% to 80% by mass, in 100% by mass of the total of the aromatic vinyl (b) and the vinyl cyanide (c). When the proportion of the aromatic vinyl (b) is in the above range, the flowability, color developability, and impact resistance of a thermoplastic resin composition including the resulting crosslinked particles (A-I) can be excellent.

Examples of the vinyl cyanide (c) include acrylonitrile and methacrylonitrile. One or more of these can be used.

For the content of the vinyl cyanide (c) in the monomer mixture (i-I), the proportion of the vinyl cyanide (c) is preferably 10% to 40% by mass, more preferably 20% to 35% by mass, in 100% by mass of the total of the aromatic vinyl (b) and the vinyl cyanide (c). When the proportion of the vinyl cyanide (c) is in the above range, the impact resistance of a thermoplastic resin composition including the resulting crosslinked particles (A-I) can be excellent.

Examples of other monomers copolymerizable with the aromatic vinyl (b) and the vinyl cyanide (c) include methacrylic acid esters such as methyl methacrylate, ethyl methacrylate, n-propyl methacrylate, i-propyl methacrylate, n-butyl methacrylate, i-butyl methacrylate, t-butyl methacrylate, amyl methacrylate, isoamyl methacrylate, octyl methacrylate, 2-ethylhexyl methacrylate, decyl methacrylate, lauryl methacrylate, cyclohexyl methacrylate, benzyl methacrylate, and phenyl methacrylate; acrylic acid esters such as methyl acrylate, ethyl acrylate, propyl acrylate, and butyl acrylate; maleimide compounds such as N-cycloalkylmaleimides including N-methylmaleimide, N-ethylmaleimide, N-n-propylmaleimide, N-i-propylmaleimide, N-n-butylmaleimide, N-i-butylmaleimide, N-t-butylmaleimide, and N-cyclohexylmaleimide, N-arylmaleimides including N-phenylmaleimide, N-alkyl-substituted phenylmaleimide, and N-chlorophenylmaleimide, and N-aralkylmaleimides; alkylene glycol dimethacrylates such as ethylene glycol dimethacrylate, 1,3-butylene glycol dimethacrylate, 1,4-butylene glycol dimethacrylate, and propylene glycol dimethacrylate; and polyvinylbenzenes such as divinylbenzene and trivinylbenzene. These can be used alone or in a combination of two or more.

<Method for Producing Crosslinked Particles (A-I)>

The method for producing the crosslinked particles (A-I) is not particularly limited. The crosslinked particles (A-I) are produced from the above-described monomer mixture (i-I) containing the di(meth)acrylic acid ester (a) by a known method such as bulk polymerization, solution polymerization, bulk-suspension polymerization, suspension polymerization, or emulsion polymerization. From the viewpoint of stability during production and particle size control, the crosslinked particles (A-I) are preferably produced by what is called miniemulsion polymerization in which part or all of the monomer mixture (i-I) is sheared in water solvent in the presence of an emulsifier, preferably in the presence of an emulsifier and a hydrophobic stabilizer, to form a miniemulsion and then copolymerized in the presence of a radical initiator. The radical initiator may be added before or after the miniemulsion is formed. The radical initiator, the monomer mixture (i-I), and the emulsifier may be added in one portion, in multiple portions, or in a continuous manner.

From the viewpoint of workability, stability, production efficiency, etc., the amount of water solvent used in the miniemulsification is preferably about 100 to 500 parts by mass relative to 100 parts by mass of the monomer mixture (i-I) so that the solids concentration of the reaction system after the polymerization will be about 5% to 50% by mass.

As a method for applying shear in forming the miniemulsion, any known method can be used. The shear may be applied in one portion, in multiple portions, in a continuous manner, or in a circular manner, and, in general, the miniemulsion can be formed by using a high shear device that forms droplets having diameters of about 0.05 to 3.0 μm.

Examples of usable high shear devices that form miniemulsions include, but are not limited to, those exemplified, in the section of the description of the first invention, as those used to produce the composite rubber-like polymer (A).

By performing radical copolymerization after forming the miniemulsion, the stability during production is improved; for example, the di(meth)acrylic acid ester (a), which is a high-molecular-weight product, is efficiently taken into a micelle, and agglomerates after the polymerization are reduced.

Examples of emulsifiers include those exemplified in the section of the description of the first invention, as those used to produce the composite rubber-like polymer (A). The emulsifiers may be used alone or in a combination of two or more.

The addition amount of emulsifier is typically 10 parts by mass or less, preferably, for example, 0.01 to 10 parts by mass, relative to 100 parts by mass of the monomer mixture (i-I).

When the miniemulsion is formed, adding a hydrophobic stabilizer tends to further improve the production stability of the miniemulsion. Examples of hydrophobic stabilizers include those exemplified, in the section of the description of the first invention, as those used to produce the composite rubber-like polymer (A). The hydrophobic stabilizers may be used alone or as a mixture of two or more.

When a hydrophobic stabilizer is used, the amount thereof is preferably 0.05 to 5 parts by mass relative to 100 parts by mass of the monomer mixture (i-I). When the addition amount of hydrophobic stabilizer is not less than the above lower limit, the production stability of the crosslinked particles (A-I) can be further improved, and when the addition amount of hydrophobic stabilizer is not more than the above upper limit, there is a tendency that the color developability and impact resistance of a thermoplastic resin composition obtained by incorporating the crosslinked particles (A-I) of the second invention can be good.

Examples of the radical initiator used in the polymerization step subsequent to the miniemulsification step include those exemplified, in the section of the description of the first invention, as those used to produce the composite rubber-like polymer (A). The radical initiators may be used alone or in a combination of two or more.

The addition amount of radical initiator is preferably 5 parts by mass or less, more preferably 3 parts by mass or less, for example, 0.001 to 3 parts by mass, relative to 100 parts by mass of the monomer mixture (i-I). As described above, the radical initiator may be added before or after the miniemulsion is formed and may be added in one portion, in multiple portions, or in a continuous manner.

In the production of the crosslinked particles (A-I), a chain transfer agent may optionally be added. Examples of chain transfer agents include those exemplified, in the section of the description of the first invention, as those used to produce the composite rubber-like polymer (A). The chain transfer agents may be used alone or in a combination of two or more. Of these, mercaptans are preferred in terms of ease of control of molecular weight.

When a chain transfer agent is used, it may be added in one portion, in multiple portions, or in a continuous manner. The addition amount of chain transfer agent is typically 2.0 parts by mass or less, preferably, for example, 0.01 to 2.0 parts by mass, relative to 100 parts by mass of the monomer mixture (i-I).

The polymerization step subsequent to the miniemulsification step is typically performed at 40° C. to 95° C. for about 0.5 to 8 hours following the miniemulsification step.

The particle size (average particle size) of the crosslinked particles (A-I) of the second invention produced through the miniemulsification step and the subsequent polymerization step is preferably 0.07 to 5.0 μm, more preferably 0.09 to 3.0 μm, still more preferably 0.1 to 1 μm. When the particle size of the crosslinked particles (A-I) is in the above range, the impact resistance and abrasion resistance of a thermoplastic resin composition including the resulting crosslinked particles (A-I) can be excellent.

The particle size of the crosslinked particles (A-I) may be controlled by any method, for example, by adjusting the type or amount of emulsifier used and the shear force during the production of the miniemulsion.

Specifically, the average particle size of the crosslinked particles (A-I) is measured by the method described in the section of EXAMPLES below.

[Graft Crosslinked Particles (B-I)]

Graft crosslinked particles (B-I) of the second invention is obtained by graft-polymerizing a monomer onto the crosslinked particles (A-I) of the second invention.

Examples of the monomer graft-polymerized onto the crosslinked particles (A-I) of the second invention include one or two or more selected from aromatic vinyls, vinyl cyanides, (meth)acrylic acid esters, maleimides, and maleic anhydride. When the crosslinked particles (A-I) are graft-polymerized, the crosslinked particles (A-I) advantageously have better dispersibility in a thermoplastic resin (D-I) described below to provide a thermoplastic resin composition that is more excellent in flowability and impact resistance.

Examples of monomers such as aromatic vinyls and vinyl cyanides, among the monomers graft-polymerized onto the crosslinked particles (A-I), include those exemplified as monomers used in the monomer mixture (i-I) for producing the crosslinked particles (A-I) of the second invention. In particular, to provide a thermoplastic resin composition excellent in flowability and impact resistance, it is preferable to use an aromatic vinyl such as styrene and a vinyl cyanide such as acrylonitrile in combination. In this case, it is preferable to use the aromatic vinyl in an amount of 60% to 99% by mass and the vinyl cyanide in an amount of 1% to 40% by mass (provided that the total amount of the aromatic vinyl and the vinyl cyanide is 100% by mass).

The proportions of the crosslinked particles (A-I) and the monomer used in graft polymerization are not particularly limited, but, in general, the proportion of the crosslinked particles (A-I) is 40% to 90% by mass, and the proportion of the monomer is 10% to 60% by mass (provided that the total amount of the crosslinked particles (A-I) and the monomer is 100% by mass). When the proportions of the crosslinked particles (A-I) and the monomer are in the above ranges, the dispersibility in the thermoplastic resin (D-I) described below is good, and a thermoplastic resin composition having improved flowability and impact resistance is provided.

For good dispersibility in the thermoplastic resin (D-I) described below, the graft crosslinked particles (B-I) preferably have a graft rate of 23% to 100%.

The graft rate G of the graft crosslinked particles (B-I) is determined by the following formula (4).

$$G=100(P-E)/E \quad (4)$$

P: mass of acetone insoluble fraction (mass (g) of acetone insoluble fraction after being vacuum-dried, the acetone insoluble fraction being obtained by washing of graft crosslinked particles (B-I) with methanol, extraction with acetone, and centrifugal separation into acetone soluble fraction and acetone insoluble fraction)

E: mass (g) of graft crosslinked particles (B-I) before graft polymerization

The method for producing the graft crosslinked particles (B-I) is not particularly limited. The graft crosslinked particles (B-I) are produced by a known method such as bulk polymerization, solution polymerization, bulk-suspension polymerization, suspension polymerization, or emulsion polymerization. When the crosslinked particles (A-I) are prepared by miniemulsion polymerization and provided in the form of emulsified latex, the graft polymerization may also be carried out by emulsion polymerization. Examples of emulsion graft polymerization include a method in which the monomer is added in one portion, in a continuous manner, or in an intermittent manner in the presence of an emulsion of the crosslinked particles (A-I) to cause radical polymerization. In the graft polymerization, a chain transfer agent for molecular weight adjustment and graft rate control, a known inorganic electrolyte for adjusting the viscosity and pH of latex, etc. can be used. The type and addition amount of these are not particularly limited. In the emulsion graft polymerization, various emulsifiers can be used as required. As a chain transfer agent, emulsifier, and radical initiator, for example, those exemplified as those used in the production of the crosslinked particles (A-I) can be used.

The method for obtaining the graft crosslinked particles (B-I) in the form of granules from the emulsion of the graft crosslinked particles (B-I) produced as described above is not particularly limited. Examples include a method in which the emulsion is put in hot water containing a dissolved coagulant and allowed to coagulate and solidify and a spray drying method. Examples of usable coagulants include inorganic acids such as sulfuric acid, hydrochloric acid, phosphoric acid, and nitric acid and metal salts such as calcium chloride, calcium acetate, and aluminum sulfate.

[Thermoplastic Resin Composition]

The thermoplastic resin composition of the second invention includes the crosslinked particles (A-I) and/or the graft crosslinked particles (B-I) of the second invention described above and the thermoplastic resin (D-I).

<Thermoplastic Resin (D-I)>

Examples of the thermoplastic resin (D-I) in the second invention include styrene resins such as AS (acrylonitrile-styrene) resins containing the above-described aromatic vinyl (b) and the vinyl cyanide (c) as principal components, styrene-acrylonitrile-phenylmaleimide copolymer resins, ABS resins, AES resins, and AAS resins; polyolefin resins such as polystyrene, poly(meth)acrylate resins, polyethylene, and polypropylene; and polycarbonate (PC), polyphenylene ether, modified polyphenylene ether, polybutylene terephthalate, polyethylene terephthalate, polyamide, polyester, polysulfone, polyetherketone, polyethersulfone, fluorocarbon resins, silicone resins, polyester elastomers, and polycaprolactone. One of these resins may be used alone, or two or more of them may be used in combination.

<Proportions of Crosslinked Particles (A-I)/Graft Crosslinked Particles (B-I)>

The content of the crosslinked particles (A-I) and/or the graft crosslinked particles (B-I) in the thermoplastic resin composition of the second invention is preferably 1% to 95% by mass, more preferably 5% to 80% by mass, particularly preferably 10% to 50% by mass, provided that the total amount of the crosslinked particles (A-I) and/or the graft crosslinked particles (B-I) and the thermoplastic resin (D-I) is 100% by mass. When the content of the crosslinked particles (A-I) and/or the graft crosslinked particles (B-I) is in the above range, the color developability, impact resistance, and abrasion resistance of the thermoplastic resin composition are more excellent.

<Additives>

In addition to the crosslinked particles (A-I) and/or the graft crosslinked particles (B-I) and the thermoplastic resin (D-I), other commonly used additives such as lubricants, colorants including pigments and dyes, fillers (e.g., carbon black, silica, and titanium oxide), processing aids, heat stabilizers, antioxidants, weathering agents, release agents, plasticizers, and antistatic agents can be blended with the thermoplastic resin composition of the second invention during the production (mixing) or molding of the thermoplastic resin composition to the extent that the physical properties of the thermoplastic resin composition are not impaired.

<Method for Producing Thermoplastic Resin Composition>

The thermoplastic resin composition of the second invention can be produced using the crosslinked particles (A-I) and/or the graft crosslinked particles (B-I), the thermoplastic resin (D-I), and optionally added various additives by a known method using a known apparatus. For example, commonly used methods include a melt mixing method. Examples of apparatuses used in the melt mixing method include extruders, Banbury mixers, rollers, and kneaders. Either batch mixing or continuous mixing may be employed. The order of mixing of components is also not particularly limited as long as all the components are uniformly mixed.

[Molded Article]

A molded article of the second invention is obtained by molding the thermoplastic resin composition of the second invention. The molded article is excellent in color developability, flowability, impact resistance, and abrasion resistance and is excellent in dimensional stability and shape accuracy due to its small mold shrinkage rate.

Examples of the method for molding the thermoplastic resin composition of the second invention include injection molding, injection compression molding, extrusion, blow molding, vacuum molding, air-pressure forming, calender molding, and inflation molding. Of these, injection molding and injection compression molding are preferred because these methods can achieve high mass productivity and provide molded articles with high dimensional accuracy.

The molded article of the second invention obtained by molding the thermoplastic resin composition of the second invention is excellent in color developability, flowability, impact resistance, and abrasion resistance and is excellent in dimensional stability and shape accuracy due to its small mold shrinkage rate, and thus is suitable for automotive interior and exterior parts, office machines, household electrical appliances, building materials, etc.

Embodiment of Third Invention

In the third invention, "abrasion resistance" and "residue" each have the same meaning as in the second invention. Number average molecular weights (Mn) of crosslinked particles (A-II) and diols incorporated as divalent residues X are values measured using gel permeation chromatography (GPC) relative to polystyrene standards.

[Crosslinked Particles (A-II)]

The crosslinked particles (A-II) of the third invention are obtained by polymerizing a monomer mixture (i-II) containing a di(meth)acrylic acid ester (a) represented by the following formula (1) and having a number average molecular weight of 800 to 9,000 and a mono(meth)acrylic acid ester (d). The content of the di(meth)acrylic acid ester (a) in 100% by mass of the monomer mixture (i-II) is 20% to 80% by mass. Therefore, the crosslinked particles (A-II) of the third invention are constituted by a structural unit derived from the di(meth)acrylic acid ester (a), a structural unit derived from the mono(meth)acrylic acid component (d), and a structural unit derived from an additional vinyl compound (e) described below that is optionally used and are characterized by having a volume average particle size of 0.07 to 2.0 μm. The structural unit derived from the di(meth)acrylic acid ester (a) constituting the crosslinked particles (A-II) effectively serves to improve the impact resistance and abrasion resistance of a thermoplastic resin composition of the third invention described below.

[Chem. 4]

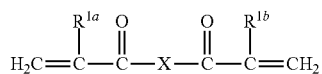

(1)

In the above formula (1), X represents a divalent residue constituted by at least one diol selected from polyalkylene glycols, polyester diols, and polycarbonate diols. $R^{1a}$ and $R^{1b}$ each independently represent H or $CH_3$.

The monomer mixture (i-II), which is a raw material of the crosslinked particles (A-II) of the third invention, contains the di(meth)acrylic acid ester (a) and the mono(meth) acrylic acid component (d) as essential components and contains the additional vinyl compound (e) that is optionally used.

Hereinafter, X in the formula (1) is also referred to as a "diol residue X". A diol compound that is used as a material for producing the di(meth)acrylic acid ester (a) and constitutes the diol residue X in the di(meth)acrylic acid ester (a) is also referred to as an "X source".

<Di(meth)acrylic Acid Ester (a)>

The di(meth)acrylic acid ester (a) used to produce the crosslinked particles (A-II) of the third invention is the same as the di(meth)acrylic acid ester (a) used to produce the crosslinked particles (A-I) of the second invention. The number average molecular weight (Mn), the diol residue X included in the di(meth)acrylic acid ester (a), the number average molecular weight (Mn) of an X source, the method for synthesizing the X source, examples of the di(meth) acrylic acid ester (a), and the production method thereof are the same as in the second invention.

The content of the di(meth)acrylic acid ester (a) in the monomer mixture (i-II) (i.e., the total of the di(meth)acrylic acid ester (a), the mono(meth)acrylic acid component (d), and the additional vinyl compound (e) described below that is optionally used) is 20% to 80% by mass, more preferably 25% to 70% by mass, still more preferably 30% to 50% by mass. When the content of the di(meth)acrylic acid ester (a) in the monomer mixture (i-II) is less than 20% by mass, the impact resistance and abrasion resistance of a thermoplastic resin composition including the resulting crosslinked particles (A-II) are poor, and when the content is more than 90% by mass, the color developability is poor.

<Mono(meth)acrylic Acid Component (d)>

The mono(meth)acrylic acid component (d) is a (meth) acrylic acid and/or a mono(meth)acrylic acid ester. Examples include methyl (meth)acrylate, ethyl (meth)acrylate, n-butyl (meth)acrylate, i-butyl (meth)acrylate, t-butyl (meth)acrylate, cyclohexyl (meth)acrylate, 2-ethylhexyl (meth)acrylate, stearyl (meth)acrylate, lauryl (meth)acrylate, isobornyl (meth)acrylate, benzyl (meth)acrylate, phenyl (meth)acrylate, glycidyl (meth)acrylate, hydroxyethyl (meth)acrylate, and (meth)acrylic acid. Of these, (meth) acrylic acid monoalkyl esters having alkyl groups of 1 to 8 carbon atoms are preferred. These may be used alone or in a combination of two or more.

The content of the mono(meth)acrylic acid component (d) in the monomer mixture (i-II) is preferably 1% to 80% by mass, more preferably 25% to 75% by mass, still more preferably 50% to 70% by mass. When the content of the mono(meth)acrylic acid component (d) is in the above range, a molded article having an excellent balance of color developability, weather resistance, impact resistance, and abrasion resistance can be obtained from a thermoplastic resin composition including the resulting crosslinked particles (A-II).

<Additional Vinyl Compound (e)>

The additional vinyl compound (e) that is optionally used is not particularly limited as long as it is copolymerizable with the di(meth)acrylic acid ester (a) and the mono(meth) acrylic acid component (d). Examples include aromatic vinyls such as styrene, α-methylstyrene, o-, m-, or p-methylstyrene, vinyl xylene, p-t-butylstyrene, and ethyl styrene; vinyl cyanides such as acrylonitrile and methacrylonitrile; maleimides such as N-cyclohexylmaleimide and N-phenylmaleimide; maleic anhydride; alkylene glycol dimethacrylates such as ethylene glycol dimethacrylate, 1,3-butylene glycol dimethacrylate, 1,4-butylene glycol dimethacrylate, and propylene glycol dimethacrylate; and polyvinylbenzenes such as divinylbenzene and trivinylbenzene. These may be used alone or as a mixture of two or more.

Of these, styrene is preferably used to achieve a refractive index closer to that of a thermoplastic resin (D-II).

The content of the additional vinyl compound (e) in the monomer mixture (i-II) is 0% to 70% by mass. When the proportion of the additional vinyl compound (e) is in the above range, the flowability a thermoplastic resin composition including the resulting crosslinked particles (A-II) is excellent, and a molded article having excellent color developability can be obtained.

When styrene is used as the additional vinyl compound (e), the content of styrene in the monomer mixture (i-II) is preferably 3% to 30% by mass, particularly preferably 5% to 20% by mass, to achieve a refractive index closer to that of the thermoplastic resin (D-II).

<Method for Producing Crosslinked Particles (A-II)>

The method for producing the crosslinked particles (A-II) is not particularly limited. The crosslinked particles (A-II) are produced from the above-described monomer mixture (i-II) containing the di(meth)acrylic acid ester (a), the mono (meth)acrylic acid component (d), and the additional vinyl compound (e) that is optionally used by a known method such as bulk polymerization, solution polymerization, bulk-suspension polymerization, suspension polymerization, or emulsion polymerization. From the viewpoint of stability during production and particle size control, the crosslinked particles (A-I) are preferably produced by what is called miniemulsion polymerization in which part or all of the monomer mixture (i-II) is sheared in water solvent in the presence of an emulsifier, preferably in the presence of an emulsifier and a hydrophobic stabilizer, to form a miniemulsion and then copolymerized in the presence of a radical initiator. The radical initiator may be added before or after the miniemulsion is formed, and the radical initiator, the monomer mixture (i-II) (i.e., the di(meth)acrylic acid ester (a), the mono(meth)acrylic acid component (d), and the additional vinyl compound (e)), and the emulsifier may be added in one portion, in multiple portions, or in a continuous manner.

From the viewpoint of workability, stability, production efficiency, etc., the amount of water solvent used in the miniemulsification is preferably about 100 to 500 parts by mass relative to 100 parts by mass of the monomer mixture (i-II) so that the solids concentration of the reaction system after the polymerization will be about 5% to 50% by mass.

As a method for applying shear in forming the miniemulsion, any known method can be used. The shear may be applied in one portion, in multiple portions, in a continuous manner, or in a circular manner, and, in general, the miniemulsion can be formed by using a high shear device that forms droplets having diameters of about 0.05 to 3.0 µm. Examples of usable high shear devices that form miniemulsions include, but are not limited to, those exemplified, in the section of the description of the first invention, as those used to produce the composite rubber-like polymer (A).

By performing radical copolymerization after forming the miniemulsion, the stability during production is improved; for example, the di(meth)acrylic acid ester (a), which is a high-molecular-weight product, is efficiently taken into a micelle, and agglomerates after the polymerization are reduced.

Examples of emulsifiers include those exemplified, in the section of the description of the first invention, as those used to produce the composite rubber-like polymer (A). These emulsifiers may be used alone or in a combination of two or more.

The addition amount of emulsifier is typically 10 parts by mass or less, preferably, for example, 0.01 to 10 parts by mass, relative to 100 parts by mass of the monomer mixture (i-II).

When the miniemulsion is formed, adding a hydrophobic stabilizer tends to further improve the production stability of the miniemulsion. Examples of hydrophobic stabilizers include those exemplified, in the section of the description of the first invention, as those used to produce the composite rubber-like polymer (A). The hydrophobic stabilizers may be used alone or as a mixture of two or more.

When a hydrophobic stabilizer is used, the amount thereof is preferably 0.05 to 5 parts by mass relative to 100 parts by mass of the monomer mixture (i-II). When the addition amount of hydrophobic stabilizer is not less than the above lower limit, the production stability of the crosslinked particles (A-II) can be further improved, and when the addition amount of hydrophobic stabilizer is not more than the above upper limit, there is a tendency that the color developability and impact resistance of a thermoplastic resin composition obtained by incorporating the crosslinked particles (A-II) of the third invention can be good.

Examples of the radical initiator used in the polymerization step subsequent to the miniemulsification step include those exemplified, in the section of the description of the first invention, as those used to produce the composite rubber-like polymer (A). The radical initiators may be used alone or in a combination of two or more.

The addition amount of radical initiator is preferably 5 parts by mass or less, more preferably 3 parts by mass or less, for example, 0.001 to 3 parts by mass, relative to 100 parts by mass of the monomer mixture (i-II). As described above, the radical initiator may be added before or after the miniemulsion is formed and may be added in one portion, in multiple portions, or in a continuous manner.

In the production of the crosslinked particles (A-II), a chain transfer agent may optionally be added. Examples of chain transfer agents include those exemplified, in the section of the description of the first invention, as those used to produce the composite rubber-like polymer (A). The chain transfer agents may be used alone or in a combination of two or more. Of these, mercaptans are preferred in terms of ease of control of molecular weight.

When a chain transfer agent is used, it may be added in one portion, in multiple portions, or in a continuous manner, and the addition amount thereof is typically 2.0 parts by mass or less, preferably, for example, 0.01 to 2.0 parts by mass, relative to 100 parts by mass of the monomer mixture (i-II).

The polymerization step subsequent to the miniemulsification step is typically performed at 40° C. to 95° C. for about 0.5 to 8 hours following the miniemulsification step.
<Particle Size>

The particle size (average particle size) of the crosslinked particles (A-II) of the third invention is 0.07 to 2.0 µm, preferably 0.09 to 1.0 µm, still more preferably 0.1 to 0.5 µm. When the average particle size of the crosslinked particles (A-II) in less than 0.07 µm, the impact resistance of a thermoplastic resin composition including the resulting crosslinked particles (A-II) is poor, and when the average particle size is more than 2.0 µm, the color developability and abrasion resistance of a thermoplastic resin composition including the resulting crosslinked particles (A-II) are poor.

Specifically, the average particle size of the crosslinked particles (A-II) is measured by the method described in the section of EXAMPLES below.

[Graft Crosslinked Particles (B-II)]

Graft crosslinked particles (B-II) of the third invention are obtained by graft-polymerizing a monomer onto the crosslinked particles (A-II) of the third invention.

Examples of the monomer graft-polymerized onto the crosslinked particles (A-II) of the third invention include one or two or more selected from aromatic vinyls, vinyl cyanides, (meth)acrylic acid esters, maleimides, and maleic anhydride. When the crosslinked particles (A-II) are graft-polymerized, the crosslinked particles (A-II) advantageously have better dispersibility in the thermoplastic resin (D-II) described below to provide a thermoplastic resin molded article that is more excellent in color developability and impact resistance.

Examples of the monomer graft-polymerized onto the crosslinked particles (A-II) include the mono(meth)acrylic acid components (d) exemplified in the section of the crosslinked particles (A-II) of the third invention and (meth)acrylic acid esters, aromatic vinyls, vinyl cyanides, maleimides, and maleic anhydride exemplified in the additional vinyl compound (e), and one or more of these can be used. Of these, (meth)acrylic acid esters are suitable for use in order to provide a thermoplastic resin molded article excellent in color developability and weather resistance. In particular, it is preferable to use methyl methacrylate and methyl acrylate in combination such that the amount of methyl methacrylate is 90% to 99.9% by mass and the amount of methyl acrylate is 0.1% to 10% by mass, relative to 100% by mass of their total amount.

The proportions of the crosslinked particles (A-II) and the monomer used in graft polymerization are not particularly limited, but, in general, the proportion of the crosslinked particles (A-II) is 40% to 90% by mass, and the proportion of the monomer is 10% to 60% by mass (provided that the total amount of the crosslinked particles (A-II) and the monomer is 100% by mass). When the proportions of the crosslinked particles (A-II) and the monomer are in the above ranges, the dispersibility in the thermoplastic resin (D-II) described below is good, and a thermoplastic resin composition having improved color developability and impact resistance is provided.

For good dispersibility in the thermoplastic resin (D-II) described below, the graft crosslinked particles (B-II) preferably have a graft rate of 23% to 100%.

The method for calculating the graft rate of the graft crosslinked particles (B-II) is the same as the method for calculating the graft rate of the graft crosslinked particles (B-I) in the second invention.

The method for producing the graft crosslinked particles (B-II) and the method for obtaining the graft crosslinked particles (B-II) in the form of granules from an emulsion of the graft crosslinked particles (B-II) produced are the same as those for the graft crosslinked particles (B-I) of the second invention.

[Thermoplastic Resin Composition]

The thermoplastic resin composition of the third invention includes the crosslinked particles (A-II) and/or the graft crosslinked particles (B-II) of the third invention and the thermoplastic resin (D-II).

<Thermoplastic Resin (D-II)>

Examples of the thermoplastic resin (D-II) in the third invention include poly(meth)acrylate resins containing the above-described mono(meth)acrylic acid ester (d) as a principal component; polyolefin resins such as polyethylene and polypropylene; polycarbonate (PC), polyphenylene ether, modified polyphenylene ether, polybutylene terephthalate, polyethylene terephthalate, polyamide, polyester, polysulfone, polyetherketone, polyethersulfone, fluorocarbon resins, silicone resins, polyester elastomers, polycaprolactone, aromatic polyester elastomers, polyamide elastomers, AS-grafted polyethylene, AS-grafted polypropylene; and styrene resins such as polystyrene, AS resins, and ABS resins. These resins may be used alone or in a combination of two or more.

<Proportions of Crosslinked Particles (A-II)/Graft Crosslinked Particles (B-II)>

The content of the crosslinked particles (A-II) and/or the graft crosslinked particles (B-II)) in the thermoplastic resin composition of the third invention is preferably 1% to 90% by mass, more preferably 10% to 70% by mass, still more preferably 20% to 50% by mass, provided that the total amount of the crosslinked particles (A-II) and/or the graft crosslinked particles (B-II) and the thermoplastic resin (D-II) is 100% by mass. When the content of the crosslinked particles (A-II) and/or the graft crosslinked particles (B-II) is in the above range, a thermoplastic resin composition excellent in color developability, abrasion resistance, and impact resistance is provided.

<Additives>

Similarly to the thermoplastic resin composition of the second invention, in addition to the crosslinked particles (A-II) and/or the graft crosslinked particles (B-II) and the thermoplastic resin (D-II), other commonly used additives can be blended with the thermoplastic resin composition of the third invention during the production (mixing) or molding of the thermoplastic resin composition to the extent that the physical properties of the thermoplastic resin composition are not impaired.

<Method for Producing Thermoplastic Resin Composition>

The thermoplastic resin composition of the third invention is produced similarly to the thermoplastic resin composition of the second invention by using the crosslinked particles (A-II) and/or the graft crosslinked particles (B-II), the thermoplastic resin (D-II), and optionally added various additives.

[Molded Article]

A molded article of the third invention is obtained by molding the thermoplastic resin composition of the third invention and is excellent in flowability during molding, color developability, weather resistance, impact resistance, and abrasion resistance.

The method for molding the thermoplastic resin composition of the third invention is the same as the method for molding the thermoplastic resin composition of the second invention, and the preferred molding method is also the same.

The molded article of the third invention obtained by molding the thermoplastic resin composition of the third invention is excellent in color developability, weather resistance, impact resistance, and abrasion resistance and thus is suitable for automotive interior and exterior parts, office machines, household electrical appliances, building materials, etc.

Embodiment of Fourth Invention

[Rubbery Polymer (A-III)]

A rubbery polymer (A-III) of the fourth invention is obtained by miniemulsion polymerization reaction of an alkyl (meth)acrylate, preferably, a mixture (i-III) containing an alkyl (meth)acrylate, a hydrophobe, and an emulsifier. The rubbery polymer (A-III) is typically produced by miniemulsifying the mixture (i-III) containing an alkyl (meth)acrylate, a hydrophobe, and an emulsifier and polymerizing the resulting miniemulsion.

In the miniemulsion polymerization, monomer oil droplets of about 100 to 1000 nm are prepared by applying a strong shear force by using an ultrasonic oscillator or the like. In this process, emulsifier molecules are preferentially adsorbed on the surface of the monomer oil droplets, and free emulsifiers and micelles become substantially absent in an aqueous medium. Therefore, in ideal miniemulsion-type polymerization, monomer radicals are never to be separated into an aqueous phase and an oil phase, and polymerization proceeds with monomer oil droplets serving as nuclei of particles. As a result, the monomer oil droplets formed are converted as they are into polymer particles, making it possible to obtain polymer nanoparticles having a narrow particle size distribution. The polymer particles having a narrow particle size distribution, even when having a particle size of 200 nm or more, exhibit good color developability and good molded appearance.

By contrast, in the case of polymer particles having a particle size of 200 nm or more prepared by standard emulsion polymerization, their particle size distribution is difficult to control, and the polymer particles have a wide particle size distribution, thus resulting in poor color developability and poor molded appearance.

<Method for Producing Rubbery Polymer (A-III)>

The miniemulsion polymerization for producing the rubbery polymer (A-III) of the fourth invention may, but does not necessarily, include, for example, a step of mixing a monomer including an alkyl (meth)acrylate as an essential component, an emulsifier, and a hydrophobe, and, furthermore, preferably a radical polymerization initiator, a step of applying a shear force to the resulting mixture (i-III) to prepare a pre-emulsion, and a step of polymerizing the mixture (i-III) by heating to a polymerization starting temperature. In the miniemulsion polymerization, the monomer for polymerization and the emulsifier are mixed, and the shearing step, for example, by ultrasonic irradiation is then performed, whereby the shear force causes the monomer to tear to form monomer oil microdroplets covered with the emulsifier. After this, the monomer oil microdroplets are polymerized as they are by heating to the polymerization starting temperature of the radical polymerization initiator to obtain polymer fine particles.

The shear force for forming a miniemulsion can be added by any known method. Examples of usable high shear devices that form miniemulsions include, but are not limited to, those exemplified, in the section of the description of the first invention, as those used to produce the composite rubber-like polymer (A).

From the viewpoint of workability, stability, production efficiency, etc., the amount of water solvent used in the miniemulsification is preferably about 100 to 500 parts by mass relative to 100 parts by mass of the mixture (i-III) excluding water so that the solids concentration of the reaction system after the polymerization will be about 5% to 50% by mass.

«Alkyl (Meth)acrylate»

Examples of the alkyl (meth)acrylate constituting the rubbery polymer (A-III) include alkyl acrylates having alkyl groups of 1 to 18 carbon atoms, such as methyl acrylate, ethyl acrylate, n-propyl acrylate, n-butyl acrylate, and 2-ethylhexyl acrylate; and alkyl methacrylates having alkyl groups of 1 to 18 carbon atoms, such as hexyl methacrylate, 2-ethylhexyl methacrylate, and n-dodecyl methacrylate. Among the alkyl (meth)acrylates, n-butyl acrylate is preferred because the impact resistance and gloss of a molded article obtained from a thermoplastic resin composition are improved. The alkyl (meth)acrylates may be used alone or in a combination of two or more.

«Hydrophobe»

Examples of hydrophobes include hexadecane, olive oil, polystyrenes having mass average molecular weights (Mw) of 500 to 5000, siloxanes having mass average molecular weights (Mw) of 500 to 5000, cetyl alcohol, stearyl alcohol, palmityl alcohol, and behenyl alcohol. Other examples include water-insoluble monomers, such as vinyl esters of carboxylic acids having 12 to 22 carbon atoms, vinyl ethers of alcohols having 12 to 30 carbon atoms, and alkyl acrylates having 12 to 22 carbon atoms. Specifically, examples of hydrophobic monomers include hexyl acrylate, p-methylstyrene, 2-ethylhexyl acrylate, decyl acrylate, stearyl acrylate, lauryl methacrylate, and stearyl methacrylate. Examples of hydrophobic chain transfer agents include lauryl mercaptan (normal dodecyl mercaptan). Examples of hydrophobic peroxides include lauroyl peroxide. These may be used alone or in a combination of two or more. Of these, hexadecane is preferably, but not necessarily, used as a hydrophobe.

The use of a hydrophobe suppresses the increase in ununiformity of particle size due to Ostwald ripening and enables the synthesis of monodisperse latex particles.

The addition amount of hydrophobe is preferably 0.1 to 10 parts by mass, more preferably 1 to 3 parts by mass, relative to 100 parts by mass of the alkyl (meth)acrylate.

«Emulsifier»

As an emulsifier used when the rubbery polymer is produced, known emulsifiers, for example, carboxylic-acid-based emulsifiers, such as alkali metal salts of oleic acid, palmitin acid, stearic acid, and rosin acid and alkali metal salts of alkenyl succinic acid; and anionic emulsifiers selected from alkyl sulfuric acid esters, sodium alkylbenzene sulfonates, sodium alkyl sulfosuccinates, polyoxyethylene nonylphenyl ether sodium sulfate, etc., can be used alone or in a combination of two or more.

The addition amount of emulsifier is preferably 0.01 to 1.0 part by mass, more preferably 0.05 to 0.5 parts by mass, relative to 100 parts by mass of the alkyl (meth)acrylate.

«Radical Polymerization Initiator»

Examples of the radical polymerization initiator used in the polymerization step subsequent to the miniemulsification step include those exemplified, in the section of the description of the first invention, as those used to produce the composite rubber-like polymer (A). The radical polymerization initiators may be used alone or in a combination of two or more.

The addition amount of radical polymerization initiator is typically 5 parts by mass or less, preferably 3 parts by mass or less, for example, 0.001 to 3 parts by mass, relative to 100 parts by mass of the alkyl (meth)acrylate.

The radical polymerization initiator may be added before or after the miniemulsion is formed and may be added in one portion, in multiple portions, or in a continuous manner.

«Rubber Component»

In producing the rubbery polymer (A-III), another rubber component may be incorporated into the mixture (i-III) to produce the rubbery polymer (A-III) made of a composite rubber. In this case, examples of the other rubber component include diene rubbers, such as polybutadiene, and polyorganosiloxanes. By polymerizing the alkyl (meth)acrylate in the presence of such a rubber component, the rubbery polymer (A-III) made of diene/alkyl (meth)acrylate composite rubber or polyorganosiloxane/alkyl (meth)acrylate composite rubber combined with alkyl (meth)acrylate rubber such as butyl acrylic rubber is obtained. The composite rubber related to the fourth invention is not limited thereto, and the rubber components to be combined can be used alone or in a combination of two or more.

«Crosslinking Agent»

In producing the rubbery polymer (A-III), the polymerization is preferably performed with a crosslinking agent being added to the mixture (i-III) in order to introduce a crosslinked structure into a polyalkyl (meth)acrylate component obtained from the alkyl (meth)acrylate described above. In the case of the crosslinked rubbery polymer (A-III) obtained using a crosslinking agent, crosslinked portions thereof also function as graft crosslinking points for a vinyl monomer to be grafted in the production of a graft copolymer (B-III) of the fourth invention.

Examples of the crosslinking agent used in this case include allyl (meth)acrylate, butylene di(meth)acrylate, ethylene glycol di(meth)acrylate, propylene glycol di(meth)acrylate, 1,3-butylene glycol di(meth)acrylate, 1,4-butylene glycol di(meth)acrylate, triallyl cyanurate, and triallyl isocyanurate. The crosslinking agents may be used alone or in a combination of two or more.

The amount of crosslinking agent used is not particularly limited, but preferably, the amount of crosslinking agent is 0.1 to 5.0 parts by mass relative to 100 parts by mass of the total of the crosslinking agent and the alkyl (meth)acrylate.

<Average Particle Size and Particle Size Distribution>

The rubbery polymer (A-III) of the fourth invention obtained by the miniemulsion polymerization described above preferably satisfies (2) or (3) below, wherein an average particle size (X) is represented by X; a largest 10% frequency particle size (Y), which is a particle size at which the cumulative frequency from the largest value in a particle size distribution curve reaches 10%, is represented by Y; and a smallest 10% frequency particle size (Z), which is a particle size at which the cumulative frequency from the smallest value in the particle size distribution curve reaches 10%, is represented by Z.

(2) The average particle size (X) satisfies X≤300 nm, the largest 10% frequency particle size (Y) satisfies Y≤1.6X, and the smallest 10% frequency particle size (Z) satisfies Z≥0.7X.

(3) The average particle size (X) satisfies X=300 to 800 nm, the largest 10% frequency particle size (Y) satisfies Y≤1.7X, and the smallest 10% frequency particle size (Z) satisfies Z≥0.6X.

When the rubbery polymer (A-III) of the fourth invention has a uniform particle size satisfying the particle size distribution (2) or (3) above, a thermoplastic resin molded article particularly excellent in impact resistance, molded appearance, and color developability can be obtained by incorporating the graft copolymer (B-III) produced using the rubbery polymer (A-III) into a thermoplastic resin composition. When miniemulsion polymerization is used, the rubbery polymer (A-III) satisfying the average particle size and particle size distribution described above can be readily produced.

The average particle size (X) of the rubbery polymer (A-III) of the fourth invention is more preferably 200 to 400 nm. For the particle size distribution of the rubbery polymer (A-III) of the fourth invention, more preferably, the largest 10% frequency particle size (Y) satisfies Y≤1.4X, and the smallest 10% frequency particle size (Z) satisfies Z≥0.8X.

The average particle size and particle size distribution of the rubbery polymer (A-III) of the fourth invention are measured by the methods described in the section of EXAMPLES below.

[Graft Copolymer (B-III)]

The graft copolymer (B-III) of the fourth invention includes the rubbery polymer (A-III) of the fourth invention and at least one monomer selected from aromatic vinyl compounds, (meth)acrylic acid esters, and vinyl cyanide compounds (hereinafter referred to as the "graft monomer component") graft-polymerized onto the rubbery polymer (A-III).

The graft monomer component may include a vinyl monomer other than aromatic vinyl compounds, (meth) acrylic acid esters, and vinyl cyanide compounds.

Of these graft monomer components, the use of a mixture of an aromatic vinyl compound, preferably styrene, and a vinyl cyanide compound, preferably acrylonitrile, advantageously provides the graft copolymer (B-III) with excellent thermal stability. In this case, the proportions of the aromatic vinyl compound such as styrene and the vinyl cyanide compound such as acrylonitrile are preferably such that the proportion of the aromatic vinyl compound is 50% to 90% by mass and the proportion of the vinyl cyanide compound is 10% to 50% by mass (provided that the total amount of the aromatic vinyl compound and the vinyl cyanide compound is 100% by mass).

The graft copolymer (B-III) is preferably obtained by emulsion graft polymerization of 10% to 90% by mass of the rubbery polymer (A-III) and 90% to 10% by mass of the graft monomer component (provided that the total amount of the rubbery polymer (A-III) and the graft monomer component is 100% by mass). This is because a molded article having an excellent appearance is provided. More preferably, the proportion of the rubbery polymer (A-III) is 30% to 70% by mass, and the proportion of the graft monomer component is 70% to 30% by mass.

Examples of the method for graft-polymerizing the graft monomer component onto the rubbery polymer (A-III) include a method in which the graft monomer component is added to a latex of the rubbery polymer (A-III) obtained by miniemulsion polymerization and polymerization is performed in a single-stage or multistage manner. When polymerization is performed in a multistage manner, the polymerization is preferably performed by adding the graft monomer component in multiple portions or in a continuous manner in the presence of a rubber latex of the rubbery polymer (A-III). By such a polymerization method, good polymerization stability is provided, and a latex having the desired particle size and particle size distribution can be stably obtained. Examples of polymerization initiators used for the graft polymerization include those which are the same as the above-described radical polymerization initiators used for miniemulsion polymerization of the alkyl (meth)acrylate.

When the graft monomer component is polymerized onto the rubbery polymer (A-III), an emulsifier can be added in order to stabilize the latex and control the average particle size the resulting graft copolymer (B-III). Examples of emulsifiers used here include, but are not limited to, those which are the same as the above-described emulsifiers used for miniemulsion polymerization of the alkyl (meth)acrylate. Preferred emulsifiers are anionic emulsifiers and nonionic emulsifiers.

The amount of emulsifier used when the graft monomer component is polymerized is not particularly limited but is preferably 0.1 to 10 parts by mass, more preferably 0.2 to 5 parts by mass, relative to 100 parts by mass of the resulting graft copolymer (B-III).

Examples of the method for collecting the graft copolymer (B-III) from the latex of the graft copolymer (B-III) obtained by emulsion polymerization include, but are not limited to, the following method.

The latex of the graft copolymer (B-III) is placed in hot water in which a coagulant is dissolved to solidify the graft copolymer (B-III). The solidified graft copolymer (B-III) is then redispersed in water or warm water to form a slurry, and an emulsifier residue remaining in the graft copolymer (B-III) is eluted into water and washed. The slurry is then dehydrated with a dehydrator or the like, and the resulting solid is dried with a flash dryer or the like to thereby collect the graft copolymer (B-III) as powder or particles.

Examples of coagulants include inorganic acids (e.g., sulfuric acid, hydrochloric acid, phosphoric acid, and nitric acid) and metal salts (e.g., calcium chloride, calcium acetate, and aluminum sulfate). The coagulant is appropriately selected according to the type of emulsifier. For example, when a carboxylic acid salt (e.g., a fatty acid salt or rosin acid soap) alone is used as an emulsifier, any coagulant may be used. When an emulsifier that shows stable emulsifying power even in the acidic region, such as sodium alkylbenzene sulfonate, is used as an emulsifier, an inorganic acid is insufficient, and it is necessary to use a metal salt.

The average particle size of the graft copolymer (B-III) of the fourth invention produced as described above using the rubbery polymer (A-III) having the above-described preferred average particle size and particle size distribution is typically 150 to 600 nm, preferably 180 to 500 nm.

The average particle size of the graft copolymer (B-III) is measured by the method described in the section of EXAMPLES below.

[Thermoplastic Resin Composition]

A thermoplastic resin composition of the fourth invention contains the graft copolymer (B-III) of the fourth invention. The content of the graft copolymer (B-III) in 100 parts by mass of the thermoplastic resin composition is preferably 20 to 60 parts by mass. When the content of the graft copolymer (B-III) in the thermoplastic resin composition is less than 20 parts by mass, the amount of rubber is small, and the impact resistance of a molded article obtained tends to be low. When the content of the graft copolymer (B-III) in the thermoplastic resin composition is more than 60 parts by mass, the pigmentability and physical property balance of a molded article obtained tend to be poor.

In view of the balance of impact resistance, color developability, and other physical properties, the content of the graft copolymer (B-III) in 100 parts by mass of the thermoplastic resin composition of the fourth invention is more preferably 30 to 40 parts by mass.

The thermoplastic resin composition of the fourth invention may optionally contain any other thermoplastic resin and additives.

Examples of other thermoplastic resins include one or two or more of polyvinyl chloride, polystyrene, acrylonitrile-styrene copolymers, styrene-acrylonitrile-N-phenylmaleimide copolymers, α-methylstyrene-acrylonitrile copolymers, polymethyl methacrylate, methyl methacrylate-styrene copolymers, polycarbonate, polyamide, polyesters such as polyethylene terephthalate and polybutylene terephthalate, and polyphenylene ether-polystyrene composites. Of these, acrylonitrile-styrene copolymers are preferred from the viewpoint of impact resistance and flowability.

Examples of additives include colorants such as pigments and dyes, fillers (e.g., carbon black, silica, and titanium oxide), flame retardants, stabilizers, reinforcing agents, processing aids, heat stabilizers, antioxidants, weathering agents, release agents, plasticizers, and antistatic agents.

The thermoplastic resin composition of the fourth invention is produced by mixing and dispersing the graft copolymer (B-III) and, optionally, any other thermoplastic resin and additives by using a V-type blender, a Henschel mixer, or the like and melt-kneading the resulting mixture by using, for example, a kneading machine such as an extruder, a Banbury mixer, a pressure kneader, or a roller.

The order of mixing of components is not particularly limited as long as all the components are uniformly mixed.

[Molded Article]

A molded article of the fourth invention is obtained by molding the thermoplastic resin composition of the fourth invention and is excellent in impact resistance, molded appearance, and color developability.

The method for molding the thermoplastic resin composition of the fourth invention is the same as the method for molding the thermoplastic resin composition of the second invention, and the preferred molding method is also the same.

The molded article of the fourth invention obtained by molding the thermoplastic resin composition of the fourth invention is excellent in impact resistance, molded appearance, and color developability thus is suitable for automotive interior and exterior parts, office machines, household electrical appliances, building materials, etc.

Examples of industrial applications of the molded article of the fourth invention obtained by molding the thermoplastic resin composition of the fourth invention include automotive parts, particularly, various exterior and interior parts used without paint, building material parts such as wall materials and window frames, tableware, toys, household electrical appliance parts such as cleaner housings, television housings, and air-conditioner housings, interior materials, ship materials, and communication device housings.

EXAMPLES

Examples will be specifically described below. It should be noted that the present invention is not limited to the following examples. Hereinafter, "%" means "% by mass", and "parts" means "parts by mass".

Examples and Comparative Examples of First Invention

[Methods of Measurements, Evaluations, and Operations]

Methods of various measurements, evaluations, and operations therefor in the following Examples and Comparative Examples are as described below.

<Average Particle Size>

For the composite rubber-like polymer (A), the volume average particle size (MV) measured using a Microtrac ("Nanotrac 150" available from Nikkiso Co., Ltd.) and pure water as a measurement solvent was used as an average particle size.

<Refractive Index>

The refractive index of the composite rubber-like polymer (A) and the thermoplastic resin (D) was measured at 23° C. using an Abbe refractometer "KPR-30A" available from Shimadzu Corporation. The refractive index of the composite rubber-like polymer (A) was measured after the composite rubber-like polymer (A) was recovered from an emulsion of the composite rubber-like polymer (A) by precipitation with isopropyl alcohol and dried.

<Melt Kneading 1-1>

The graft copolymer (C) and the thermoplastic resin (D) were mixed together, and 0.8 parts of carbon black ("#966B" available from Mitsui Chemicals, Inc.) was mixed with 100 parts of the total amount of the graft copolymer (C) and the thermoplastic resin (D). Using a twin-screw extruder ("PCM30" available from Ikegai Corp.) having a diameter of 30 mm and equipped with a vacuum vent, melt kneading was performed at a cylinder temperature of 200° C. to 260° C. and a reduced pressure of 93.325 kPa to obtain a black-colored thermoplastic resin composition. After the melt kneading, pelletization was performed using a pelletizer ("Model SH pelletizer" available from Soukensya).

<Melt Kneading 1-2>

The graft copolymer (C) and the thermoplastic resin (D) were mixed together, and using a twin-screw extruder ("PCM30" available from Ikegai Corp.) having a diameter of 30 mm and equipped with a vacuum vent, melt kneading was performed at a cylinder temperature of 200° C. to 260° C. and a reduced pressure of 93.325 kPa to obtain a transparent thermoplastic resin composition. After the melt kneading, pelletization was performed using a pelletizer ("Model SH pelletizer" available from Soukensya).

<Injection Molding 1-1>

Using the pellets of the thermoplastic resin compositions obtained in Melt Kneading 1-1 and/or Melt Kneading 1-2, a molded article 80 mm long, 10 mm wide, and 4 mm thick was molded with an injection molding machine ("IS55FP-1.5A" available from Toshiba Machine Co., Ltd.) under the conditions of a cylinder temperature of 200° C. to 270° C. and a mold temperature of 60° C. and used as a molded article for Charpy impact testing.

<Injection Molding 1-2>

Using the pellets of the thermoplastic resin compositions obtained in Melt Kneading 1-1 and/or Melt Kneading 1-2, molded articles 100 mm long, 100 mm wide, and 2 mm thick were molded with an injection molding machine ("IS55FP-1.5A" available from Toshiba Machine Co., Ltd.) under the conditions of a cylinder temperature of 200° C. to 270° C. and a mold temperature of 60° C. and used as a molded article for color developability evaluation, a molded article for transparency evaluation, and a molded article for weather resistance evaluation.

<Color Developability>

The molded article for color developability evaluation molded using the black-colored thermoplastic resin composition obtained in Melt Kneading 1-1 was measured for lightness L* by the SCE method using a spectrocolorimeter ("CM-3500d" available from Konica Minolta Optics, Inc). The measured L* is defined as "L* (ma)". The lower the L*, the blacker the molded article and the better the color developability.

"Lightness (L*)" means a lightness value (L*) among color values in the L*a*b* color system employed in JIS Z 8729.

The "SCE method" means a method for measuring color by using a spectrocolorimeter in accordance with JIS Z 8722 with specular reflection being removed by light trapping.

<Transparency>

The haze value (Hz) of the molded article for transparency evaluation molded using the transparent thermoplastic resin composition obtained in Melt Kneading 1-2 was measured with a haze meter (available from Murakami Color Research Laboratory Co., Ltd). The smaller the haze, the higher the transparency.

<Weather Resistance>

In the case of the molded article for weather resistance evaluation molded using the black-colored thermoplastic resin composition obtained in Melt Kneading 1-1, the molded article for weather resistance evaluation was treated for 1500 hours using a Sunshine Weather Meter (available from Suga Test Instruments Co., Ltd.) under the conditions of a black panel temperature of 63° C. and a cycle of 60 minutes (rainfall: 12 minutes). The degree of change in color (ΔE) before and after the treatment was measured with a spectrocolorimeter ("CM-3500d" available from Konica Minolta Optips, Inc.) and evaluated. The smaller the ΔE, the better the weather resistance.

In the case of the molded article for weather resistance evaluation molded using the transparent thermoplastic resin composition obtained in Melt Kneading 1-2, the molded article for weather resistance evaluation was treated for 1500 hours using a Sunshine Weather Meter (available from Suga Test Instruments Co., Ltd.) under the conditions of a black panel temperature of 63° C. and a cycle of 60 minutes (rainfall: 12 minutes). The change in haze (ΔHz) before and after the treatment was measured with a haze meter (available from Murakami Color Research Laboratory Co., Ltd). The smaller the ΔHz, the better the weather resistance.

<Impact Resistance>

The Charpy impact strength of the molded article for Charpy impact testing was measured by performing a Charpy impact test (unnotched) under the condition of 23° C. in accordance with ISO 179 standard. The Charpy impact strength of a molded article obtained using an acrylonitrile-styrene copolymer resin, i.e., a thermoplastic resin (D2) described below was measured by a notched Charpy impact test.

[Production of Graft Copolymers]

<Production Example 1-1: Graft Polymer (C1)>

《Production of Composite Rubber-Like Polymer (A1)》

Twenty four parts of polymethylphenyl siloxane "HIVAC-F-5" (refractive index: 1.575, viscosity: 160 mm$^2$/s) available from Shin-Etsu Chemical Co., Ltd., 75 parts of n-butyl acrylate, 1 part of allyl methacrylate were mixed together to obtain a mixture (Ac1). While stirring the mixture obtained, 310 parts of deionized water, 1 part of dipotassium alkenyl succinate, 0.1 parts of t-butyl hydroperoxide, and 2.5 parts of hexadecane, ultrasonic irradiation was performed at an amplitude of 35 μm for 20 minutes using an "ULTRASONIC HOMOGENIZER US-600" available from Nihonseiki Kaisha Ltd. to obtain a miniemulsion of the mixture (Ac1).

The miniemulsion of the mixture (Ac1) was loaded into a reaction vessel equipped with a reagent injector, a condenser, a jacket heater, and a stirring device. The reaction vessel was purged with nitrogen, and the temperature was then raised to 55° C. Next, 0.3 parts of Rongalite, 0.0001 parts of ferrous sulfate heptahydrate, 0.0003 parts of disodium ethylenediaminetetraacetate, and 10 parts of deionized water were added to initiate polymerization. After polymerization exotherm was observed, the jacket temperature was set at 75° C., and the polymerization was continued until polymerization exotherm was not observed anymore. The resultant was further maintained for 1 hour to obtain an emulsion of a composite rubber-like polymer (A1). The volume average particle size of the emulsion of the composite rubber-like polymer (A1) was 122 nm.

《Production of Graft Copolymer (C1)》

To the emulsion (solid content: 50 parts) of the composite rubber-like polymer (A1), an aqueous solution of 0.0002 parts of ferrous sulfate heptahydrate, 0.0006 parts of disodium ethylenediaminetetraacetate, and 0.25 parts of Rongalite in 10 parts of ion-exchanged water was added. Next, while adding dropwise 49.2 parts of methyl methacrylate, 0.8 parts of methyl acrylate, and 0.2 parts of t-butyl hydroperoxide over 100 minutes, graft polymerization was performed at 75° C. Next, 150 parts of an aqueous solution in which calcium acetate was dissolved in a proportion of 5% were heated to 60° C., and while stirring the aqueous solution, the emulsion obtained was gradually added dropwise thereto to be coagulated. The coagulation obtained was separated, washed, and then dried to obtain a dry powder of a graft copolymer (C1).

<Production Example 1-2: Graft Polymer (C2)>

A composite rubber-like polymer (A2) and a graft polymer (C2) were obtained by performing the reaction under the same reaction conditions as in Production Example 1-1 except that 66.3 parts of polymethylphenyl siloxane "KF-54" (refractive index: 1.505, viscosity: 400 mm$^2$/s) available from Shin-Etsu Chemical Co., Ltd., 32.7 parts of n-butyl acrylate, and 1 part of allyl methacrylate were used in place of 24 parts of polymethylphenyl siloxane "HIVAC F-5" available from Shin-Etsu Chemical Co., Ltd., 75 parts of n-butyl acrylate, and 1 part of allyl methacrylate. The volume average particle size of the composite rubber-like polymer (A2) was 125 nm.

<Production Example 1-3: Graft Polymer (C3)>

A composite rubber-like polymer (A3) and a graft polymer (C3) were obtained by performing the reaction under the same reaction conditions as in Production Example 1-1 except that ultrasonic irradiation was performed at an amplitude of 20 μm for 20 minutes using an "ULTRASONIC HOMOGENIZER US-600" available from Nihonseiki Kaisha Ltd. The volume average particle size of the composite rubber-like polymer (A3) was 282 nm.

<Production Example 1-4: Graft Polymer (C4)>

《Production of Composite Rubber-Like Polymer (A4)》

Twenty four parts of polymethylphenyl siloxane "HIVAC F-5" available from Shin-Etsu Chemical Co., Ltd., 75 parts of n-butyl acrylate, 1 part of allyl methacrylate, and 0.1 parts of t-butyl hydroperoxide were mixed together. The resulting mixture, 310 parts of deionized water, and 1 part of dipotassium alkenyl succinate were loaded into a reaction vessel equipped with a reagent injector, a condenser, a jacket heater, and a stirring device. The reaction vessel was purged with nitrogen, and the temperature was then raised to 55° C.

Next, 0.3 parts of Rongalite, 0.0001 parts of ferrous sulfate heptahydrate, 0.0003 parts of disodium ethylenediaminetetraacetate, and 10 parts of deionized water were added to initiate polymerization. After polymerization exotherm was observed, the jacket temperature was set at 75° C., and the polymerization was continued until polymerization exotherm was not observed anymore. The resultant was further maintained for 1 hour and filtered through a 200-mesh wire net to obtain an emulsion of a composite rubber-like polymer (A4). When the reaction vessel after the reaction was inspected, a large amount of oily deposit was observed, demonstrating that the polymethylphenyl siloxane "HIVAC F-5" was not sufficiently combined in the composite rubber-like polymer (A4). The volume average particle size of the composite rubber-like polymer (A4) was 102 nm.

«Production of Graft Polymer (C4)»

A graft polymer (C4) was obtained in the same manner as in Production Example 1-1 except that the composite rubber-like polymer (A4) was used in place of the composite rubber-like polymer (A1).

<Production Example 1-5: Graft Polymer (C5)>
«Production of Composite Rubber-Like Polymer (A5)»

While stirring 24 parts of polymethylphenyl siloxane "HIVAC F-5" available from Shin-Etsu Chemical Co., Ltd., 310 parts of deionized water, and 1 part of dipotassium alkenyl succinate, ultrasonic irradiation was performed at an amplitude of 35 µm for 20 minutes using an "ULTRASONIC HOMOGENIZER US-600" available from Nihonseiki Kaisha Ltd.

Next, the resulting polymethylphenyl siloxane emulsion, 0.3 parts of Rongalite, 0.0001 parts of ferrous sulfate heptahydrate, and 0.0003 parts of disodium ethylenediaminetetraacetate were loaded into a reaction vessel equipped with a reagent injector, a condenser, a jacket heater, and a stirring device, and the reaction vessel was purged with nitrogen. After the temperature was raised to 70° C., polymerization was performed while adding dropwise 75 parts of n-butyl acrylate, 1 part of allyl methacrylate, and 0.1 parts of t-butyl hydroperoxide for 60 minutes. Next, the jacket temperature was set at 75° C. and further maintained for 1 hour to obtain an emulsion of a composite rubber-like polymer (A5). The volume average particle size of the emulsion of the composite rubber-like polymer (A5) was 142 nm «Production of Graft Polymer (C5)»

A graft polymer (C5) was obtained in the same manner as in Production Example 1-1 except that the composite rubber-like polymer (A5) was used in place of the composite rubber-like polymer (A1).

<Production Example 1-6: Graft Polymer (C6)>

A composite rubber-like polymer (A6) and a graft polymer (C6) were obtained by performing the reaction under the same conditions as in Production Example 1-5 except that the addition amount of dipotassium alkenyl succinate was 0.7 parts and the amplitude of the "ULTRASONIC HOMOGENIZER US-600" available from Nihonseiki Kaisha Ltd. was 20 µm. The volume average particle size of the composite rubber-like polymer (A6) was 302 nm.

<Graft Polymer (C7)>"MUX-60" available from UMG ABS, Ltd. was used as a graft polymer (C7) in which methyl methacrylate was graft-polymerized onto a composite rubber-like polymer of polybutadiene and n-butyl polyacrylate.

<Production Example 1-7: Graft Polymer (C8)>

A composite rubber-like polymer (A8) and a graft polymer (C8) were obtained by performing the reaction under the same conditions as in Production Example 1-1 except that in producing a composite rubber-like polymer, 50 parts of polymethylphenyl siloxane "HIVAC F-5" available from Shin-Etsu Chemical Co., Ltd., 49 parts of n-butyl acrylate, and 1 part of allyl methacrylate were used in place of 24 parts of polymethylphenyl siloxane "HIVAC F-5" available from Shin-Etsu Chemical Co., Ltd., 75 parts of n-butyl acrylate, and 1 part of allyl methacrylate, and in producing a graft copolymer, 49.2 parts of methyl methacrylate and 0.8 parts of methyl acrylate were changed to 35 parts of styrene and 15 parts of acrylonitrile. The volume average particle size of the composite rubber-like polymer (A8) was 155 nm.

<Production Example 1-8: Graft Polymer (C9)>

A composite rubber-like polymer (A9) and a graft polymer (C9) were obtained by performing the reaction under the same conditions as in Production Example 1-1 except that in producing a composite rubber-like polymer, 14 parts of polydimethylsiloxane "KF-96-500cs" (refractive index: 1.403, viscosity: 500 $mm^2$/s) available from Shin-Etsu Chemical Co., Ltd., 35 parts of n-butyl acrylate, and 1 part of allyl methacrylate were used in place of 24 parts of polymethylphenyl siloxane "HIVAC F-5" available from Shin-Etsu Chemical Co., Ltd., 75 parts of n-butyl acrylate, and 1 part of allyl methacrylate, and in producing a graft copolymer, 49.2 parts of methyl methacrylate, 0.8 parts of methyl acrylate were changed to 35 parts of styrene and 15 parts of acrylonitrile. The volume average particle size of the composite rubber-like polymer (A9) was 111 nm.

<Production Example 1-9: Graft Polymer (C10)>

A composite rubber-like polymer (A10) and a graft polymer (C10) were obtained by performing the reaction under the same conditions as in Production Example 1-5 except that in producing a composite rubber-like polymer, 14 parts of polydimethylsiloxane "KF-96-500cs" available from Shin-Etsu Chemical Co., Ltd., 35 parts of n-butyl acrylate, and 1 part of allyl methacrylate were used in place of 24 parts of polymethylphenyl siloxane "HIVAC F-5" available from Shin-Etsu Chemical Co., Ltd., 75 parts of n-butyl acrylate, and 1 part of allyl methacrylate, and in producing a graft copolymer, 49.2 parts of methyl methacrylate, 0.8 parts of methyl acrylate were changed to 35 parts of styrene and 15 parts of acrylonitrile. The volume average particle size of the composite rubber-like polymer (A10) was 138 nm.

<Production Example 1-10: Graft Polymer (C11)>

A graft polymer (C11) was obtained in the same manner as in Production Example 1-1 except that the composite rubber-like polymer (A8) was used in place of the composite rubber-like polymer (A1).

<Production Example 1-11: Graft Polymer (C12)>

A composite rubber-like polymer (A12) and a graft polymer (C12) were obtained by performing the reaction under the same conditions as in Production Example 1-1 except that in producing a composite rubber-like polymer, 8 parts of polymethylphenyl siloxane "HIVAC F-5" available from Shin-Etsu Chemical Co., Ltd., 91 parts of n-butyl acrylate, and 1 part of allyl methacrylate were used in place of 24 parts of polymethylphenyl siloxane "HIVAC F-5" available from Shin-Etsu Chemical Co., Ltd., 75 parts of n-butyl acrylate, and 1 part of allyl methacrylate. The volume average particle size of the composite rubber-like polymer (A12) was 132 nm.

[Production of Thermoplastic Resins]
<Production Example 1-12: Thermoplastic Resin (D1)>

Into a nitrogen-purged stainless steel reaction vessel equipped with a stirrer, 150 parts of deionized water, 99 parts of methyl methacrylate, 1 part of methyl acrylate, 0.2 parts of 2,2'-azobis(isobutyronitrile), 0.25 parts of n-octyl mercaptan, 0.47 parts of calcium hydroxyapatite, and 0.003 parts of potassium alkenyl succinate were loaded. The inner temperature of the reaction vessel was set at 75° C., and the reaction was allowed to proceed for 3 hours. The temperature was then raised to 90° C., and the reaction was allowed to proceed for 1 hour. The contents were extracted, washed with a centrifugal dehydrator, and dried to obtain a powdery thermoplastic resin (D1).

<Production Example 1-13: Thermoplastic Resin (D2)>

Into a nitrogen-purged stainless steel reaction vessel equipped with a stirrer, 120 parts of deionized water, 0.47 parts of calcium hydroxyapatite, 0.003 parts of potassium alkenyl succinate, 0.3 parts of 2,2'-azobis(isobutyronitrile), 30 parts of acrylonitrile, 70 parts of styrene, and 0.35 parts of t-dodecyl mercaptan were loaded. The starting temperature was set at 75° C., and the reaction was allowed to proceed for 5 hours. The temperature was then raised to 120° C., and the reaction was allowed to proceed for 2 hours. The contents were taken out, washed with a centrifugal dehydrator, and dried to obtain a powdery thermoplastic resin (D2).

<Production Example 1-14: Thermoplastic Resin (D3)>

Into a nitrogen-purged stainless steel reaction vessel equipped with a stirrer, 150 parts of deionized water, 82 parts of methyl methacrylate, 12 parts of N-phenylmaleimide, 6 parts of styrene, 0.2 parts of 2,2'-azobis(isobutyronitrile), 0.25 parts of n-octyl mercaptan, 0.67 parts of calcium hydroxyapatite, and 0.003 parts of potassium alkenyl succinate were loaded. The inner temperature of the reaction vessel was set at 75° C., and the reaction was allowed to proceed for 3 hours. The temperature was then raised to 90° C., and the reaction was allowed to proceed for 1 hour. The contents were extracted, washed with a centrifugal dehydrator, and dried to obtain a powdery thermoplastic resin (D3).

Table 1 summarizes the volume average particle sizes and refractive indices of the composite rubber-like polymers (A) used for the graft copolymers (C) and the refractive index of the thermoplastic resins (D).

TABLE 1

| | | Volume average particle size (nm) | Refractive index | Remarks |
|---|---|---|---|---|
| Graft copolymer (C1) | Composite rubber-like polymer (A1) | 122 | 1.494 | Present invention example |
| Graft copolymer (C2) | Composite rubber-like polymer (A2) | 125 | 1.492 | Present invention example |
| Graft copolymer (C3) | Composite rubber-like polymer (A3) | 282 | 1.492 | Present invention example |
| Graft copolymer (C4) | Composite rubber-like polymer (A4) | 102 | 1.471 | Comparative example |
| Graft copolymer (C5) | Composite rubber-like polymer (A5) | 142 | 1.496 | Comparative example |
| Graft copolymer (C6) | Composite rubber-like polymer (A6) | 302 | 1.492 | Comparative example |
| Graft copolymer (C8) | Composite rubber-like polymer (A8) | 155 | 1.521 | Present invention example |
| Graft copolymer (C9) | Composite rubber-like polymer (A9) | 111 | 1.446 | Present invention example |
| Graft copolymer (C10) | Composite rubber-like polymer (A10) | 138 | 1.448 | Comparative example |
| Graft copolymer (C11) | Composite rubber-like polymer (A8) | 155 | 1.521 | Present invention example |
| Graft copolymer (C12) | Composite rubber-like polymer (A12) | 132 | 1.475 | Present invention example |
| Thermoplastic resin (D1) | — | — | 1.492 | — |
| Thermoplastic resin (D2) | — | — | 1.569 | — |
| Thermoplastic resin (D3) | — | — | 1.515 | — |

Examples 1-1 to 1-5, Comparative Examples 1-1 to 1-5

The graft copolymer (C) and the thermoplastic resin (D1) in amounts shown in Table 2 were pelletized by the method of Melt Kneading 1-1 described above, and molded articles were obtained by injection molding. The molded articles obtained were evaluated for color developability, weather resistance, and impact resistance. The results are shown in Table 2.

TABLE 2

| | | | Example 1-1 | Example 1-2 | Example 1-3 | Example 1-4 | Example 1-5 | Comparative example 1-1 | Comparative example 1-2 | Comparative example 1-3 | Comparative example 1-4 | Comparative example 1-5 |
|---|---|---|---|---|---|---|---|---|---|---|---|---|
| Amount (parts) | Graft copolymer(C) | C1 | 10 | 40 | 60 | | | | | | | |
| | | C2 | | | | 40 | | | | | | |
| | | C3 | | | | | 40 | | | | | |
| | | C4 | | | | | | 40 | | | | |
| | | C5 | | | | | | | 40 | | | |
| | | C6 | | | | | | | | 40 | | |
| | | C7 | | | | | | | | | 40 | |

TABLE 2-continued

|  |  |  | Example 1-1 | Example 1-2 | Example 1-3 | Example 1-4 | Example 1-5 | Comparative example 1-1 | Comparative example 1-2 | Comparative example 1-3 | Comparative example 1-4 | Comparative example 1-5 |
|---|---|---|---|---|---|---|---|---|---|---|---|---|
|  | Thermoplastic resin (D) | D1 | 90 | 60 | 40 | 60 | 60 | 60 | 60 | 60 | 60 | 100 |
| Evaluation results | Color developability | L* | 3.8 | 4.2 | 4.3 | 3.8 | 4.0 | 7.2 | 6.2 | 8.1 | 4.0 | 3.5 |
|  | Weather resistance | ΔE | 0.5 | 1.0 | 1.1 | 0.9 | 1.1 | 1.0 | 1.1 | 1.3 | 9.6 | 0.5 |
|  | Impact resistance | kJ/m² | 22 | 53 | 82 | 57 | 65 | 33 | 55 | 66 | 78 | 17 |

As shown in Examples 1-1 to 1-5, the graft copolymers (C) of the first invention can provide thermoplastic resin compositions and molded articles thereof excellent in weather resistance, color developability, and impact resistance. By contrast, as shown in Comparative Examples 1-1 to 1-3, the graft polymers polymerized without going through miniemulsification of the mixture (Ac) and the thermoplastic resin compositions including the graft polymers have poor color developability. As shown in Comparative Example 1-4, the use of a graft polymer obtained by using polybutadiene instead of polyorganosiloxane in a composite rubber-like polymer results in poor weather resistance. Comparative Example 1-5 is poor in impact resistance because the graft copolymer (C) is not included.

Examples 1-6 and 1-7, Comparative Example 1-6

The graft copolymer (C) and the thermoplastic resin (D2) in amounts shown in Table 3 were pelletized by the method of Melt Kneading 1-1 described above, and molded articles were obtained by injection molding. The molded articles obtained were evaluated for color developability, weather resistance, and impact resistance. The results are shown in Table 3.

TABLE 3

|  |  |  | Example 1-6 | Example 1-7 | Comparative example 1-6 |
|---|---|---|---|---|---|
| Amount (parts) | Graft copolymer(C) | C8 | 40 |  |  |
|  |  | C9 |  | 40 |  |
|  |  | C10 |  |  | 40 |

TABLE 3-continued

|  |  |  | Example 1-6 | Example 1-7 | Comparative example 1-6 |
|---|---|---|---|---|---|
|  | Thermoplastic resin (D) | D2 | 60 | 60 | 60 |
| Evaluation results | Color developability | L* | 4.8 | 5.5 | 7.2 |
|  | Weather resistance | ΔE | 1.5 | 1.7 | 1.6 |
|  | Impact resistance | kJ/m² | 22 | 28 | 26 |

As shown in Examples 1-6 and 1-7, the graft copolymers (C) of the first invention can provide thermoplastic resin compositions and molded articles thereof excellent in weather resistance, color developability, and impact resistance. By contrast, as shown in Comparative Example 1-6, the thermoplastic resin composition including a graft polymer polymerized without going through miniemulsification of the mixture (Ac) has poor color developability.

Examples 1-8 to 1-10, Comparative Example 1-7, Reference Example 1-1

The graft copolymer (C) and the thermoplastic resin (D1) or the thermoplastic resin (D3) in amounts shown in Table 4 were pelletized by the method of Melt Kneading 1-2 described above, and molded articles were obtained by injection molding. The molded articles obtained were evaluated for color developability, transparency, weather resistance, and impact resistance. The results are shown in Table 4.

TABLE 4

|  |  |  | Example 1-8 | Example 1-9 | Example 1-10 | Comparative example 1-7 | Reference Example 1-1 |
|---|---|---|---|---|---|---|---|
| Amount (parts) | Graft copolymer(C) | C1 | 40 |  |  |  |  |
|  |  | C11 |  | 40 |  |  | 40 |
|  |  | C12 |  |  | 40 |  |  |
|  |  | C5 |  |  |  | 40 |  |
|  | Thermoplastic resin (D) | D1 | 60 |  | 60 | 60 | 60 |
|  |  | D3 |  | 60 |  |  |  |
| Refractive index difference※ |  |  | 0.002 | 0.006 | 0.017 | 0.004 | 0.029 |
| Evaluation results | Color developability | L* | 4.2 | 4.8 | 5.2 | 6.2 | 5.3 |
|  | Transparency | Hz(%) | 0.9 | 3.3 | 8.2 | 9.1 | 11.3 |
|  | Weather resistance | ΔHz(%) | 0.7 | 1.2 | 1.1 | 0.9 | 1.2 |
|  | Impact resistance | kJ/m² | 53 | 48 | 51 | 55 | 60 |

※Refractive index difference between graft copolymer (C) and thermoplastic resin (D)

As shown in Examples 1-8 to 1-10, when the refractive index difference between the graft copolymer (C) and the thermoplastic resin (D) is 0.02 or less in the first invention, a thermoplastic resin composition and a molded article thereof that are highly transparent are provided. By contrast, as shown in Comparative Example 1-7, in the thermoplastic resin composition including a graft polymer polymerized without going through miniemulsification of the mixture (Ac), the composition of the composite rubber-like polymer (A) is not uniform, and the transparency is poor although the refractive index difference between the graft copolymer (C) and the thermoplastic resin (D) is 0.02 or less.

Reference Example 1-1 is poor in transparency because the refractive index difference between the graft copolymer (C) and the thermoplastic resin (D) is more than 0.02 but is good in color developability, weather resistance, and impact resistance.

Examples and Comparative Examples of Second Invention

[Methods of Measurements and Evaluations]

Methods of various measurements, evaluations, and operations therefor in the following Examples and Comparative Examples are as described below.

<Measurement of Number Average Molecular Weight (Mn)>

The number average molecular weight (Mn) in terms of polystyrene was measured by GPC (GPC: "GPC/V2000" available from Waters, column: "Shodex AT-G+AT-806MS" available from Showa Denko K.K.) using o-dichlorobenzene (145° C.) as a solvent.

<Measurement of Average Particle Size>

The volume average particle size (MV) measured using a Microtrac ("Nanotrac 150" available from Nikkiso Co., Ltd.) and pure water as a measurement solvent was used as an average particle size.

It was confirmed by electron microscopic image analysis that the average particle size of the crosslinked particles (A-I) dispersed in the graft crosslinked particles (B-I) equated with the average particle size of the crosslinked particles (A-I) and the graft crosslinked particles (B-I) in a thermoplastic resin composition.

<Melt Kneading 2-1>

The crosslinked particles (A-I) or the graft crosslinked particles (B-I) and the thermoplastic resin (D-I) were mixed together, and using a twin-screw extruder ("PCM30" available from Ikegai Corp.) having a diameter of 30 mm and equipped with a vacuum vent, melt kneading was performed at a cylinder temperature of 200° C. to 260° C. and a reduced pressure of 93.325 kPa to obtain a transparent thermoplastic resin composition. After the melt kneading, pelletization was performed using a pelletizer ("Model SH pelletizer" available from Soukensya).

<Melt Kneading 2-2>

The crosslinked particles (A-I) or the graft crosslinked particles (B-I), the thermoplastic resin (D-I), and, furthermore, carbon black ("#966B" available from Mitsui Chemicals, Inc.) in an amount of 0.8 parts relative to 100 parts of the total of the crosslinked particles (A-I) or the graft crosslinked particles (B-I) and the thermoplastic resin (D-I) were mixed together, and using a twin-screw extruder ("PCM30" available from Ikegai Corp.) having a diameter of 30 mm and equipped with a vacuum vent, melt kneading was performed at a cylinder temperature of 200° C. to 260° C. and a reduced pressure of 93.325 kPa to obtain a black-colored thermoplastic resin composition. After the melt kneading, pelletization was performed using a pelletizer ("Model SH pelletizer" available from Soukensya).

<Measurement of Melt Volume Rate (MVR)>

The MVR of the thermoplastic resin composition obtained in Melt Kneading 2-1 was measured in accordance with ISO 1133 standard. The MVR indicates the flowability of the thermoplastic resin composition.

<Injection Molding 2-1>

Using the pellets of the thermoplastic resin composition obtained in Melt Kneading 2-1, a molded article 80 mm long, 10 mm wide, and 4 mm thick was molded with an injection molding machine ("IS55FP-1.5A" available from Toshiba Machine Co., Ltd.) under the conditions of a cylinder temperature of 200° C. to 270° C. and a mold temperature of 60° C. and used as a molded article for Charpy impact testing or a molded article for tensile testing.

<Injection Molding 2-2>

Using the pellets of the thermoplastic resin composition obtained in Melt Kneading 2-2, molded articles 100 mm long, 100 mm wide, and 2 mm thick were molded with an injection molding machine ("IS55FP-1.5A" available from Toshiba Machine Co., Ltd.) under the conditions of a cylinder temperature of 200° C. to 270° C. and a mold temperature of 60° C. and used as a molded article for color developability evaluation and a molded article for abrasion resistance evaluation.

<Evaluation of Impact Resistance>

The Charpy impact strength of the molded article for Charpy impact testing was measured by performing a Charpy impact test (notched) under the condition of 23° C. in accordance with ISO 179 standard.

<Evaluation of Color Developability>

The molded article for color developability evaluation was measured for lightness L* by the SCE method using a spectrocolorimeter ("CM-3500d" available from Konica Minolta Optips, Inc). The measured L* is defined as "L* (ma)". The lower the L*, the blacker the molded article and the better the color developability.

"Lightness L*" means a lightness value (L*) among color values in the L*a*b* color system employed in JIS Z 8729.

The "SCE method" means a method for measuring color by using a spectrocolorimeter in accordance with JIS Z 8722 with specular reflection being removed by light trapping.

<Evaluation of Abrasion Resistance>

As shown in FIG. 1, a rod-like jig 2 having a tip portion 1 formed in a substantially hemispherical shape was provided, and a laminate sheet S made of eight pieces of gauze superposed on one another was put on the tip portion 1. The tip portion 1 having the laminate sheet S put thereon was brought into contact with a surface of a molded article (test piece) M such that the rod-like jig 2 was perpendicular to the surface, and the tip portion 1 was slid on the surface of the molded article M in a horizontal direction (an arrow X direction in the FIGURE) and reciprocated 100 times. During this process, a load of 1 kg was applied. After the 100 reciprocations, the lightness L* of the abraded surface of the molded article M was measured by the SCE method using a spectrocolorimeter similarly to the above-described evaluation of color developability. The measured L* is defined as "L* (mc)".

(Assessment of Abrasion Resistance)

ΔL*, which is a benchmark for assessing the prominence of abrasions on the molded article M, was calculated from "L* (ma)" obtained in the above-described evaluation of color developability and "L* (mc)" by the following formula (5). Larger absolute values of ΔL* (mc−ma) indicate higher prominence of abrasions.

$$\Delta L^*(mc-ma) = L^*(mc) - L^*(ma) \quad (5)$$

Evaluations were made by using the absolute value of ΔL* (mc−ma) according to the following criteria. In the case of A and B, it was determined to have abrasion resistance.

A: The absolute value of ΔL* (mc−ma) is 2.0 or less. Abrasions are not prominent, and the design of a molded article is not impaired.

B: The absolute value of ΔL* (mc−ma) is more than 2.0 and 5.0 or less. Abrasions are less prominent, and the design of a molded article is not impaired.

D: the absolute value of ΔL* (mc−ma) is more than 5.0. Abrasions are prominent, and the design of a molded article is impaired.

<Measurement of Mold Shrinkage Rate>

According to ASTM D 955, the molded article for tensile testing was measured for its mold shrinkage rate from a mold dimension. The mold shrinkage rate is preferably 0.7% or less.

[Production of Di(meth)acrylic Acid Ester (a)]

<Production Example 2-1: Di(meth)acrylic Acid Ester (a-1)>

In a reaction vessel equipped with a distillator, 32.5 parts of polytetramethylene glycol (PTMG650; Mn, 650; available from Mitsubishi Chemical Corporation), 21.52 parts of methyl acrylate, 0.034 parts of hydroquinone, 0.17 parts of tetrabutoxy titanium, and 250 parts of toluene were placed and heated with stirring at a bath temperature of 130° C. to 140° C. for 9 hours under atmospheric pressure under a stream of nitrogen. During this process, a liquid containing methanol was distilled by distillation. After the reaction, 3.0 parts of water was added to the reaction solution, and the resultant was stirred at a bath temperature of 90° C. for 2 hours. Next, insoluble matter was removed by suction filtration. Toluene was distilled off at 120° C. under reduced pressure, and low-boiling components (e.g., methyl acrylate and residual toluene) were distilled off at 50 to 20 mmHg and a bath temperature of 120° C. to 190° C. to obtain a colorless, transparent polytetramethylene glycol diacrylate (di(meth)acrylic acid ester (a-1)). The number average molecular weight (Mn) of the di(meth)acrylic acid ester (a-1) measured by GPC was 670.

<Production Example 2-2: Di(meth)acrylic Acid Ester (a-2)>

A colorless, transparent polytetramethylene glycol diacrylate (di(meth)acrylic acid ester (a-2)) was obtained in the same manner as in Production Example 2-1 except that 42.5 parts of polytetramethylene glycol (PTMG850; Mn, 850; available from Mitsubishi Chemical Corporation) were used as polytetramethylene glycol. The number average molecular weight (Mn) of the di(meth)acrylic acid ester (a-2) measured by GPC was 860.

<Production Example 2-3: Di(meth)acrylic Acid Ester (a-3)>

A colorless, transparent polytetramethylene glycol diacrylate (di(meth)acrylic acid ester (a-3)) was obtained in the same manner as in Production Example 2-1 except that 50.0 parts of polytetramethylene glycol (PTMG1000; Mn, 1000; available from Mitsubishi Chemical Corporation) were used as polytetramethylene glycol. The number average molecular weight (Mn) of the di(meth)acrylic acid ester (a-3) measured by GPC was 1010.

<Production Example 2-4: Di(meth)acrylic Acid Ester (a-4)>

A colorless, transparent polytetramethylene glycol diacrylate (di(meth)acrylic acid ester (a-4)) was obtained in the same manner as in Production Example 2-1 except that 75.0 parts of polytetramethylene glycol (PTMG1500; Mn, 1500; available from Mitsubishi Chemical Corporation) were used as polytetramethylene glycol. The number average molecular weight (Mn) of the di(meth)acrylic acid ester (a-4) measured by GPC was 1560.

<Production Example 2-5: Di(meth)acrylic Acid Ester (a-5)>

A colorless, transparent polytetramethylene glycol diacrylate (di(meth)acrylic acid ester (a-5)) was obtained in the same manner as in Production Example 2-1 except that 100.0 parts of polytetramethylene glycol (PTMG2000; Mn, 2000; available from Mitsubishi Chemical Corporation) were used as polytetramethylene glycol. The number average molecular weight (Mn) of the di(meth)acrylic acid ester (a-5) measured by GPC was 2070.

<Production Example 2-6: Di(meth)acrylic Acid Ester (a-6)>

A colorless, transparent polytetramethylene glycol diacrylate (di(meth)acrylic acid ester (a-6)) was obtained in the same manner as in Production Example 2-1 except that 150.0 parts of polytetramethylene glycol (PTMG3000; Mn, 3000; available from Mitsubishi Chemical Corporation) were used as polytetramethylene glycol. The number average molecular weight (Mn) of the di(meth)acrylic acid ester (a-6) measured by GPC was 3020.

<Production Example 2-7: Di(meth)acrylic Acid Ester (a-7)>

A white polyethylene glycol diacrylate (di(meth)acrylic acid ester (a-7)) was obtained in the same manner as in Production Example 2-1 except that 300.0 parts of polyethylene glycol (PEG6000; Mn, 6000; available from TOHO Chemical Industry Co., Ltd.) were used in place of polytetramethylene glycol. The number average molecular weight (Mn) of the di(meth)acrylic acid ester (a-7) measured by GPC was 6040.

<Production Example 2-8: Di(meth)acrylic Acid Ester (a-8)>

A white polyethylene glycol diacrylate (di(meth)acrylic acid ester (a-8)) was obtained in the same manner as in Production Example 2-1 except that 400.0 parts of polyethylene glycol (PEG8000; Mn, 8000; available from MP Biomedicals) were used in place of polytetramethylene glycol. The number average molecular weight (Mn) of the di(meth)acrylic acid ester (a-8) measured by GPC was 8010.

<Production Example 2-9: Di(meth)acrylic Acid Ester (a-9)>

A white polyethylene glycol diacrylate (di(meth)acrylic acid ester (a-9)) was obtained in the same manner as in Production Example 2-1 except that 500.0 parts of polyethylene glycol (PEG10000; Mn, 10000; available from TOHO Chemical Industry Co., Ltd.) were used in place of polytetramethylene glycol. The number average molecular weight (Mn) of the di(meth)acrylic acid ester (a-9) measured by GPC was 10040.

<Production Example 2-10: Di(meth)acrylic Acid Ester (a-10)>

A colorless, transparent polycaprolactone diol diacrylate (di(meth)acrylic acid ester (a-10)) was obtained in the same manner as in Production Example 2-1 except that 100.0 parts of polycaprolactone diol (PRAXEL 220N; Mn, 2000; available from Daicel Corporation) were used in place of polytetramethylene glycol. The number average molecular weight (Mn) of the di(meth)acrylic acid ester (a-10) measured by GPC was 2040.

<Production Example 2-11: Di(meth)acrylic Acid Ester (a-11)>

A colorless, transparent polycarbonate diol diacrylate (di(meth)acrylic acid ester (a-11)) was obtained in the same manner as in Production Example 2-1 except that 100.0 parts of polycarbonate diol (UH-200; Mn, 2000; available from Ube Industries, Ltd.) were used in place of polytetramethylene glycol. The number average molecular weight (Mn) of the di(meth)acrylic acid ester (a-11) measured by GPC was 2020.

<Production Example 2-12: Di(meth)acrylic Acid Ester (a-12)>

A colorless, transparent polytetramethylene glycol dimethacrylate (di(meth)acrylic acid ester (a-12)) was obtained in the same manner as in Production Example 2-1 except that 150.0 parts of polytetramethylene glycol (PTMG3000; Mn, 3000; available from Mitsubishi Chemical Corporation) were used as polytetramethylene glycol and 25.02 parts of methyl methacrylate were used in place of methyl acrylate. The number average molecular weight (Mn) of the di(meth)acrylic acid ester (a-12) measured by GPC was 3020.

The component composition and number average molecular weight (Mn) of the di(meth)acrylic acid esters (a-1) to (a-12) obtained in Production Examples 2-1 to 2-12 are summarized in Table 5 below.

TABLE 5

| Di(meth)acrylic acid ester | X source Diol | Mn | (Meth)acrylic acid ester | Mn | Remark |
|---|---|---|---|---|---|
| a-1 | Polytetramethylene glycol | 650 | Methyl acrylate | 670 | For comparison |
| a-2 | Polytetramethylene glycol | 850 | Methyl acrylate | 860 | Present invention example |
| a-3 | Polytetramethylene glycol | 1000 | Methyl acrylate | 1010 | Present invention example |
| a-4 | Polytetramethylene glycol | 1500 | Methyl acrylate | 1560 | Present invention example |
| a-5 | Polytetramethylene glycol | 2000 | Methyl acrylate | 2070 | Present invention example |
| a-6 | Polytetramethylene glycol | 3000 | Methyl acrylate | 3020 | Present invention example |
| a-7 | Polyethylene glycol | 6000 | Methyl acrylate | 6040 | Present invention example |
| a-8 | Polyethylene glycol | 8000 | Methyl acrylate | 8010 | Present invention example |
| a-9 | Polyethylene glycol | 10000 | Methyl acrylate | 10040 | For comparison |
| a-10 | Polycaprolactone diol | 2000 | Methyl acrylate | 2040 | Present invention example |
| a-11 | Polycarbonate diol | 2000 | Methyl acrylate | 2020 | Present invention example |
| a-12 | Polytetramethylene glycol | 3000 | Methyl methacrylates | 3020 | Present invention example |

[Production of Crosslinked Particles (A-I) or Graft Crosslinked Particles (B-I)]

<Production Example 2-13: Crosslinked Particles (A-I-1)>

Forty parts of styrene, 20 parts of acrylonitrile, 310 parts of deionized water, 1 part of dipotassium alkenyl succinate, 0.2 parts of t-butyl hydroperoxide, and 2.5 parts of hexadecane were added to 40 parts of the di(meth)acrylic acid ester (a-1). While stirring the mixture, ultrasonic irradiation was performed using an ULTRASONIC HOMOGENIZER available from Nihonseiki Kaisha Ltd. at an amplitude output of 80% for 20 minutes to obtain a miniemulsion of a styrene-acrylonitrile solution in which the di(meth)acrylic acid ester (a-1) was dissolved.

The miniemulsion of the styrene-acrylonitrile solution in which the di(meth)acrylic acid ester (a-1) was dissolved was loaded into a reaction vessel equipped with a reagent injector, a condenser, a jacket heater, and a stirring device. The reaction vessel was purged with nitrogen, and the temperature was then raised to 55° C. Next, 0.3 parts of sodium formaldehyde sulfoxylate, 0.0001 parts of ferrous sulfate heptahydrate, 0.0003 parts of disodium ethylenediaminetetraacetate, and 10 parts of deionized water were added to initiate polymerization. After polymerization exotherm was observed, the jacket temperature was set at 80° C., and the polymerization was continued until polymerization exotherm was not observed anymore. The resultant was further maintained for 1 hour to obtain a water dispersion of crosslinked particles (A-I-1). The volume average particle size of the crosslinked particles (A-I-1) measured using the water dispersion of the crosslinked particles (A-I-1) was 0.15 μm. Next, the water dispersion of the crosslinked particles (A-I-1) was coagulated using 5% sulfuric acid, washed with water, and dried to obtain the crosslinked particles (A-I-1).

<Production Example 2-14: Crosslinked Particles (A-I-2) to (A-I-13)>

Crosslinked particles (A-I-2) to (A-I-13) were obtained in the same manner as in Production Example 2-13 except that the di(meth)acrylic acid esters (a-2) to (a-12) were used in place of the di(meth)acrylic acid ester (a-1) and the monomer compositions shown in Table 6 were used.

The volume average particle size of the crosslinked particles (A-I-1) to (A-I-13) is shown in Table 6.

TABLE 6

| Crosslinked particles | | A-I-1 | A-I-2 | A-I-3 | A-I-4 | A-I-5 | A-I-6 | A-I-7 | A-I-8 | A-I-9 | A-I-10 | A-I-11 | A-I-12 | A-I-13 |
|---|---|---|---|---|---|---|---|---|---|---|---|---|---|---|
| Monomer composition (parts) | Type and Mn of di(meth)acrylic acid ester | | | | | | | | | | | | | |
| | (a-1) Mn = 670 | 40 | | | | | | | | | | | | |
| | (a-2) Mn = 860 | | 40 | | | | | | | | | | | |
| | (a-3) Mn = 1010 | | | 40 | | | | | | | | | | |
| | (a-4) Mn = 1560 | | | | 40 | | | | | | | | | |
| | (a-5) Mn = 2070 | | | | | 40 | | | | | | | | |
| | (a-6) Mn = 3020 | | | | | | 40 | | | | | | | 40 |
| | (a-7) Mn = 6040 | | | | | | | 40 | | | | | | |
| | (a-8) Mn = 8010 | | | | | | | | 40 | | | | | |
| | (a-9) Mn = 10040 | | | | | | | | | 40 | | | | |
| | (a-10) Mn = 2040 | | | | | | | | | | 40 | | | |
| | (a-11) Mn = 2020 | | | | | | | | | | | 40 | | |
| | (a-12) Mn = 3020 | | | | | | | | | | | | 40 | |
| Styrene | | 40 | 40 | 40 | 40 | 40 | 40 | 40 | 40 | 40 | 40 | 40 | 40 | 45 |
| Acrylonitrile | | 20 | 20 | 20 | 20 | 20 | 20 | 20 | 20 | 20 | 20 | 20 | 20 | 15 |
| Volume average particle size (μm) | | 0.15 | 0.15 | 0.15 | 0.15 | 0.15 | 0.15 | 0.15 | 0.15 | 0.15 | 0.15 | 0.15 | 0.15 | 0.15 |
| Remarks | | For comparison | Present invention example | Present invention example | Present invention example | Present invention example | Present invention example | Present invention example | Present invention example | For comparison | Present invention example | Present invention example | Present invention example | Present invention example |

<Production Example 2-15: Graft Crosslinked Particles (B-I-1)>

A water dispersion (70 parts on a solids basis) of the crosslinked particles (A-I-6) was placed in a stainless steel polymerization tank equipped with a stirrer, and 0.4 parts of potassium alkenyl succinate, 0.002 parts of ferrous sulfate heptahydrate, 0.64 parts of sodium aldehyde sulfoxide, and 0.006 parts of disodium ethylenediamine-N,N,N',N'-tetracarboxylate were added. To the resulting mixture, a mixed solution of 20 parts of styrene, 10 parts of acrylonitrile, and 0.45 parts of t-butyl hydroperoxide was added over 100 minutes and maintained for 30 minutes to complete the reaction. A latex of the reaction product was coagulated with an aqueous sulfuric acid solution, washed with water, and then dried to obtain graft crosslinked particles (B-I-1). The volume average particle size of the water dispersion was 0.15 μm, and the graft rate was 43%.

[Production of Thermoplastic Resins]

<Production Example 2-16: Thermoplastic Resin (D-I-1)>

Into a stainless steel polymerization tank equipped with a stirrer, 150 parts of ion-exchanged water, 67 parts of styrene, 33 parts of acrylonitrile, 0.2 parts of 2,2'-azobis(isobutyronitrile), 0.25 parts of n-octyl mercaptan, 0.47 parts of calcium hydroxyapatite, and 0.003 parts of potassium alkenyl succinate were loaded. The inner temperature of the polymerization tank was set at 75° C., and the reaction was allowed to proceed for 3 hours. The temperature was raised to 90° C., and the reaction was allowed to proceed for 1 hour. The contents were extracted, washed with a centrifugal dehydrator, and dried to obtain a powdery thermoplastic resin (D-I-1).

<Production Example 2-17: Thermoplastic Resin (D-I-2)>

A powdery thermoplastic resin (D-I-2) was obtained in the same manner as in Production Example 2-16 except that 75 parts of styrene and 25 parts of acrylonitrile were used.

<Production Example 2-18: Thermoplastic Resin (D-I-3)>

A powdery thermoplastic resin (D-I-3) was obtained in the same manner as in Production Example 2-16 except that 54 parts of styrene, 26 parts of acrylonitrile, and, furthermore, 20 parts of N-phenylmaleimide were used.

[Other Thermoplastic Resins]

The following other thermoplastic resins were used.

Thermoplastic resin (D-I-4): AAS (ASA) resin (acrylic-rubber-dispersed AS resin) available from UMG ABS, Ltd; S310

Thermoplastic resin (D-I-5): ABS resin (butadiene-rubber-dispersed AS resin) available from UMG ABS, Ltd; EX18A Thermoplastic resin (D-I-6): AES resin (ethylene.α-olefin-rubber-dispersed AS resin) available from UMG ABS, Ltd; ESA30

Thermoplastic resin (D-I-7): polycarbonate available from Mitsubishi Engineering-Plastics Corporation; Novarex 7025R The monomer composition of the thermoplastic resins (D-I-1) to (D-I-7) is summarized in Table 7 below.

TABLE 7

| Thermoplastic resin | | D-1-1 | D-1-2 | D-1-3 | D-1-4 | D-1-5 | D-1-6 | D-1-7 |
|---|---|---|---|---|---|---|---|---|
| Monomer composition (parts) | Styrene | 67 | 75 | 54 | ASA | ABS | AES | PC |
| | Acrylonitrile | 33 | 25 | 26 | | | | |
| | N-Phenyl-maleimide | | | 20 | | | | |

Examples 2-1 to 2-17, Comparative Examples 2-1 to 2-7

The crosslinked particles (A-I) or the graft crosslinked particles (B-I) and the thermoplastic resin (D-I) were used in amounts shown in Tables 8 to 10 and pelletized by the method of Melt Kneading 2-1 or 2-2 described above, and molded articles were obtained by Injection Molding 2-1 or 2-2. The MVR of the thermoplastic resin composition obtained in Melt Kneading 2-1 was measured. The molded articles obtained were evaluated for impact resistance, color developability, abrasion resistance, and mold shrinkage rate. The results are shown in Tables 8 to 10.

TABLE 8

| | | Example | 2-1 | 2-2 | 2-3 | 2-4 | 2-5 | 2-6 | 2-7 | 2-8 | 2-9 | 2-10 | 2-11 |
|---|---|---|---|---|---|---|---|---|---|---|---|---|---|
| Thermoplastic resin composition formulation (parts) | Crosslinked particles (A-I) | A-I-2 | 30 | | | | | | | | | | |
| | | A-I-3 | | 30 | | | | | | | | | |
| | | A-I-4 | | | 30 | | | | | | | | |
| | | A-I-5 | | | | 30 | | | | | | | |
| | | A-I-6 | | | | | 30 | | | | | | |
| | | A-I-7 | | | | | | 30 | | | | | |
| | | A-I-8 | | | | | | | 30 | | | | |
| | | A-I-10 | | | | | | | | 30 | | | |
| | | A-I-11 | | | | | | | | | 30 | | |
| | | A-I-12 | | | | | | | | | | 30 | |
| | | A-I-13 | | | | | | | | | | | 30 |
| | Thermoplastic resin (D-I) | D-I-1 | 70 | 70 | 70 | 70 | 70 | 70 | 70 | 70 | 70 | 70 | |
| | | D-I-2 | | | | | | | | | | | 70 |
| Evaluation results | MVR | cm³/10 min | 10 | 10 | 12 | 12 | 15 | 9 | 8 | 15 | 15 | 15 | 17 |
| | Impact resistance | kJ/m² | 5 | 7 | 10 | 12 | 15 | 15 | 15 | 10 | 10 | 15 | 12 |
| | Color developability | L*(ma) | 4.2 | 4.2 | 4.2 | 4.2 | 4.2 | 6.4 | 6.5 | 7.1 | 5.1 | 7.1 | 4.2 |
| | Abrasion Resistance | Δ L*(mc-ma) | B | B | A | A | A | A | A | B | B | A | A |
| | Mold shrinkage rate | 23° C. (%) | 0.4 | 0.4 | 0.4 | 0.4 | 0.4 | 0.4 | 0.4 | 0.4 | 0.4 | 0.4 | 0.4 |

TABLE 9

| | | Example | 2-12 | 2-13 | 2-14 | 2-15 | 2-16 | 2-17 |
|---|---|---|---|---|---|---|---|---|
| Thermoplastic resin composition formulation (parts) | Crosslinked particles (A-I) | A-I-6 | 30 | 10 | 10 | 10 | | |
| | | A-I-13 | | | | | 10 | |
| | Graft crosslinked particles (B-I) | B-I-1 | | | | | | 43 |
| | Thermoplastic resin (D-I) | D-I-1 | | | | | | 57 |
| | | D-I-3 | 70 | | | | | |
| | | D-I-4 | | 90 | | | | |
| | | D-I-5 | | | 90 | | | |
| | | D-I-6 | | | | 90 | | |
| | | D-I-7 | | | | | 90 | |
| Evaluation results | MVR | cm³/10 min | 8 | 21 | 20 | 21 | 15 | 16 |
| | Impact resistance | kJ/m² | 12 | 22 | 13 | 17 | 80 | 17 |
| | Color developability | L*(ma) | 5.5 | 5.4 | 4.5 | 5.5 | 3 | 4.2 |
| | Abrasion Resistance | ΔL*(mc − ma) | A | A | A | A | A | A |
| | Mold shrinkage rate | 23° C. (%) | 0.4 | 0.5 | 0.6 | 0.7 | 0.7 | 0.3 |

TABLE 10

| | | Comparative example | 2-1 | 2-2 | 2-3 | 2-4 | 2-5 | 2-6 | 2-7 |
|---|---|---|---|---|---|---|---|---|---|
| Thermoplastic resin composition formulation (parts) | Crosslinked particles (A-I) | A-I-1 | 30 | | | | | | |
| | | A-I-9 | | 30 | | | | | |
| | Thermoplastic resin (D-I) | D-I-1 | 70 | 70 | 100 | | | | |
| | | D-I-4 | | | | 100 | | | |
| | | D-I-5 | | | | | 100 | | |
| | | D-I-6 | | | | | | 100 | |
| | | D-I-7 | | | | | | | 100 |
| Evaluation results | MVR | cm³/10 min | 14 | 2 | 10 | 20 | 18 | 19 | 1 |
| | Impact resistance | kJ/m² | 2 | 15 | 1 | 18 | 13 | 15 | 65 |
| | Color developability | L*(ma) | 5 | 11 | 4.2 | 5.4 | 4.5 | 5.5 | 3 |
| | Abrasion Resistance | ΔL* (mc − ma) | C | A | C | C | C | A | C |
| | Mold shrinkage rate | 23° C. (%) | 0.4 | 0.5 | 0.4 | 0.5 | 0.6 | 0.8 | 0.7 |

As is clear from Tables 8 to 10, the thermoplastic resin compositions of Examples 2-1 to 2-17 were excellent in flowability. The molded articles obtained in Examples 2-1 to 2-17 were excellent in impact resistance, color developability, abrasion resistance, and mold shrinkage rate. By contrast, Comparative Examples 2-1 to 2-7, which did not meet the requirements of the second invention, were poor in any of flowability, and impact resistance, color developability, abrasion resistance, and mold shrinkage rate of the molded articles. Specifically, in Comparative Example 2-1, in which crosslinked particles obtained using a di(meth)acrylic acid ester (a) having an Mn of less than 800 are used, impact resistance and abrasion resistance are poor. In Comparative Example 2-2, in which crosslinked particles obtained using a di(meth)acrylic acid ester (a) having an Mn of more than 9,000 are used, flowability and color developability are poor. In Comparative Examples 2-3 to 2-7, in each of which a thermoplastic resin alone is used and the crosslinked particles (A-I) or the graft crosslinked particles (B-I) of the second invention is not used, there is a defect due to each thermoplastic resin, and flowability, impact resistance, abrasion resistance, and mold shrinkage rate cannot be satisfied at the same time.

These results show that the crosslinked particles (A-I) and the graft crosslinked particles (B-I) of the second invention can improve the flowability, impact resistance, and abrasion resistance of a thermoplastic resin without impairing its color developability and mold shrinkage rate and are suitable for use in applications such as automotive interior and exterior parts, office machines, household electrical appliances, and building materials.

Examples and Comparative Examples of Third Invention

[Methods of Measurements and Evaluations]

Methods of various measurements, evaluations, and operations therefor in the following Examples and Comparative Examples are as described below.

<Measurement of Number Average Molecular Weight (Mn)>

The number average molecular weight (Mn) in terms of polystyrene was measured by GPC (GPC: "GPC/V2000" available from Waters, column: "Shodex AT-G+AT-806MS" available from Showa Denko K.K.) using o-dichlorobenzene (145° C.) as a solvent.

<Measurement of Average Particle Size>

The volume average particle size (MV) measured using a Microtrac ("Nanotrac 150" available from Nikkiso Co., Ltd.) and pure water as a measurement solvent was used as an average particle size.

It was confirmed by electron microscopic image analysis that the average particle size of the crosslinked particles (A-II) dispersed in the graft crosslinked particles (B-II) equated with the average particle size of the crosslinked particles (A-II) and the graft crosslinked particles (B-II) in a thermoplastic resin composition.

<Mass Proportion of Agglomerates>

An aqueous dispersion was filtered through a 100-mesh stainless-steel wire net, and the residue on the mesh was washed with water and dried, after which the mass of the filtered solid residue was measured. The mass proportion of agglomerates in the aqueous dispersion was determined by the following formula (6). This proportion is preferably as low as possible for better process passability, and is preferably 0.3% or less.

$$\text{Mass proportion of agglomerates (\% by mass)} = [\text{mass (g) of filtered solid residue/mass (g) of total solid content}] \times 100 \quad (6)$$

<Melt Kneading 3-1>

The crosslinked particles (A-II) or the graft crosslinked particles (B-II) and the thermoplastic resin (D-II) were mixed together, and using a twin-screw extruder ("PCM30" available from Ikegai Corp.) having a diameter of 30 mm and equipped with a vacuum vent, melt kneading was performed at a cylinder temperature of 200° C. to 260° C. and a reduced pressure of 93.325 kPa to obtain a transparent thermoplastic resin composition. Furthermore, after the melt kneading, pelletization was performed using a pelletizer ("Model SH pelletizer" available from Soukensya).

<Melt Kneading 3-2>

The crosslinked particles (A-II) or the graft crosslinked particles (B-II), the thermoplastic resin (D-II), and, furthermore, carbon black ("#966B" available from Mitsui Chemicals, Inc.) in an amount of 0.8 parts relative to 100 parts of the total of the crosslinked particles (A-II) or the graft crosslinked particles (B-II) and the thermoplastic resin (D-II) were mixed together, and using a twin-screw extruder ("PCM30" available from Ikegai Corp.) having a diameter of 30 mm and equipped with a vacuum vent, melt kneading was performed at a cylinder temperature of 200° C. to 260° C. and a reduced pressure of 93.325 kPa to obtain a black-colored thermoplastic resin composition. Furthermore, after the melt kneading, pelletization was performed using a pelletizer ("Model SH pelletizer" available from Soukensya).

<Measurement of Melt Volume Rate (MVR)>

The MVR of the thermoplastic resin composition obtained in Melt Kneading 3-1 was measured in accordance with ISO 1133 standard. The MVR indicates the flowability of the thermoplastic resin composition.

<Injection Molding 3-1>

Using the pellets of the thermoplastic resin composition obtained in Melt Kneading 3-1, a molded article 80 mm long, 10 mm wide, and 4 mm thick was molded with an injection molding machine ("IS55FP-1.5A" available from Toshiba Machine Co., Ltd.) under the conditions of a cylinder temperature of 200° C. to 270° C. and a mold temperature of 60° C. and used as a molded article for Charpy impact testing.

<Injection Molding 3-2>

Using the pellets of the thermoplastic resin composition obtained in Melt Kneading 3-1, molded articles 100 mm long, 100 mm wide, and 2 mm thick were molded with an injection molding machine ("IS55FP-1.5A" available from Toshiba Machine Co., Ltd.) under the conditions of a cylinder temperature of 200° C. to 270° C. and a mold temperature of 60° C. and used as a molded article for transparency evaluation and a molded article for weather resistance evaluation.

Using the pellets of the thermoplastic resin composition obtained in Melt Kneading 3-2, molded articles 100 mm long, 100 mm wide, and 2 mm thick were molded with an injection molding machine ("IS55FP-1.5A" available from Toshiba Machine Co., Ltd.) under the conditions of a cylinder temperature of 200° C. to 270° C. and a mold temperature of 60° C. and used as a molded article for color developability evaluation and a molded article for abrasion resistance evaluation.

<Evaluation of Impact Resistance>

The Charpy impact strength of the molded article for Charpy impact testing was measured in the same manner as in the second invention.

<Evaluation of Color Developability>

The molded article for color developability evaluation was evaluated for color developability in the same manner as in the second invention.

<Evaluation of Abrasion Resistance>

By the method shown in FIG. 1, evaluation and assessment of abrasion resistance were made in the same manner as in the second invention.

<Evaluation of Weather Resistance>

Using a Sunshine Weather Meter (available from Suga Test Instruments Co., Ltd.), the molded article for weather resistance evaluation was treated for 1000 hours under the conditions of a black panel temperature of 63° C. and a cycle of 60 minutes (rainfall: 12 minutes). The degree of change in color (ΔE) before and after the treatment was measured with a color difference meter and evaluated.

The smaller the ΔE, the better the weather resistance, and A and B were assessed as having weather resistance.

A: 0 or more and less than 1. No change in color is observed, and the design of a molded article is not impaired.

B: 1 or more and less than 3. Practically no change in color is observed, and the design of a molded article is not impaired.

C: 5 or more and less than 10. A slight change in color is observed, and the design of a molded article is impaired.

D: 10 or more. A great change in color is observed, and the design of a molded article is impaired.

<Evaluation of Transparency>

The cloudiness (Haze) of the molded article for transparency evaluation was measured using a Haze meter (available from Murakami Color Research Laboratory Co., Ltd). Lower cloudiness means higher transparency.

The transparency was evaluated according to the following criteria, and A and B were assessed as having transparency.

A: 0% or more and less than 5%
B: 5% or more and less than 10%
C: 10% or more and less than 30%
D: 30% or more

[Production of Di(meth)acrylic Acid Ester (a)]

Di(meth)acrylic acid esters (a-1) to (a-12) were produced in the same manner as in Production Examples 2-1 to 2-12 of the second invention. The component composition and number average molecular weight (Mn) of the di(meth)acrylic acid esters (a-1) to (a-12) are as shown in Table 5 in the second invention.

<Production Example 3-1: Crosslinked Particles (A-II-1)>

Fifty parts of methyl methacrylate, 10 parts of styrene, 310 parts of deionized water, 1 part of dipotassium alkenyl succinate, 0.2 parts of t-butyl hydroperoxide, and 2.5 parts of hexadecane were added to 40 parts of the di(meth)acrylic acid ester (a-1). While stirring the mixture, ultrasonic irradiation was performed using an ULTRASONIC HOMOGENIZER available from Nihonseiki Kaisha Ltd. at an amplitude output of 80% for 20 minutes to obtain a miniemulsion of a methyl methacrylate solution in which the di(meth) acrylic acid ester (a-1) was dissolved.

The miniemulsion of the methyl methacrylate solution in which the di(meth)acrylic acid ester (a-1) was dissolved was loaded into a reaction vessel equipped with a reagent injector, a condenser, a jacket heater, and a stirring device. The reaction vessel was purged with nitrogen, and the temperature was then raised to 55° C. Next, 0.3 parts of sodium formaldehyde sulfoxylate, 0.0001 parts of ferrous sulfate heptahydrate, 0.0003 parts of disodium ethylenediaminetetraacetate, and 10 parts of deionized water were added to initiate polymerization. After polymerization exotherm was observed, the jacket temperature was set at 80° C., and the polymerization was continued until polymerization exotherm was not observed anymore. The resultant was further maintained for 1 hour to obtain a water dispersion of crosslinked particles (A-II-1). The volume average particle size of the crosslinked particles (A-II-1) measured using the water dispersion of the crosslinked particles (A-II-1) was 0.15 μm, and the mass proportion of agglomerates was 0.001%. Next, the water dispersion of the crosslinked particles (A-II-1) was coagulated using 5% sulfuric acid, washed with water, and dried to obtain the crosslinked particles (A-II-1).

<Production Example 3-2: Crosslinked Particles (A-II-2) to (A-II-12)>

Crosslinked particles (A-II-2) to (A-II-12) were obtained in the same manner as in Production Example 3-1 except that the di(meth)acrylic acid esters (a-2) to (a-12) were used in place of the di(meth)acrylic acid ester (a-1) and the monomer compositions shown in Table 11 were used.

The mass proportion of agglomerates during production and volume average particle size of the crosslinked particles (A-II-1) to (A-II-12) are shown in Table 11.

TABLE 11

| Crosslinked particles | | | A-II-1 | A-II-2 | A-II-3 | A-II-4 | A-II-5 | A-II-6 |
|---|---|---|---|---|---|---|---|---|
| Monomer composition (parts) | Type and Mn of di(meth)acrylic acid ester | (a-1) Mn = 670 | 40 | | | | | |
| | | (a-2) Mn = 860 | | 40 | | | | |
| | | (a-3) Mn = 1010 | | | 40 | | | |
| | | (a-4) Mn = 1560 | | | | 40 | | |
| | | (a-5) Mn = 2070 | | | | | 40 | |
| | | (a-6) Mn = 3020 | | | | | | 40 |
| | | (a-7) Mn = 6040 | | | | | | |
| | | (a-8) Mn = 8010 | | | | | | |
| | | (a-9) Mn = 10040 | | | | | | |
| | | (a-10) Mn = 2040 | | | | | | |
| | | (a-11) Mn = 2020 | | | | | | |
| | | (a-12) Mn = 3020 | | | | | | |
| | Methyl methacrylate | | 50 | 50 | 50 | 50 | 50 | 50 |
| | Styrene | | 10 | 10 | 10 | 10 | 10 | 10 |
| Volume average particle size (μm) | | | 0.15 | 0.15 | 0.15 | 0.15 | 0.15 | 0.15 |
| Mass proportion of agglomerates(%) | | | 0.001 | 0.001 | 0.001 | 0.001 | 0.001 | 0.001 |
| Remarks | | | For comparison | Present invention example | | | | |

| Crosslinked particles | | | A-II-7 | A-II-8 | A-II-9 | A-II-10 | A-II-11 | A-II-12 |
|---|---|---|---|---|---|---|---|---|
| Monomer composition (parts) | Type and Mn of di(meth)acrylic acid ester | (a-1) Mn = 670 | | | | | | |
| | | (a-2) Mn = 860 | | | | | | |
| | | (a-3) Mn = 1010 | | | | | | |
| | | (a-4) Mn = 1560 | | | | | | |
| | | (a-5) Mn = 2070 | | | | | | |
| | | (a-6) Mn = 3020 | | | | | | |
| | | (a-7) Mn = 6040 | 40 | | | | | |
| | | (a-8) Mn = 8010 | | 40 | | | | |
| | | (a-9) Mn = 10040 | | | 40 | | | |
| | | (a-10) Mn = 2040 | | | | 40 | | |
| | | (a-11) Mn = 2020 | | | | | 40 | |
| | | (a-12) Mn = 3020 | | | | | | 40 |
| | Methyl methacrylate | | 50 | 50 | 50 | 40 | 60 | 50 |
| | Styrene | | 10 | 10 | 10 | 20 | 10 | |
| Volume average particle size (μm) | | | 0.15 | 0.15 | 0.15 | 0.15 | 0.15 | 0.15 |
| Mass proportion of agglomerates(%) | | | 0.005 | 0.001 | 0.03 | 0.001 | 0.001 | 0.001 |
| Remarks | | | Present invention example | | For comparison | Present invention example | | |

<Production Example 3-3: Crosslinked Particles (A-II-13) to (A-II-24)>

Crosslinked particles (A-II-13) to (A-II-24) were obtained in the same manner as in Production Example 3-1 except that the di(meth)acrylic acid ester (a-6) was used in place of the di(meth)acrylic acid ester (a-1) and the monomer compositions shown in Table 12 were used.

The mass proportion of agglomerates during production and volume average particle size of the crosslinked particles (A-II-13) to (A-II-24) are shown in Table 12.

TABLE 12

| Crosslinked particles | | A-II-13 | A-II-14 | A-II-15 | A-II-16 | A-II-17 | A-II-18 |
|---|---|---|---|---|---|---|---|
| Monomer composition (parts) | Di(meth)acrylic acid ester(a-6) Mn = 3020 | 19 | 21 | 24 | 26 | 29 | 31 |
| | Methyl methacrylate | 76 | 74 | 70 | 67 | 63 | 61 |
| | Styrene | 5 | 5 | 6 | 7 | 8 | 8 |
| Volume average particle size (μm) | | 0.15 | 0.15 | 0.15 | 0.15 | 0.15 | 0.15 |
| Mass proportion of agglomerates(%) | | 0.001 | 0.001 | 0.001 | 0.001 | 0.001 | 0.001 |
| Remarks | | For comparison | Present invention example | | | | |

| Crosslinked particles | | A-II-19 | A-II-20 | A-II-21 | A-II-22 | A-II-23 | A-II-24 |
|---|---|---|---|---|---|---|---|
| Monomer composition (parts) | Di(meth)acrylic acid ester(a-6) Mn = 3020 | 49 | 51 | 69 | 71 | 79 | 81 |
| | Methyl methacrylate | 38 | 35 | 13 | 10 | 1 | 19 |
| | Styrene | 13 | 14 | 18 | 19 | 20 | |
| Volume average particle size (μm) | | 0.15 | 0.15 | 0.15 | 0.15 | 0.15 | 0.15 |
| Mass proportion of agglomerates(%) | | 0.001 | 0.001 | 0.001 | 0.001 | 0.001 | 0.001 |
| Remarks | | Present invention example | | | | | For comparison |

<Production Example 3-4: Crosslinked Particles (A-II-25)>

A water dispersion of crosslinked particles (A-II-25) was obtained in the same manner as in Production Example 3-1 except that 40 parts of the di(meth)acrylic acid ester (a-6), 50 parts of methyl methacrylate, and 3 parts of dipotassium alkenyl succinate were used and the amplitude output of the ULTRASONIC HOMOGENIZER available from Nihonseiki Kaisha Ltd. was 90%. The volume average particle size of the crosslinked particles (A-II-25) was 0.06 μm, and the mass proportion of agglomerates was 0.001%.

<Production Example 3-5: Crosslinked Particles (A-II-26)>

A water dispersion of crosslinked particles (A-II-26) was obtained in the same manner as in Production Example 3-4 except that 2 parts of dipotassium alkenyl succinate was used. The volume average particle size of the crosslinked particles (A-II-26) was 0.09 μm, and the mass proportion of agglomerates 0.001%.

<Production Example 3-6: Crosslinked Particles (A-II-27)>

A water dispersion of crosslinked particles (A-II-27) was obtained in the same manner as in Production Example 3-4 except that 0.4 parts of dipotassium alkenyl succinate was used and the amplitude output of the ULTRASONIC HOMOGENIZER available from Nihonseiki Kaisha Ltd. was 30%. The volume average particle size of the crosslinked particles (A-II-27) was 0.45 μm, and the mass proportion of agglomerates was 0.003%.

<Production Example 3-7: Crosslinked Particles (A-II-28)>

Into a reaction vessel equipped with a reagent injector, a condenser, a jacket heater, and a stirring device, 200 parts of deionized water, 2.1 parts of potassium oleate, 4.2 parts of dioctyl sodium sulfosuccinate, 0.003 parts of ferrous sulfate heptahydrate, 0.009 parts of sodium ethylenediaminetetraacetate, and 0.3 parts of sodium formaldehyde sulfoxylate were loaded. The reaction vessel was purged with nitrogen, and the temperature was then raised to 60° C. Next, after 81.4 parts of butyl acrylate, 18.6 parts of acrylic acid, and 0.5 parts of cumene hydroperoxide were added dropwise over 2 hours, the reaction was further allowed to proceed for 2 hours to obtain a water dispersion of an acid-radical-containing copolymer.

A 5% aqueous solution of 2.4 parts of sodium pyrophosphate in 100 parts (on a solids basis) of a water dispersion of the crosslinked particles (A-II-6) was added into the reactor and thoroughly stirred, after which 1.8 parts (on a solids basis) of the water dispersion of the acid-radical-containing copolymer was added. The mixture was stirred for 30 minutes while maintaining the inner temperature at 30° C. to obtain crosslinked particles (A-II-28) and a water dispersion thereof. The volume average particle size of the crosslinked particles (A-II-28) was 0.57 μm, and the mass proportion of agglomerates was 0.01%.

<Production Example 3-8: Crosslinked Particles (A-II-29)>

After 0.15 parts of sodium dodecylbenzene sulfonate was added to 100 parts (on a solids basis) of a water dispersion of the crosslinked particles (A-II-6), 30 parts of a 5% aqueous acetic acid solution was added dropwise over 30 minutes. After completion of the dropwise addition, a 10% aqueous sodium hydroxide solution was added dropwise over 10 minutes to obtain a water dispersion of crosslinked particles (A-II-29). The volume average particle size of the crosslinked particles (A-II-29) was 0.88 μm, and the mass proportion of agglomerates was 0.01%.

<Production Example 3-9: Crosslinked Particles (A-II-30)>

A water dispersion of crosslinked particles (A-II-30) was obtained in the same manner as in Production Example 3-8 except that the amount of 5% aqueous acetic acid solution used was 50 parts. The volume average particle size of the crosslinked particles (A-II-30) was 1.2 μm, and the mass proportion of agglomerates was 0.04%.

<Production Example 3-10: Crosslinked Particles (A-II-31)>

After 0.15 parts of sodium dodecylbenzene sulfonate was added to 100 parts (on a solids basis) of a water dispersion of the crosslinked particles (A-II-6), 30 parts of a 20% aqueous acetic acid solution was added dropwise over 40 minutes. After completion of the dropwise addition, a 10% aqueous sodium hydroxide solution was added dropwise over 10 minutes to obtain a water dispersion of crosslinked particles (A-II-31). The volume average particle size of the crosslinked particles (A-II-31) was 2.1 μm, and the mass proportion of agglomerates was 0.05%.

<Production Example 3-11: Crosslinked Particles (A-II-32)>

A water dispersion of crosslinked particles (A-II-32) was obtained in the same manner as in Production Example 3-1 except that 40 parts of the di(meth)acrylic acid ester (a-12), 40 parts of n-butyl acrylate, and 20 parts of styrene were used. The volume average particle size of the crosslinked particles (A-II-32) was 0.15 μm, and the mass proportion of agglomerates was 0.001%.

<Production Example 3-12: Crosslinked Particles (A-II-33)>

Into a reaction vessel equipped with a reagent injector, a condenser, a jacket heater, and a stirring device, 40 parts of the di(meth)acrylic acid ester (a-6), 50 parts of methyl methacrylate, 10 parts of styrene, 310 parts of deionized water, 1 part of dipotassium alkenyl succinate, and 0.2 parts of t-butyl hydroperoxide were added. The reaction vessel was purged with nitrogen, and the temperature was then raised to 55° C. Next, 0.3 parts of sodium formaldehyde sulfoxylate, 0.0001 parts of ferrous sulfate heptahydrate, 0.0003 parts of disodium ethylenediaminetetraacetate, and 10 parts of deionized water were added to initiate polymerization. After polymerization exotherm was observed, the jacket temperature was set at 80° C., and the polymerization was continued until polymerization exotherm was not observed anymore. The resultant was further maintained for 1 hour to obtain a water dispersion of crosslinked particles (A-II-33). The volume average particle size of the crosslinked particles (A-II-33) was 0.47 μm, and the mass proportion of agglomerates was 2.5%.

The mass proportion of agglomerates during production and volume average particle size of the crosslinked particles (A-II-25) to (A-II-33) are shown in Tables 13 and 14.

TABLE 13

| Crosslinked particles | | A-II-25 | A-II-26 | A-II-27 | A-II-28 | A-II-29 | A-II-30 | A-II-31 |
|---|---|---|---|---|---|---|---|---|
| Monomer composition (parts) | Di(meth)acrylic acid ester (a-6) Mn = 3020 | 40 | 40 | 40 | | | | |
| | Methyl methacrylate | 50 | 50 | 50 | | | | |
| | Styrene | 10 | 10 | 10 | | | | |
| Enlarged crosslinked particles (A-II-6) | | | | | 100 | 100 | 100 | 100 |
| Volume average particle size (μm) | | 0.06 | 0.09 | 0.45 | 0.57 | 0.88 | 1.2 | 2.1 |
| Mass proportion of agglomerates (%) | | 0.001 | 0.001 | 0.001 | 0.01 | 0.01 | 0.04 | 0.05 |
| Remarks | | For comparison | Present invention example | | | | | For comparison |

TABLE 14

| Crosslinked particles | | | A-II-32 | A-II-33 |
|---|---|---|---|---|
| Monomer composition (parts) | Di(meth)acrylic acid ester | (a-6) | | 40 |
| | | (a-12) | 40 | |
| | Methyl methacrylate | | | 50 |
| | n-Butyl acrylate | | 40 | |
| | Styrene | | 20 | 10 |
| Volume average particle size (μm) | | | 0.15 | 0.47 |
| Mass proportion of agglomerates (%) | | | 0.001 | 2.5 |
| Remarks | | | Present invention example | |

<Production Example 3-13: Graft Crosslinked Particles (B-II-1)>

A water dispersion (70 parts on a solids basis) of the crosslinked particles (A-II-1) was placed in a stainless steel polymerization tank equipped with a stirrer, and 0.56 parts of potassium alkenyl succinate, 0.003 parts of ferrous sulfate heptahydrate, 0.89 parts of sodium aldehyde sulfoxide, and 0.008 parts of disodium ethylenediamine-N,N,N',N'-tetracarboxylate were added. To the resulting mixture, a mixed solution of 29 parts of methyl methacrylate, 1 part of methyl acrylate, and 0.45 parts of t-butyl hydroperoxide was added over 100 minutes and maintained for 30 minutes to complete the reaction. A latex of the reaction product was coagulated with an aqueous sulfuric acid solution, washed with water, and then dried to obtain graft crosslinked particles (B-II-1). The volume average particle size of the water dispersion was 0.15 μm, the graft rate was 43%, and the mass proportion of agglomerates was 0.02%.

<Production Example 3-14: Graft Crosslinked Particles (B-II-2) to (B-II-33)>

Graft crosslinked particles (B-II-2) to (B-II-33) were obtained in the same manner as in Production Example 3-13 except that the type of the crosslinked particles (A-II) was changed to the crosslinked particles (A-II-2) to (A-II-33) and the raw material compositions shown in Tables 15 to 17 were used.

The graft rate, volume average particle size, and mass proportion of agglomerates during production of the graft crosslinked particles (B-II-1) to (B-II-33) are shown in Tables 15 to 17.

TABLE 15

| Graft crosslinked particles | | B-II-1 | B-II-2 | B-II-3 | B-II-4 | B-II-5 | B-II-6 |
|---|---|---|---|---|---|---|---|
| Raw material composition (parts) | Crosslinked particles(A-II-1) | 70 | | | | | |
| | Crosslinked particles(A-II-2) | | 70 | | | | |
| | Crosslinked particles(A-II-3) | | | 70 | | | |
| | Crosslinked particles(A-II-4) | | | | 70 | | |
| | Crosslinked particles(A-II-5) | | | | | 70 | |
| | Crosslinked particles(A-II-6) | | | | | | 70 |
| | Crosslinked particles(A-II-7) | | | | | | |
| | Crosslinked particles(A-II-8) | | | | | | |
| | Crosslinked particles(A-II-9) | | | | | | |
| | Crosslinked particles(A-II-10) | | | | | | |
| | Crosslinked particles(A-II-11) | | | | | | |
| | Crosslinked particles(A-II-12) | | | | | | |
| | Methyl methacrylate | 29 | 29 | 29 | 29 | 29 | 29 |
| | Methyl acrylate | 1 | 1 | 1 | 1 | 1 | 1 |
| | Graft rate (%) | 43 | 43 | 43 | 43 | 43 | 43 |
| Volume average particle size(μm) | | 0.15 | 0.15 | 0.15 | 0.15 | 0.15 | 0.15 |
| Proportion of agglomerates (%) | | 0.02 | 0.02 | 0.02 | 0.02 | 0.02 | 0.02 |
| Remarks | | For comparison | Present invention example | | | | |

| Graft crosslinked particles | | B-II-7 | B-II-8 | B-II-9 | B-II-10 | B-II-11 | B-II-12 |
|---|---|---|---|---|---|---|---|
| Raw material composition (parts) | Crosslinked particles(A-II-1) | | | | | | |
| | Crosslinked particles(A-II-2) | | | | | | |
| | Crosslinked particles(A-II-3) | | | | | | |
| | Crosslinked particles(A-II-4) | | | | | | |
| | Crosslinked particles(A-II-5) | | | | | | |
| | Crosslinked particles(A-II-6) | | | | | | |
| | Crosslinked particles(A-II-7) | 70 | | | | | |
| | Crosslinked particles(A-II-8) | | 70 | | | | |
| | Crosslinked particles(A-II-9) | | | 70 | | | |
| | Crosslinked particles(A-II-10) | | | | 70 | | |
| | Crosslinked particles(A-II-11) | | | | | 70 | |
| | Crosslinked particles(A-II-12) | | | | | | 70 |
| | Methyl methacrylate | 29 | 29 | 29 | 29 | 29 | 29 |
| | Methyl acrylate | 1 | 1 | 1 | 1 | 1 | 1 |
| | Graft rate (%) | 43 | 43 | 43 | 43 | 43 | 43 |
| Volume average particle size(μm) | | 0.15 | 0.15 | 0.15 | 0.15 | 0.15 | 0.15 |
| Proportion of agglomerates (%) | | 0.02 | 0.02 | 0.02 | 0.02 | 0.02 | 0.02 |
| Remarks | | Present invention example | | For comparison | | Present invention example | |

TABLE 16

| Graft crosslinked particles | | B-II-13 | B-II-14 | B-II-15 | B-II-16 | B-II-17 | B-II-18 |
|---|---|---|---|---|---|---|---|
| Raw material composition (parts) | Crosslinked particles(A-II-13) | 70 | | | | | |
| | Crosslinked particles(A-II-14) | | 70 | | | | |
| | Crosslinked particles(A-II-15) | | | 70 | | | |
| | Crosslinked particles(A-II-16) | | | | 70 | | |
| | Crosslinked particles(A-II-17) | | | | | 70 | |
| | Crosslinked particles(A-II-18) | | | | | | 70 |
| | Crosslinked particles(A-II-19) | | | | | | |
| | Crosslinked particles(A-II-20) | | | | | | |
| | Crosslinked particles(A-II-21) | | | | | | |
| | Crosslinked particles(A-II-22) | | | | | | |
| | Crosslinked particles(A-II-23) | | | | | | |
| | Crosslinked particles(A-II-24) | | | | | | |
| | Methyl methacrylate | 29 | 29 | 29 | 29 | 29 | 29 |
| | Methyl acrylate | 1 | 1 | 1 | 1 | 1 | 1 |
| | Graft rate(%) | 43 | 43 | 43 | 43 | 43 | 43 |
| Volume average particle size(μm) | | 0.15 | 0.15 | 0.15 | 0.15 | 0.15 | 0.15 |
| Proportion of agglomerates (%) | | 0.02 | 0.02 | 0.02 | 0.02 | 0.02 | 0.02 |
| Remarks | | For comparison | Present invention example | | | | |

TABLE 16-continued

| Graft crosslinked particles | | B-II-19 | B-II-20 | B-II-21 | B-II-22 | B-II-23 | B-II-24 |
|---|---|---|---|---|---|---|---|
| Raw material composition (parts) | Crosslinked particles(A-II-13) | | | | | | |
| | Crosslinked particles(A-II-14) | | | | | | |
| | Crosslinked particles(A-II-15) | | | | | | |
| | Crosslinked particles(A-II-16) | | | | | | |
| | Crosslinked particles(A-II-17) | | | | | | |
| | Crosslinked particles(A-II-18) | | | | | | |
| | Crosslinked particles(A-II-19) | 70 | | | | | |
| | Crosslinked particles(A-II-20) | | 70 | | | | |
| | Crosslinked particles(A-II-21) | | | 70 | | | |
| | Crosslinked particles(A-II-22) | | | | 70 | | |
| | Crosslinked particles(A-II-23) | | | | | 70 | |
| | Crosslinked particles(A-II-24) | | | | | | 70 |
| | Methyl methacrylate | 29 | 29 | 29 | 29 | 29 | 29 |
| | Methyl acrylate | 1 | 1 | 1 | 1 | 1 | 1 |
| | Graft rate(%) | 43 | 43 | 43 | 43 | 43 | 43 |
| | Volume average particle size(μm) | 0.15 | 0.15 | 0.15 | 0.15 | 0.15 | 0.15 |
| | Proportion of agglomerates (%) | 0.02 | 0.02 | 0.02 | 0.02 | 0.02 | 0.02 |
| | Remarks | Present invention example | | | | | For comparison |

TABLE 17

| Graft crosslinked particles | | B-II-25 | B-II-26 | B-II-27 | B-II-28 | B-II-29 | B-II-30 | B-II-31 | B-II-32 | B-II-33 |
|---|---|---|---|---|---|---|---|---|---|---|
| Raw material composition (parts) | Crosslinked particles(A-II-25) | 70 | | | | | | | | |
| | Crosslinked particles(A-II-26) | | 70 | | | | | | | |
| | Crosslinked particles(A-II-27) | | | 70 | | | | | | |
| | Crosslinked particles(A-II-28) | | | | 70 | | | | | |
| | Crosslinked particles(A-II-29) | | | | | 70 | | | | |
| | Crosslinked particles(A-II-30) | | | | | | 70 | | | |
| | Crosslinked particles(A-II-31) | | | | | | | 70 | | |
| | Crosslinked particles(A-II-32) | | | | | | | | 70 | |
| | Crosslinked particles(A-II-33) | | | | | | | | | 70 |
| | Methyl methacrylate | 29 | 29 | 29 | 29 | 29 | 29 | 29 | 29 | 29 |
| | Methyl acrylate | 1 | 1 | 1 | 1 | 1 | 1 | 1 | 1 | 1 |
| | Graft rate(%) | 43 | 43 | 43 | 43 | 43 | 43 | 43 | 43 | 43 |
| | Volume average particle size(μm) | 0.06 | 0.09 | 0.45 | 0.57 | 0.88 | 1.2 | 2.1 | 0.15 | 0.47 |
| | Proportion of agglomerates (%) | 0.02 | 0.02 | 0.02 | 0.02 | 0.02 | 0.02 | 0.02 | 0.02 | 0.02 |
| | Remarks | For comparison | For comparison | Present invention example | | | | For comparison | Present invention example | |

[Production of Thermoplastic Resins]

<Production Example 3-15: Thermoplastic Resin (D-II-1)>

Into a stainless steel polymerization tank equipped with a stirrer, 150 parts of ion-exchanged water, 98 parts of methyl methacrylate, 2 parts of methyl acrylate, 0.2 parts of 2,2'-azobis(isobutyronitrile), 0.25 parts of n-octyl mercaptan, 0.47 parts of calcium hydroxyapatite, and 0.003 parts of potassium alkenyl succinate were loaded. The inner temperature of the polymerization tank was set at 75° C., and the reaction was allowed to proceed for 3 hours. The temperature was raised to 90° C., and the reaction was allowed to proceed for 1 hour. The contents were extracted, washed with a centrifugal dehydrator, and dried to obtain a powdery thermoplastic resin (D-II-1).

<Production Example 3-16: Thermoplastic Resin (D-II-2)>

A powdery thermoplastic resin (D-II-2) was obtained in the same manner as in Production Example 3-15 except that 70 parts of methyl methacrylate, 10 parts of styrene, and 20 parts of N-phenylmaleimide were used.

[Other Thermoplastic Resins]

The following other thermoplastic resins were used.

Thermoplastic resin (D-II-3): polycarbonate available from Mitsubishi Engineering-Plastics Corporation; Novarex 7025R Thermoplastic resin (D-II-4): AAS (ASA) resin (acrylic-rubber-dispersed AS resin) available from UMG ABS, Ltd; S310

The monomer composition of the thermoplastic resins (D-II-1) to (D-II-4) is summarized in Table 18 below.

TABLE 18

| Thermoplastic resin | | D-II-1 | D-II-2 | D-II-3 | D-II-4 |
|---|---|---|---|---|---|
| Monomer composition | Methyl methacrylate | 98 | 70 | PC | ASA |
| | Methyl acrylate | 2 | | | |

TABLE 18-continued

| Thermoplastic resin | | D-II-1 | D-II-2 | D-II-3 | D-II-4 |
|---|---|---|---|---|---|
| (parts) | Styrene | | 10 | | |
| | N-Phenylmaleimide | | 20 | | |

Examples 3-1 to 3-38, Comparative Examples 3-1 to 3-7

The crosslinked particles (A-II) or the graft crosslinked particles (B-II) and the thermoplastic resin (D-II) were used in amounts shown in Tables 19 to 24 and pelletized by the method of Melt Kneading 3-1 or 3-2 described above, and molded articles were obtained by Injection Molding 3-1 or 3-2. The MVR of the thermoplastic resin composition obtained in Melt Kneading 3-1 was measured. The molded articles obtained were evaluated for impact resistance, color developability, abrasion resistance, and weather resistance. The results are shown in Tables 19 to 24.

The thermoplastic resin compositions of Example 3-6 and Comparative Example 3-2 were evaluated for transparency, and the results are shown in Table 25.

TABLE 19

| | Example | | 3-1 | 3-2 | 3-3 | 3-4 | 3-5 | 3-6 | 3-7 | 3-8 | 3-9 | 3-10 |
|---|---|---|---|---|---|---|---|---|---|---|---|---|
| Thermoplastic resin composition formulation (parts) | Graft Crosslinked particles (B-II) | B-II-2 | 30 | | | | | | | | | |
| | | B-II-3 | | 30 | | | | | | | | |
| | | B-II-4 | | | 30 | | | | | | | |
| | | B-II-5 | | | | 30 | | | | | | |
| | | B-II-6 | | | | | 30 | | | | | |
| | | B-II-7 | | | | | | 30 | | | | |
| | | B-II-8 | | | | | | | 30 | | | |
| | | B-II-10 | | | | | | | | 30 | | |
| | | B-II-11 | | | | | | | | | 30 | |
| | | B-II-12 | | | | | | | | | | 30 |
| | Thermoplastic resin (D-II) | D-II-1 | 70 | 70 | 70 | 70 | 70 | 70 | 70 | 70 | 70 | 70 |
| Evaluation results | MVR | cm³/10 min | 9 | 9 | 9 | 9 | 9 | 9 | 7 | 9 | 9 | 9 |
| | Impact resistance | kJ/m² | 5 | 7 | 8 | 9 | 10 | 10 | 10 | 8 | 8 | 10 |
| | Color developability | L*(ma) | 2.1 | 2.1 | 2.1 | 2.1 | 2.1 | 3.3 | 3.8 | 2.5 | 2.1 | 2.2 |
| | Abrasion Resistance | ΔL*(mc − ma) | B | B | A | A | A | A | A | B | B | A |
| | Weather resistance | ΔE | A | A | A | A | A | A | A | A | A | A |

TABLE 20

| | Example | | 3-11 | 3-12 | 3-13 | 3-14 | 3-15 | 3-16 | 3-17 | 3-18 | 3-19 | 3-20 |
|---|---|---|---|---|---|---|---|---|---|---|---|---|
| Thermoplastic resin composition formulation (parts) | Graft Crosslinked particles (B-II) | B-II-14 | 30 | | | | | | | | | |
| | | B-II-15 | | 30 | | | | | | | | |
| | | B-II-16 | | | 30 | | | | | | | |
| | | B-II-17 | | | | 30 | | | | | | |
| | | B-II-18 | | | | | 30 | | | | | |
| | | B-II-19 | | | | | | 30 | | | | |
| | | B-II-20 | | | | | | | 30 | | | |
| | | B-II-21 | | | | | | | | 30 | | |
| | | B-II-22 | | | | | | | | | 30 | |
| | | B-II-23 | | | | | | | | | | 30 |
| | Thermoplastic resin (D-II) | D-II-1 | 70 | 70 | 70 | 70 | 70 | 70 | 70 | 70 | 70 | 70 |
| Evaluation results | MVR | cm³/10 min | 10 | 9 | 9 | 9 | 9 | 9 | 8 | 8 | 7 | 7 |
| | Impact resistance | kJ/m² | 7 | 8 | 9 | 9 | 10 | 10 | 10 | 10 | 11 | 11 |
| | Color developability | L*(ma) | 2.1 | 2.1 | 2.1 | 2.1 | 2.1 | 2.1 | 2.3 | 2.5 | 2.6 | 2.8 |
| | Abrasion Resistance | ΔL*(mc − ma) | B | B | A | A | A | A | A | A | A | A |
| | Weather resistance | ΔE | A | A | A | A | A | A | A | A | A | A |

TABLE 21

| | | Example | 3-21 | 3-22 | 3-23 | 3-24 | 3-25 |
|---|---|---|---|---|---|---|---|
| Thermoplastic resin composition formulation (parts) | Graft crosslinked particles (B-II) | B-II-26 | 30 | | | | |
| | | B-II-27 | | 30 | | | |
| | | B-II-28 | | | 30 | | |
| | | B-II-29 | | | | 30 | |
| | | B-II-30 | | | | | 30 |
| | Thermoplastic resin (D-II) | D-II-1 | 70 | 70 | 70 | 70 | 70 |
| Evaluation results | MVR | cm³/10 min | 8 | 9 | 9 | 9 | 10 |
| | Impact resistance | kJ/m² | 6 | 10 | 11 | 11 | 12 |
| | Color developability | L*(ma) | 2.1 | 2.6 | 2.8 | 2.9 | 3.5 |

TABLE 21-continued

|  |  | Example | 3-21 | 3-22 | 3-23 | 3-24 | 3-25 |
|---|---|---|---|---|---|---|---|
|  | Abrasion Resistance | ΔL*(mc − ma) | A | A | A | A | B |
|  | Weather resistance | ΔE | A | A | A | A | A |

TABLE 22

|  |  |  | Example | 3-26 | 3-27 | 3-28 | 3-29 | 3-30 | 3-31 |
|---|---|---|---|---|---|---|---|---|---|
| Thermoplastic resin composition formulation (parts) | Crosslinked particles (A-II) | A-II-6 |  |  |  |  |  |  | 21 |
|  | Graft crosslinked particles (B-II) | B-II-6 |  |  |  | 30 | 30 | 10 |  |
|  |  | B-II-32 |  | 30 |  |  |  |  |  |
|  |  | B-II-33 |  |  | 30 |  |  |  |  |
|  | Thermoplastic resin (D-II) | D-II-1 |  | 70 | 70 |  |  |  | 79 |
|  |  | D-II-2 |  |  |  | 70 |  |  |  |
|  |  | D-II-3 |  |  |  |  | 70 |  |  |
|  |  | D-II-4 |  |  |  |  |  | 90 |  |
| Evaluation results | MVR | cm³/10 min | 8 | 9 | 8 | 8 | 15 | 9 |
|  | Impact resistance | kJ/m² | 20 | 8 | 9 | 50 | 20 | 9 |
|  | Color developability | L*(ma) | 2.5 | 2.6 | 3.1 | 3.5 | 3.8 | 2.5 |
|  | Abrasion Resistance | ΔL*(mc − ma) | A | B | A | A | A | A |
|  | Weather resistance | ΔE | A | A | A | B | A | A |

TABLE 23

|  |  | Example | 3-32 | 3-33 | 3-34 | 3-35 | 3-36 | 3-37 | 3-38 |
|---|---|---|---|---|---|---|---|---|---|
| Thermoplastic resin composition formulation (parts) | Graft crosslinked particles(B-II) | B-II-6 | 10 | 17 | 25 | 29 | 55 | 80 | 95 |
|  | Thermoplastic resin (D-II) | D-II-1 | 90 | 83 | 75 | 71 | 45 | 20 | 5 |
| Evaluation results | MVR | cm³/10 min | 10 | 10 | 9 | 9 | 8 | 8 | 7 |
|  | Impact resistance | kJ/m² | 5 | 7 | 8 | 8 | 10 | 10 | 11 |
|  | Color developability | L*(ma) | 2.1 | 2.1 | 2.1 | 2.1 | 2.3 | 2.5 | 2.7 |
|  | Abrasion Resistance | ΔL*(mc − ma) | B | B | A | A | A | A | A |
|  | Weather resistance | ΔE | A | A | A | A | A | A | A |

TABLE 24

|  |  | Comparative example | 3-1 | 3-2 | 3-3 | 3-4 | 3-5 | 3-6 | 3-7 |
|---|---|---|---|---|---|---|---|---|---|
| Thermoplastic resin composition formulation (parts) | Graft crosslinked particles (B-II) | B-II-1 | 30 |  |  |  |  |  |  |
|  |  | B-II-9 |  | 30 |  |  |  |  |  |
|  |  | B-II-13 |  |  | 30 |  |  |  |  |
|  |  | B-II-24 |  |  |  | 30 |  |  |  |
|  |  | B-II-25 |  |  |  |  | 30 |  |  |
|  |  | B-II-31 |  |  |  |  |  | 30 |  |
|  | Thermoplastic resin (D-II) | D-II-1 | 70 | 70 | 70 | 70 | 70 | 70 |  |
|  |  | D-II-4 |  |  |  |  |  |  | 100 |
| Evaluation results | MVR | cm³/10 min | 10 | 5 | 9 | 5 | 5 | 10 | 12 |
|  | Impact resistance | kJ/m² | 2 | 10 | 4 | 12 | 2 | 15 | 15 |
|  | Color developability | L*(ma) | 2.1 | 4.2 | 2.1 | 4.5 | 2.1 | 4.2 | 3.8 |
|  | Abrasion Resistance | ΔL*(mc − ma) | D | A | C | A | A | C | D |
|  | Weather resistance | ΔE | A | A | A | A | A | A | A |

TABLE 25

|  |  |  | Example 3-6 | Comparative example 3-2 |
|---|---|---|---|---|
| Thermoplastic resin composition formulation (parts) | Graft crosslinked particles (B-II) | B-II-6 | 30 |  |
|  |  | B-II-9 |  | 30 |
|  | Thermoplastic resin (D-II) | C-II-1 | 70 | 70 |
| Evaluation results | Transparency | Haze | A | C |

As is clear from Tables 19 to 24, the thermoplastic resin compositions of Examples 3-1 to 3-38 were excellent in flowability. The molded articles obtained in Examples 3-1 to 3-38 were excellent in impact resistance, color developability, abrasion resistance, and weather resistance. By contrast, Comparative Examples 3-1 to 3-7, which did not meet the requirements of the third invention, were poor in any of flowability, and impact resistance, color developability, abrasion resistance, and weather resistance of the molded articles.

As shown in Table 25, the molded article of Example 3-6 was excellent in transparency, whereas the molded article of the Comparative Example 3-2 was poor in transparency.

These results show that the crosslinked particles (A-II) and the graft crosslinked particles (B-II) can improve the flowability, impact resistance, and abrasion resistance of a thermoplastic resin without impairing its color developability and weather resistance and are suitable for use in applications such as automotive interior and exterior parts, office machines, household electrical appliances, and building materials.

Examples and Comparative Examples of Fourth Invention

[Production of Rubbery Polymer]
<Synthesis Example 4-1: Production of Rubbery Polymer (A-III-1)>
A rubbery polymer (A-III-1) was produced according to the following formulation.

| [Formulation] | |
|---|---|
| n-Butyl acrylate | 100 parts |
| Hexadecane | 2.4 parts |
| Dipotassium alkenyl succinate | 0.4 parts |
| Allyl methacrylate | 0.2 parts |
| 1,3-Butylene dimethacrylate | 1.0 part |
| t-Butyl hydroperoxide | 0.25 parts |
| Ferrous sulfate | 0.0002 parts |
| Sodium formaldehyde sulfoxylate | 0.33 parts |
| Disodium ethylenediaminetetraacetate | 0.0004 parts |
| Distilled water | 203 parts |

Distilled water, n-butyl acrylate, hexadecane, dipotassium alkenyl succinate, allyl methacrylate, 1,3-butylene dimethacrylate, and t-butyl hydroperoxide were loaded into a reactor equipped with a reagent injector, a condenser, a jacket heater, and a stirring device, and ultrasonication was performed at an amplitude of 35 μm for 20 minutes using an ULTRASONIC HOMOGENIZER US-600 available from Nihonseiki Kaisha Ltd. at normal temperature to obtain a pre-emulsion (a-III-1). The average particle size of the latex obtained was 180 nm.

After the pre-emulsion (a-III-1) was heated to 60° C., ferrous sulfate, sodium formaldehyde sulfoxylate, and disodium ethylenediaminetetraacetate were added to initiate radical polymerization. The polymerization of the acrylate components caused the liquid temperature to rise to 78° C. The temperature was maintained at 70° C. for 30 minutes, and the polymerization of the acrylate components was completed to obtain a rubbery polymer (A-III-1). The solid content of the rubbery polymer (A-III-1) in the latex obtained was 18.7%, and the volume average particle size (X) was 180 nm. The volume average particle size, largest 10% frequency particle size (Y), and smallest 10% frequency particle size (Z) of the rubbery polymer (A-III-1) are shown in Table 26.

The average particle size and particle size distribution of the rubbery polymer (A-III-1) and rubbery polymers (A-III-2) to (A-III-12) described below and the average particle size of graft copolymers (B-III-1) to (B-III-12) described below were measured by the following method.

<Measurement of Particle Size>
The volume average particle size was determined by a dynamic light scattering method using a Nanotrac UPA-EX150 available from Nikkiso Co., Ltd.

The particle size distribution was determined in the same manner as described above. The ratio of the largest 10% frequency particle size (Y), which is a particle size at a largest 10% frequency, to the volume average particle size (X) and the ratio of the smallest 10% frequency particle size (Z), which is a particle size at a smallest 10% frequency, to the volume average particle size (X) were calculated.

<Synthesis Examples 4-2 to 4-9: Production of Rubbery Polymers (A-III-2) to (A-III-9)>
Using materials shown in Table 26 in proportions shown in Table 26, synthesis was performed in the same manner as in Synthesis Example 4-1 to obtain rubbery polymers (A-III-2) to (A-III-9). The volume average particle size (X), largest 10% frequency particle size (Y), and smallest 10% frequency particle size (Z) of the rubbery polymers (A-III-2) to (A-III-9) are shown in Table 26.

<Synthesis Example 4-10: Production of Rubbery Polymer (A-III-10)>
A rubbery polymer (A-III-10) was produced according to the following formulation.

| [Formulation] | |
|---|---|
| n-Butyl acrylate | 100 parts |
| Hexadecane | 2.4 parts |
| Dipotassium alkenyl succinate | 1.0 part |
| Allyl methacrylate | 0.2 parts |
| 1,3-Butylene dimethacrylate | 1.0 part |
| t-Butyl hydroperoxide | 0.25 parts |
| Ferrous sulfate | 0.0002 parts |
| Sodium formaldehyde sulfoxylate | 0.33 parts |
| Disodium ethylenediaminetetraacetate | 0.0004 parts |
| Distilled water | 203 parts |

Distilled water was loaded into a reactor equipped with a reagent injector, a condenser, a jacket heater, and a stirring device. After heating to 60° C., ferrous sulfate, sodium formaldehyde sulfoxylate, and disodium ethylenediaminetetraacetate were added. A mixed solution of n-butyl acrylate, hexadecane, dipotassium alkenyl succinate, allyl methacrylate, 1,3-butylene dimethacrylate, and t-butyl hydroperoxide was added dropwise with a pump over 120 minutes to raise the temperature to 80° C. After completion of the dropwise addition, the temperature was maintained at 70° C. for 30 minutes, and the polymerization of the acrylate components was completed to obtain a rubbery polymer (A-III-10). The solid content of the rubbery polymer (A-III-10) in the latex obtained was 18.4%, and the volume average particle size (X) was 180 nm. The largest 10% frequency particle size (Y) and smallest 10% frequency particle size (Z) were as shown in Table 27.

<Synthesis Example 4-11: Production of Rubbery Polymer (A-III-11)>
A rubbery polymer (A-III-11) was produced according to the following formulation.

| [Formulation] | |
|---|---|
| n-Butyl acrylate | 100 parts |
| Hexadecane | 2.4 parts |
| Dipotassium alkenyl succinate | 1.0 part |
| Allyl methacrylate | 0.2 parts |
| 1,3-Butylene dimethacrylate | 1.0 part |
| t-Butyl hydroperoxide | 0.25 parts |
| Ferrous sulfate | 0.0002 parts |
| Sodium formaldehyde sulfoxylate | 0.33 parts |
| Disodium ethylenediaminetetraacetate | 0.0004 parts |
| Distilled water | 203 parts |

Distilled water, n-butyl acrylate, hexadecane, dipotassium alkenyl succinate, allyl methacrylate, 1,3-butylene dimethacrylate, and t-butyl hydroperoxide were loaded into a reactor equipped with a reagent injector, a condenser, a jacket heater, and a stirring device. After heating to 60° C., ferrous sulfate, sodium formaldehyde sulfoxylate, and disodium ethylenediaminetetraacetate were added to initiate radical polymerization. The polymerization of the acrylate components caused the liquid temperature to rise to 78° C. The temperature was maintained at 70° C. for 30 minutes, and the polymerization of the acrylate components was completed to obtain a rubbery polymer. The solid content of the rubbery polymer in the latex obtained was 18.4%, and the volume average particle size was 100 nm.

After the liquid temperature inside the reactor decreased to 70° C., 1.0 part, on a solids basis, of a 5% aqueous sodium pyrophosphate solution was added. After the inner temperature was controlled to be 70° C., 0.3 parts, on a solid basis, of an acid-radical-containing copolymer latex containing 15 parts of methacrylic acid was added, and stirring and enlargement were performed for 30 minutes to obtain a rubbery polymer (A-III-11). The volume average particle size (X) of the rubbery polymer (A-III-11) was 560 nm. The largest 10% frequency particle size (Y) and smallest 10% frequency particle size (Z) were as shown in Table 27.

<Synthesis Example 4-12: Production of Rubbery Polymer (A-III-12)>

A rubbery polymer (A-III-12) was obtained in the same manner as in Synthesis Example 4-11 except that 3.0 parts, on a solid basis, of an aqueous sodium pyrophosphate solution was added. The volume average particle size (X) thereof was 950 nm. The largest 10% frequency particle size (Y) and smallest 10% frequency particle size (Z) were as shown in Table 27.

[Production and Evaluation of Graft Copolymers]
<Example 4-1: Production of Graft Copolymer (B-III-1)>

Raw materials of the following formulation were loaded into a reactor equipped with a reagent injector, a condenser, a jacket heater, and a stirring device, and the reactor was thoroughly purged with nitrogen, after which the inner temperature was raised to 70° C. with stirring.

| [Formulation] | |
|---|---|
| Water (including water in rubbery polymer latex) | 230 parts |
| Rubbery polymer (A-III-1) latex | 50 parts (on a solids basis) |
| Dipotassium alkenyl succinate | 0.2 parts |
| Sodium formaldehyde sulfoxylate | 0.3 parts |
| Ferrous sulfate | 0.001 parts |
| Disodium ethylenediaminetetraacetate | 0.003 parts |

Next, a mixed solution containing acrylonitrile (AN), styrene (ST), and t-butyl hydroperoxide according to the following formulation was added dropwise over 100 minutes, while the temperature was raised to 80° C.

| [Formulation] | |
|---|---|
| Acrylonitrile | 12.5 parts |
| Styrene | 37.5 parts |
| t-Butyl hydroperoxide | 0.2 parts |

After completion of the dropwise addition, the temperature at 80° C. was maintained for 30 minutes and then cooled to obtain a graft copolymer (B-III-1) latex. The solid content of the graft copolymer (B-III-1) in the latex obtained was 29.7%, and the volume average particle size was 210 nm.

Next, 100 parts of a 1.5% aqueous sulfuric acid solution were heated to 80° C., and while stirring the aqueous solution, 100 parts of the graft copolymer (B-III-1) latex was gradually added dropwise to the aqueous solution to solidify the graft copolymer (B-III-1). Furthermore, the temperature was raised to 95° C. and maintained for 10 minutes.

Next, the solidified product was dehydrated, washed, and dried to obtain the graft copolymer (B-III-1) in powder form.

<Examples 4-2 to 4-5, Comparative Examples 4-1 to 4-3: Production of Graft Copolymers (B-III-2) to (B-III-12)>

Graft copolymers (B-III-2) to (B-III-12) were obtained in the same manner as in Example 4-1 except that rubbery polymer (A-III-2) to (A-III-12) latexes were each used in place of the rubbery polymer (A-III-1) latex. The volume average particle size of the graft copolymers (B-III-2) to (B-III-12) were as shown in Tables 26 and 27.

<Production of Thermoplastic Resin Composition>

Forty parts of each of the graft copolymers (B-III-1) to (B-III-12) and 60 parts of an acrylonitrile-styrene copolymer ("UMG AXS resin S102N" available from UMG ABS, Ltd.) produced by suspension polymerization were mixed together using a Henschel mixer, and the mixture was fed to an extruder heated to 240° C. and kneaded to obtain pellets.

<Preparation of Test Piece>

Each of the above-described pellets was molded with a 4 ounce injection molding machine (available from Japan Steel Works, LTD.) under the conditions of a cylinder temperature of 240° C. and a mold temperature of 60° C. to obtain a test piece 1 having a length of 80 mm, a width of 10 mm, and a thickness of 4 mm.

In a similar manner, a plate-like molded body 2 having a length of 100 mm, a width of 100 mm, and a thickness of 2 mm was obtained under the conditions of a cylinder temperature of 240° C., a mold temperature of 60° C., and an injection rate of 20 g/s.

<Evaluation>

«Measurement of Charpy Impact Strength»

Using the test piece 1, Charpy impact strength was measured in a 23° C. atmosphere in accordance with ISO 179.

«Measurement of Melt Volume Rate (MVR)»

The MVR of the thermoplastic resin composition pellets was measured under the conditions of 220° C. and 98 N in accordance with ISO 1133 standard. The MVR indicates the flowability of the thermoplastic resin compositions.

«Measurement of Color Developability»

The L* of a surface of the molded body 2 was measured using a colorimeter CM-508D available from Minolta. Smaller L* values indicate better color developability.

«Measurement of Image Clarity»

The image clarity (%) at a reflectance of 60° of the surface of the molded body 2 was measured with an image clarity meter (ICM-IDP available from Suga Test Instruments Co., Ltd). Higher image clarity values indicate higher brightness of a molded article surface and better molded appearance.

The evaluation results of the above-described measurements are shown in Tables 26 and 27.

TABLE 26

|  |  |  | Example 4-1 | Example 4-2 | Example 4-3 | Example 4-4 | Example 4-5 |
|---|---|---|---|---|---|---|---|
| Graft copolymer (B-III) | Type of graft copolymer | | B-III-1 | B-III-2 | B-III-3 | B-III-4 | B-III-5 |
| | Rubbery polymer/ AN/ST (parts) | | 50/ 12.5/37.5 | 50/ 12.5/37.5 | 50/ 12.5/37.5 | 50/ 12.5/37.5 | 50/ 12.5/37.5 |
| | Volume average particle size | nm | 210 | 310 | 590 | 770 | 1150 |
| Rubbery polymer (A-III) | Type | | A-III-1 | A-III-2 | A-III-3 | A-III-4 | A-III-5 |
| | Preparation method | | Mini-emulsion | Mini-emulsion | Mini-emulsion | Mini-emulsion | Mini-emulsion |
| | Hydrophobe | Parts | 2.4 | 2.4 | 2.4 | 2.4 | 2.4 |
| | Emulsifier | Parts | 0.40 | 0.20 | 0.10 | 0.06 | 0.04 |
| | Volume average particle size (X) | nm | 180 | 280 | 560 | 760 | 960 |
| | Largest 10% frequency particle size (Y) | nm | 290 (1.6X) | 390 (1.4X) | 950 (1.7X) | 1140 (1.5X) | 1730 (1.8X) |
| | Smallest 10% frequency particle size (Z) | nm | 130 (0.72X) | 220 (0.79X) | 340 (0.60X) | 460 (0.60X) | 480 (0.50X) |
| Evaluation results | Charpy impact strength | kJ/m$^2$ | 7 | 10 | 12 | 13 | 10 |
| | MVR | cm$^3$/10 min | 11 | 11 | 10 | 9 | 10 |
| | Color developability | L value | 8.9 | 9.4 | 10.5 | 11.5 | 11.8 |
| | Image clarity | % | 85 | 82 | 80 | 78 | 75 |

|  |  |  | Example 4-6 | Example 4-7 | Example 4-8 | Example 4-9 |
|---|---|---|---|---|---|---|
| Graft copolymer (B-III) | Type of graft copolymer | | B-III-6 | B-III-7 | B-III-8 | B-III-9 |
| | Rubbery polymer/ AN/ST (parts) | | 50/ 12.5/37.5 | 50/ 12.5/37.5 | 50/ 12.5/37.5 | 50/ 12.5/37.5 |
| | Volume average particle size | nm | 310 | 130 | 880 | 440 |
| Rubbery polymer (A-III) | Type | | A-III-6 | A-III-7 | A-III-8 | A-III-9 |
| | Preparation method | | Mini-emulsion | Mini-emulsion | Mini-emulsion | Mini-emulsion |
| | Hydrophobe | Parts | 2.4 | 2.4 | 2.4 | 2.4 |
| | Emulsifier | Parts | 0.22 | 0.70 | 0.05 | 0.15 |
| | Volume average particle size (X) | nm | 290 | 120 | 790 | 350 |
| | Largest 10% frequency particle size (Y) | nm | 520 (1.8X) | 190 (1.6X) | 1420 (1.8X) | 600 (1.7X) |
| | Smallest 10% frequency particle size (Z) | nm | 200 (0.70X) | 80 (0.66X) | 510 (0.64X) | 190 (0.53X) |
| Evaluation results | Charpy impact strength | kJ/m$^2$ | 11 | 5 | 13 | 10 |
| | MVR | cm$^3$/10 min | 10 | 11 | 9 | 11 |
| | Color developability | L value | 11.3 | 8.9 | 12.2 | 11.2 |
| | Image clarity | % | 72 | 86 | 75 | 77 |

TABLE 27

|  |  |  | Comparative example4-1 | Comparative example4-2 | Comparative example4-3 |
|---|---|---|---|---|---|
| Graft copolymer (B-III) | Type of graft copolymer | | B-III-10 | B-III-11 | B-III-12 |
| | Rubbery polymer/AN/ST (parts) | | 50/12.5/37.5 | 50/12.5/37.5 | 50/12.5/37.5 |
| | Volume average particle size | nm | 200 | 600 | 1330 |
| Rubbery polymer (A-III) | Type | | A-III-10 | A-III-11 | A-III-12 |
| | Preparation method | | Seeding | Enlargement | Enlargement |
| | Hydrophobe | Parts | 2.4 | 2.4 | 2.4 |
| | Emulsifier | Parts | 1.00 | 1.00 | 1.00 |
| | Volume average particle size (X) | nm | 180 | 560 | 950 |
| | Largest 10% frequency particle size (Y) | nm | 320 (1.8X) | 1060 (1.9X) | 1810 (1.9X) |
| | Smallest 10% frequency particle size (Z) | nm | 110 (0.61X) | 280 (0.50X) | 380 (0.40X) |
| Evaluation results | Charpy impact strength | kJ/m$^2$ | 4 | 9 | 12 |
| | MVR | cm$^3$/10 min | 10 | 10 | 10 |
| | Color developability | L value | 9.6 | 13.4 | 17.8 |
| | Image clarity | % | 82 | 70 | 65 |

The results of Examples and Comparative Examples revealed the following.

The thermoplastic resin compositions of Examples 4-1 to 4-9 are excellent in impact resistance, color developability, and molded appearance.

By contrast, the thermoplastic resin compositions of Comparative Examples 4-1 to 4-3 were poor in any of impact resistance, color developability, and molded appearance. Specifically, in Comparative Example 4-1, impact resistance is poor because the rubbery polymer (A-III-10) is a seeded polymerization product. In Comparative Example 4-2, color developability and molded appearance are poor because the rubbery polymer (A-III-11) is an enlargement polymerization product and has a wide particle size distribution. In Comparative Example 4-3, color developability and molded appearance are poor because the rubbery polymer (A-III-12) is an enlargement polymerization product and has a wide particle size distribution and low polymerization stability.

INDUSTRIAL APPLICABILITY

The thermoplastic resin composition of the first invention and molded articles thereof are excellent in weather resistance, color developability, and also impact resistance and thus is suitable for long-term outdoor use such as vehicles and building materials.

Thermoplastic resin molded articles including the crosslinked particles (A-I) and/or the graft crosslinked particles (B-I) of the second invention are useful as vehicle interior and exterior parts, office machines, household electrical appliances, building materials, etc.

Thermoplastic resin molded articles including the crosslinked particles (A-II) and/or the graft crosslinked particles (B-II) of the third invention are useful as vehicle interior and exterior parts, office machines, household electrical appliances, building materials, etc.

Molded articles made of the thermoplastic resin composition of the fourth invention including the graft copolymer (B-III) of the third invention obtained using the rubbery polymer (A-III) of the fourth invention are good in impact resistance, color developability, and molded appearance. This balance of impact resistance, color developability, and molded appearance is very excellent as compared to molded articles made of conventional thermoplastic resin compositions, and thus the thermoplastic resin composition of the fourth invention and molded articles thereof are extremely useful as various industrial materials.

Although the present invention has been described in detail by using a specific embodiment, it should be apparent to those skilled in the art that various modifications can be made without departing from the spirit and the scope of the present invention.

This application is based on Japanese Patent Application No. 2015-212024 filed on Oct. 28, 2015, Japanese Patent Application No. 2015-212025 filed on the same date, Japanese Patent Application No. 2015-212026 filed on the same date, and Japanese Patent Application No. 2015-212027 filed on the same date, which are incorporated by reference herein in their entirety.

The invention claimed is:

1. A method for producing a diene/alkyl(meth)acrylate composite rubber, comprising:
a step of preparing a mixture containing an alkyl (meth)acrylate, a hydrophobe, a diene rubber, and an emulsifier, wherein an amount of the hydrophobe is 0.1-10 parts by mass relative to 100 parts by mass of the alkyl (meth)acrylate, and an amount of emulsifier is 0.01-1.0 part by mass relative to 100 parts by mass of the alkyl (meth)acrylate;
a step of applying a shear force to the mixture to prepare a pre-emulsion, and
a step of heating the pre-emulsion to polymerize the resulting mixture by miniemulsion polymerization.

2. A method for producing the diene/alkyl(meth)acrylate composite rubber according to claim 1, wherein the miniemulsion polymerization is made such that when a volume average particle size (X) is represented by X; a largest 10% frequency particle size (Y), which is a particle size at which a cumulative frequency from a largest value in a particle size distribution curve reaches 10%, is represented by Y; and a smallest 10% frequency particle size (Z), which is a particle size at which a cumulative frequency from a smallest value in the particle size distribution curve reaches 10%, is represented by Z,
the volume average particle size (X), the largest 10% frequency particle size (Y), and the smallest 10% frequency particle size (Z) satisfy (1) or (2) below:
(1) the volume average particle size (X) satisfies X≤300 nm, the largest 10% frequency particle size (Y) satisfies Y≤1.6X, and the smallest 10% frequency particle size (Z) satisfies Z≥0.7X; or
(2) the volume average particle size (X) satisfies X=300 to 800 nm, the largest 10% frequency particle size (Y) satisfies Y≤1.7X, and the smallest 10% frequency particle size (Z) satisfies Z≥0.6X.

3. A method for producing the diene/alkyl(meth)acrylate composite rubber according to claim 1, wherein the step of preparing the mixture further contains a radical polymerization initiator in an amount of 0.001 to 3 parts by mass relative to 100 parts by mass of the alkyl (meth)acrylate.

4. A method for producing the diene/alkyl(meth)acrylate composite rubber according to claim 3, wherein the step of preparing the mixture further comprises a water solvent in an amount of 100 to 500 parts by mass relative 100 parts by mass of the mixture.

5. A method for producing the diene/alkyl(meth)acrylate composite rubber according to claim 4, wherein the step of preparing the mixture further comprises a crosslinking agent in an amount of 0.1 to 1.5 parts by mass relative to 100 parts by mass of a total of the crosslinking agent and the alkyl (meth)acrylate.

6. A method for producing the diene/alkyl(meth)acrylate composite rubber according to claim 1, further comprising a step of emulsion graft-polymerizing at least one monomer selected from the group consisting of aromatic vinyl compounds, (meth)acrylic acid esters, and vinyl cyanide compounds graft-polymerized onto the rubbery polymer, an amount of the at least one monomer being 90% to 10% by mass relative to an amount of 10% to 90% by mass of the rubbery polymer.

7. A method for producing a polyorganosiloxane/alkyl (meth)acrylate composite rubber, comprising:
a step of preparing a mixture containing an alkyl (meth)acrylate, a hydrophobe, polyorganosiloxane, and an emulsifier, wherein an amount of the hydrophobe is 0.1-10 parts by mass relative to 100 parts by mass of the alkyl (meth)acrylate, and an amount of emulsifier is 0.01-1.0 part by mass relative to 100 parts by mass of the alkyl (meth)acrylate;
a step of applying a shear force to the mixture to prepare a pre-emulsion, and
a step of heating the pre-emulsion to polymerize the resulting mixture by miniemulsion polymerization.

8. A method for producing the polyorganosiloxane/alkyl (meth)acrylate composite rubber according to claim 7, wherein the miniemulsion polymerization is made such that when a volume average particle size (X) is represented by X; a largest 10% frequency particle size (Y), which is a particle size at which a cumulative frequency from a largest value in a particle size distribution curve reaches 10%, is represented by Y; and a smallest 10% frequency particle size (Z), which is a particle size at which a cumulative frequency from a smallest value in the particle size distribution curve reaches 10%, is represented by Z, the volume average particle size (X), the largest 10% frequency particle size (Y), and the smallest 10% frequency particle size (Z) satisfy (1) or (2) below:
(1) the volume average particle size (X) satisfies $X \leq 300$ nm, the largest 10% frequency particle size (Y) satisfies $Y \leq 1.6X$, and the smallest 10% frequency particle size (Z) satisfies $Z \geq 0.7X$; or
(2) the volume average particle size (X) satisfies $X=300$ to 800 nm, the largest 10% frequency particle size (Y) satisfies $Y \leq 1.7X$, and the smallest 10% frequency particle size (Z) satisfies $Z \geq 0.6X$.

9. A method for producing the polyorganosiloxane/alkyl (meth)acrylate composite rubber according to claim 7, wherein the step of preparing the mixture further contains a radical polymerization initiator in an amount of 0.001 to 3 parts by mass relative to 100 parts by mass of the alkyl (meth)acrylate.

10. A method for producing the polyorganosiloxane/alkyl (meth)acrylate composite rubber according to claim 9, wherein the step of preparing the mixture further comprises a water solvent in an amount of 100 to 500 parts by mass relative 100 parts by mass of the mixture.

11. A method for producing the polyorganosiloxane/alkyl (meth)acrylate composite rubber according to claim 10, wherein the step of preparing the mixture further comprises a crosslinking agent in an amount of 0.1 to 1.5 parts by mass relative to 100 parts by mass of a total of the crosslinking agent and the alkyl(meth)acrylate.

12. A method for producing the polyorganosiloxane/alkyl (meth)acrylate composite rubber according to claim 7, further comprising a step of emulsion graft-polymerizing at least one monomer selected from the group consisting of aromatic vinyl compounds, (meth)acrylic acid esters, and vinyl cyanide compounds graft-polymerized onto the rubbery polymer, an amount of the at least one monomer being 90% to 10% by mass relative to an amount of 10% to 90% by mass of the rubbery polymer.

* * * * *